United States Patent
Cao et al.

(10) Patent No.: US 11,825,082 B2
(45) Date of Patent: Nov. 21, 2023

(54) CODING AND DECODING METHODS, CODING AND DECODING DEVICE

(71) Applicant: HANGZHOU HIKVISION DIGITAL TECHNOLOGY CO., LTD., Zhejiang (CN)

(72) Inventors: Xiaoqiang Cao, Zhejiang (CN); Liying Xu, Zhejiang (CN); Fangdong Chen, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 250 days.

(21) Appl. No.: 17/437,391

(22) PCT Filed: Mar. 9, 2020

(86) PCT No.: PCT/CN2020/078487
§ 371 (c)(1),
(2) Date: Sep. 8, 2021

(87) PCT Pub. No.: WO2020/182103
PCT Pub. Date: Sep. 17, 2020

(65) Prior Publication Data
US 2022/0182624 A1 Jun. 9, 2022

(30) Foreign Application Priority Data
Mar. 9, 2019 (CN) .......................... 201910177528.9

(51) Int. Cl.
*H04N 19/119* (2014.01)
*H04N 19/159* (2014.01)
(Continued)

(52) U.S. Cl.
CPC ......... *H04N 19/119* (2014.11); *H04N 19/159* (2014.11); *H04N 19/176* (2014.11); *H04N 19/60* (2014.11)

(58) Field of Classification Search
CPC .. H04N 19/119; H04N 19/159; H04N 19/176; H04N 19/60; H04N 19/12;
(Continued)

(56) References Cited

U.S. PATENT DOCUMENTS

| 2018/0020218 A1 | 1/2018 | Zhao et al. |
| 2018/0249179 A1 | 8/2018 | Han et al. |
| 2020/0099924 A1* | 3/2020 | Seregin ................ H04N 19/122 |

FOREIGN PATENT DOCUMENTS

| CN | 1685369 A | 10/2005 |
| CN | 102843560 A | 12/2012 |

(Continued)

OTHER PUBLICATIONS

Extended European search report of counterpart European application No. 20770441.2 dated May 6, 2022.
(Continued)

*Primary Examiner* — Farzana Hossain
(74) *Attorney, Agent, or Firm* — Knobbe, Martens, Olson & Bear, LLP

(57) ABSTRACT

Provided is a decoding method, including: acquiring coded data of a current block; determining size information of subblocks based on subblock partition information of the current block in response to the current block satisfying a subblock partition condition and determining, based on the coded data of the current block, that the current block activates intra subblock partition; determining, based on the size information of each subblock, a transform pair corresponding to the subblock; and performing an inverse transform on inversely quantized data of the subblocks based on the transform pairs corresponding to the subblocks.

20 Claims, 9 Drawing Sheets

(51) Int. Cl.
*H04N 19/176* (2014.01)
*H04N 19/60* (2014.01)

(58) Field of Classification Search
CPC .... H04N 19/134; H04N 19/11; H04N 19/107; H04N 19/122; H04N 19/13; H04N 19/61
See application file for complete search history.

(56) References Cited

FOREIGN PATENT DOCUMENTS

| | | | |
|---|---|---|---|
| CN | 103098473 | A | 5/2013 |
| CN | 106101705 | A | 11/2016 |
| CN | 106488232 | A | 3/2017 |
| CN | 107277513 | A | 10/2017 |
| CN | 108886613 | A | 11/2018 |
| CN | 109417636 | A | 3/2019 |
| CN | 110392256 | A | 10/2019 |
| JP | 2014036278 | A | 2/2014 |
| WO | 2018026166 | A1 | 2/2018 |
| WO | 2018128323 | A1 | 7/2018 |
| WO | 2019009584 | A1 | 1/2019 |
| WO | 2020177509 | A1 | 9/2020 |

OTHER PUBLICATIONS

Communication pursuant to Article 94(3) EPC of European application No. 20770441.2 dated May 18, 2022.
Jani Lainema, CE6: Shape adaptive transform selection (Test 3.1), Joint Video Experts Team (JVET) of ITU-T SG 16 WP 3 and ISO/IEC JTC 1/SC 29/WG 11, No. JVET-M0303, 13th Meeting: Marrakech, MA, Jan. 4, 2019, Test in section 8.4.4.1, p. 1, paragraph 1—p. 2, paragraph 2.
Jani Lainema, CE6-related: 2-mode MTS with shape adaptive transform selection, Joint Video Experts Team (JVET) of ITU-T SG 16 WP 3 and ISO/IEC JTC 1/SC 29/WG 11, No. JVET-M0304-v2, 13th Meeting: Marrakech, MA, Jan. 12, 2019, Abstract, p. 1, paragraph1—p. 3, paragraph 2.
Xin Zhao, Bog report on CE6 related contributions, Joint Video Experts Team (JVET) of ITU-T SG 16 WP 3 and ISO/IEC JTC 1/SC 29/WG 11, No. JVET-M0877, 13th Meeting: Marrakech, MA, Jan. 14, 2019, p. 5-p. 8.
International search report of PCT application No. PCT/CN2020/078487 dated Jun. 4, 2020.
International search report of PCT application No. PCT/CN2020/078489 dated Jun. 5,2020.
First office action of Chinese application No. 201910570214.5 dated Aug. 12, 2020.
Notification to grant patent right for invention of Chinese application No. 201910570214.5 dated Nov. 17, 2020.
Shrestha, S. et al. "CE6-Related: DST-3 Based Transform Kernels Derivation" Joint Video Experts Team (JVET) of ITU-T SG 16 WP 3 and ISO/IEO JTC 1/SC 29/WG11 13th Meeting: Marrakech, MA (JVET-M0397), Jan. 10, 2019; entire document.
Kiho Choi et al. "CE6-Related: Simplification on MTS Kernel Derivation" Joint Video Experts Team (JVET) of ITU-T SG 16 WP 3 and ISO/IEO JTC 1/SC 29/WG 11 12th Meeting: Macao, CN (JVET-L0059), Oct. 3, 2018; entire document.
Chen, Jianle et al. "Joint Video Exploration Team (JVET) of ITU-T SG 16 WP 3 and ISO/IEC JTC 1/SC 29/WG 11 7th Meeting: Torino, IT (JVET-G1001), Jul. 13-21, 2017" Algorithm Description of Joint Exploration Test Model 7 (JEM 7), Jul. 21, 2017 (Jul. 21, 2017), sections 2.4.1 and 2.4.2.
Saxena, Ankur et al., IEEE Transactions on Image Processing, DCT/DST-Based Transform Coding for Intra Prediction in Image/Video Coding, vol. 22, No. 10, Oct. 31, 2013 (Oct. 31, 2013), pp. 3974-3981.

\* cited by examiner (a) (b) (c)

CODING AND DECODING METHODS, CODING AND DECODING DEVICE

This application is a US national stage of international application No. PCT/CN2020/078487, filed on Mar. 9, 2020, which claims priority to Chinese Patent Application No. 201910177528.9, filed on Mar. 9, 2019 and entitled "METHODS FOR PERFORMING ENCODING AND DECODING, ENCODING END AND DECODING END," the content of which is incorporated herein by reference in its entirety.

TECHNICAL FIELD

The present disclosure relates to the field of audio and video technologies, in particular, relates to coding and decoding methods, and coding and decoding devices.

BACKGROUND

With the development of Internet technologies and computer technologies, more and more video applications are being developed, and users' demands for high-definition videos in the video applications are increasing. However, because a high-definition video generally contains a large amount of data, before transmission in a limited network bandwidth, the high-definition video needs to be coded. Data coding generally includes: intra prediction (or inter prediction), transform, quantization, entropy coding, in-loop filtering, and the like. During the coding, when a current block satisfies an intra subblock partition condition, subblocks of the current block may also be respectively predicted, transformed, quantized, and entropy-coded. A coding device determines whether to perform prediction, transform, quantization, and entropy coding based on the current block or subblocks of the current block in accordance with rate distortion optimization (RDO) criteria.

SUMMARY

In order to solve the problems in the related art, embodiments of the present disclosure provide a coding method, a decoding method, a coding device, a decoding device and a system. The technical solutions are summarized as follows.

In a first aspect, a decoding method is provided. The method includes: acquiring coded data of a current block; determining size information and shape information of subblocks based on subblock partition information of the current block when the current block satisfies a subblock partition condition and it is determined, based on the coded data of the current block, that the current block activates intra subblock partition; determining, based on the size information and the shape information of each subblock, a transform pair corresponding to the subblock; and performing an inverse transform on inversely quantized data of the subblocks based on the transform pairs corresponding to the subblocks;

wherein determining, based on the size information and the shape information of the each subblock, the transform pair corresponding to the subblock includes: determining DST7 as a horizontal transform kernel in the transform pair corresponding to the subblock when a width of the subblock satisfies a first dimension constraint condition and a shape of the subblock satisfies a first condition; and determining DST7 as a vertical transform kernel in the transform pair corresponding to the subblock when a height of the subblock satisfies a second dimension constraint condition and the shape of the subblock satisfies a second condition.

In some possible embodiments of the present disclosure, determining, based on the size information and shape information of the subblock, the transform pair corresponding to each subblock further includes: determining DCT2 as a horizontal transform kernel in the transform pair corresponding to the subblock when the width of the subblock fails to satisfy the first dimension constraint condition and/or the shape of the subblock fails to satisfy the first condition; and determining DCT2 as a vertical transform kernel in the transform pair corresponding to the subblock when the height of the subblock fails to satisfy the second dimension constraint condition and/or the shape of the subblock fails to satisfy the second condition.

wherein determining, based on the size information and the shape information of the each subblock, the transform pair corresponding to the subblock includes: determining DST7 as a horizontal transform kernel in the transform pair corresponding to the subblock when a width of the subblock satisfies a first dimension constraint condition and a shape of the subblock satisfies a first condition; and determining Discrete Sine Transform-7 (DST7) as a vertical transform kernel in the transform pair corresponding to the subblock when a height of the subblock satisfies a second dimension constraint condition and the shape of the subblock satisfies a second condition.

In some possible embodiments of the present disclosure, determining, based on the size information and shape information of the subblock, the transform pair corresponding to each subblock further includes: determining Discrete Cosine Transform-2 (DCT2) as a horizontal transform kernel in the transform pair corresponding to the subblock when the width of the subblock fails to satisfy the first dimension constraint condition and/or the shape of the subblock fails to satisfy the first condition; and determining DCT2 as a vertical transform kernel in the transform pair corresponding to the subblock when the width of the subblock fails to satisfy the second dimension constraint condition and/or the shape of the subblock fails to satisfy the second condition.

In a second aspect, a coding method is provided. The method includes: acquiring residual data of a current block; determining size information and shape information of subblocks of the current block based on subblock partition information of the current block when the current block satisfies a subblock partition condition and subblock partition is activated; determining a transform pair corresponding to each subblock based on the size information and shape information of the subblock; and performing a transform on residual data of the subblocks based on the transform pairs corresponding to the subblocks;

wherein determining the transform pair corresponding to each subblock based on the size information and shape information of the subblock includes: determining DST7 as a horizontal transform kernel in the transform pair corresponding to the subblock when a width of the subblock satisfies a first dimension constraint condition and a shape of the subblock satisfies a first condition; determining DST7 as a vertical transform kernel in the transform pair of the subblock when a height of the subblock satisfies a second dimension constraint condition and the shape of the subblock satisfies a second condition.

In some possible embodiments of the present disclosure, the method further includes: acquiring the subblock partition information of the current block when the current block satisfies the subblock partition condition; and adding the subblock partition information to coded data of the current block.

In a third aspect, a decoding method is provided. The method includes: acquiring coded data of a current block; when the current block satisfies a subblock partition condition and it is determined, based on the coded data of the current block, that the current block activates intra-subblock partition, determining size information of subblocks based on subblock partition information of the current block, and determining intra prediction mode information of the subblocks; determining, based on the size information and the intra prediction mode information of each subblock, a transform pair corresponding to the subblock; and performing an inverse transform on inversely quantized data of the subblocks based on the transform pairs corresponding to the subblocks;

wherein determining, based on the size information and the intra prediction mode information of each subblock, the transform pair corresponding to each subblock includes: determining a transform pair corresponding to the intra prediction mode information of each subblock as the transform pair corresponding to the subblock when it is determined, based on the size information of the subblock, that the subblock fails to satisfy a dimension constraint condition, wherein the dimension constraint condition is that a width is not within a preset value range, and a height is not within the preset value range.

In some possible embodiments of the present disclosure, determining the transform pair corresponding to each subblock based on the size information of the subblock and the intra prediction mode information of the subblock further includes:

when it is determined, based on the size information of the subblock, that the height of the subblock satisfies the dimension constraint condition and the width of the subblock fails to satisfy the dimension constraint condition, determining DCT2 as a vertical transform kernel in the transform pair corresponding to the subblock, and determining a horizontal transform kernel in the transform pair corresponding to the intra prediction mode information of the subblock as a horizontal transform kernel in the transform pair corresponding to the subblock;

when it is determined, based on the size information of the subblock, that the width of the subblock satisfies the dimension constraint condition and the height of the subblock fails to satisfy the dimension constraint condition, determining DCT2 as a horizontal transform kernel in the transform pair corresponding to the subblock, and determining a vertical transform kernel in the transform pair corresponding to the intra prediction mode information of the subblock as a vertical transform kernel in the transform pair of the subblock; and determining DCT2 as a vertical transform kernel and a vertical transform kernel in the transform pair corresponding to the subblock when it is determined, based on the size information of the subblock, that both the height and the width of the subblock satisfy the dimension constraint condition.

In some possible embodiments of the present disclosure, determining the transform pair corresponding to the intra prediction mode information of each subblock as the transform pair corresponding to the subblock includes: determining the transform pair corresponding to the subblock as (DCT2, DCT2) when mode numbers of the intra prediction mode information of the subblock are 1, 33, 35; determining the transform pair corresponding to the subblock as (DST7, DST7) when the mode numbers of the intra prediction mode information of the subblock are 0, 31, 32, 34, 36, 37; determining the transform pair corresponding to the subblock as (DST7, DCT8) when the mode numbers of the intra prediction mode information of the subblock are 2, 30, even numbers between 2 and 30, 39, 65, and odd numbers between 39 and 65; and determining the transform pair corresponding to the subblock as (DCT8, DST7) when the mode numbers of the intra prediction mode information of the subblock are 3, 29, odd numbers between 3 and 29, 38, 66, and even numbers between 38 and 66.

In some possible embodiments of the present disclosure, determining the transform pair corresponding to the intra prediction mode information of each subblock as the transform pair corresponding to the subblock includes: determining the transform pair corresponding to the subblock as a first transform pair when a mode number of the intra prediction mode information of the subblock is 1; determining the transform pair corresponding to the subblock as a second transform pair when the mode numbers of the intra prediction mode information of the subblock are 0, 31, 32, 33, 34, 35, 36, 37; determining the transform pair corresponding to the subblock as a third transform pair when the mode numbers of the intra prediction mode information of the subblock are 2, 30, even numbers between 2 and 30, 39, 65, and odd numbers between 39 and 65; and determining the transform pair corresponding to the subblock as a fourth transform pair when the mode numbers of the intra prediction mode information of the subblock are 3, 29, odd numbers between 3 and 29, 38, 66, and even numbers between 38 and 66.

In some possible embodiments of the present disclosure, determining the transform pair corresponding to the intra prediction mode information of each subblock as the transform pair corresponding to the subblock includes: determining the transform pair corresponding to the subblock as a first transform pair when a mode number of the intra prediction mode information of the subblock is 1; determining the transform pair corresponding to the subblock as a second transform pair when the mode number of the intra prediction mode information of the subblock is 0; determining the transform pair corresponding to the subblock as a third transform pair when the mode numbers of the intra prediction mode information of the subblock are 2, 34, even numbers between 2 and 34, 35, 65, and odd numbers between 35 and 65; and determining the transform pair corresponding to the subblock as a fourth transform pair when the mode numbers of the intra prediction mode information of the subblock are 3, 33, odd numbers between 3 and 33, 36, 66, and even numbers between 36 and 66.

In some possible embodiments of the present disclosure, determining the transform pair corresponding to the intra prediction mode information of each subblock as the transform pair corresponding to the subblock includes: determining the transform pair corresponding to the subblock as a first transform pair when the mode number of the intra prediction mode information of the subblock is 1; determining the transform pair corresponding to the subblock as a second transform pair when the mode numbers of the intra prediction mode information of the subblock are to 0, 3, 65, and odd numbers between 3 and 65; determining the transform pair corresponding to the subblock as a third transform pair when the mode numbers of the intra prediction mode information of the subblock are 2, 34, and even numbers between 2 and 34; and determining the transform pair corresponding to the subblock as a fourth transform pair when the mode numbers of the intra prediction mode information of the subblock are 36, 66, and even numbers between 36 and 66.

In some possible embodiments of the present disclosure, the first transform pair is (DCT2, DCT2), the second transform pair is (DST7, DST7), the third transform pair is (DST7, DCT2), and the fourth transform pair is (DCT2, DST7); or the first transform pair is (DCT2, DCT2), the second transform pair is (DST7, DST7), the third transform pair is (DST7, DCT8), and the fourth transform pair is (DCT8, DST7).

In some possible embodiments of the present disclosure, determining the transform pair corresponding to the intra prediction mode information of each subblock as the transform pair corresponding to the subblock when it is determined, based on the size information of the subblock, that the subblock fails to satisfy the dimension constraint condition includes: determining the transform pair corresponding to the intra prediction mode information as the transform pair corresponding to each subblock when it is determined, based on the size information of the subblock, that the subblock fails to satisfy the dimension constraint condition and that the intra prediction mode information of the subblock satisfies an intra prediction mode range.

In some possible embodiments of the present disclosure, the method further includes: determining a ratio of a width to a height of each subblock based on the size information of the subblock when it is determined, based on the size information of the subblock, that the subblock fails to satisfy the dimension constraint condition and that the intra prediction mode information of the subblock fails to satisfy the intra prediction mode range; and determining, based on the ratio of the width to the height of the subblock and the intra prediction mode information of the subblock, the transform pair corresponding to the subblock.

In some possible embodiments of the present disclosure, the intra prediction mode range includes intra prediction mode information with mode numbers of 0, 1, and 31 to 37; or the intra prediction mode range includes intra prediction mode information with mode numbers of 0 and 1; or the intra prediction mode range includes intra prediction mode information with mode numbers of 0, 1, 3, 65, and odd numbers between 3 and 65.

In some possible embodiments of the present disclosure, the intra prediction mode range includes intra prediction mode information with mode numbers of 0, 1, and 31 to 37; and determining, based on the ratio of the width to the height of the subblock and the intra prediction mode information of the subblock, the transform pair corresponding to the subblock includes:

determining the transform pair corresponding to the current block as (DST7, DCT2) when the ratio of the width to the height of the current block is equal to 1 and the mode numbers of the intra prediction mode information are 2, 4, 6, 30, 39, 41, 43, 65, even numbers between 6 and 30, and odd numbers between 43 and 65; and determining the transform pair corresponding to the current block as (DCT2, DST7) when the ratio of the width to the height of the current block is equal to 1 and the mode numbers of the intra prediction mode information are 3, 5, 7, 29, and odd numbers between 7 and 29;

determining the transform pair corresponding to the current block as (DST7, DCT2) when the ratio of the width to the height of the current block is greater than 1 and the mode numbers of the intra prediction mode information are (B+1), (B+3), 30, 3, 5, B, 39, 41, 43, 65, even numbers between (B+3) and 30, odd numbers between 5 and B, and odd numbers between 43 and 65; and determining the transform pair corresponding to the current block as (DCT2, DST7) when the ratio of the width to the height of the current block is greater than 1 and the mode numbers of the intra prediction mode information are B+2, B+4, 29, 38, 40, 66, 2, 4, (B−1), odd numbers between B+4 and 29, even numbers between 40 and 66, and even numbers between 4 and (B−1); and determining the transform pair corresponding to the current block as (DST7, DCT2) when the ratio of the width to the height of the current block is less than 1 and the mode numbers of the intra prediction mode information are 2, 4, 6, 30, (B+1), (B+3), 66, 39, 41, (B−2), even numbers between 6 and 30, even numbers between (B+3) and 66, and odd numbers between 41 and (B−2); and determining the transform pair corresponding to the current block as (DCT2, DST7) when the ratio of the width to the height of the current block is less than 1 and the mode numbers of the intra prediction mode information are 3, 5, 29, B, (B+2), 65, 38, 40, (B−1), odd numbers between 5 and 29, odd numbers between (B+2) and 65, and even numbers between 40 and (B−1);

wherein when the ratios of the width to the height of the current block are 2, 4, 8, and 16, B is 7, 11, 13, and 15; and when the ratios of the width to the height of the current block are 1/2, 1/4, 1/8, and 1/16, B is 61, 57, 55, 53.

In some possible embodiments of the present disclosure, the intra prediction mode range includes intra prediction mode information with mode numbers of 0 and 1; and determining, based on the ratio of the width to the height of the subblock and the intra prediction mode information of the subblock, the transform pair corresponding to the subblock includes:

determining the transform pair corresponding to the current block as (DST7, DCT2) when the ratio of the width to the height of the current block is equal to 1 and the mode numbers of the intra prediction mode information are 2, 4, 6, 34, 35, 37, 39, 41, 43, 65, even numbers between 6 and 34, and odd numbers between 43 and 65; and determining the transform pair corresponding to the current block as (DCT2, DST7) when the ratio of the width to the height of the current block is equal to 1 and the mode numbers of the intra prediction mode information are 3, 5, 7, 33, 36, 38, 40, 66, odd numbers between 7 and 33, and even numbers between 40 and 66;

determining the transform pair corresponding to the current block as (DST7, DCT2) when the ratio of the width to the height of the current block is greater than 1 and the mode numbers of the intra prediction mode information are (B+1), (B+3), 34, 3, 5, B, 35, 37, 39, 65, even numbers between (B+3) and 34, odd numbers between 5 and B, and odd numbers between 39 and 65; and determining the transform pair corresponding to the current block as (DCT2, DST7) when the ratio of the width to the height of the current block is greater than 1 and the mode numbers of the intra prediction mode information are (B+2), (B+4), 33, 2, 4, (B−1), 36, 38, 66, odd numbers between (B+4) and 33, even numbers between 4 and (B−1), and even numbers between 38 and 66; and determining the transform pair corresponding to the current block as (DST7, DCT2) when the ratio of the width to the height of the current block is less than 1 and the mode numbers of the intra prediction mode information are 2, 4, 6, 34, (B+1), (B+3), 66, 35, 37, 39, (B−2), even numbers between 6 and 34, odd numbers between (B+3) and 66, and odd numbers between 39 and (B−2); and determining the transform pair corresponding to the current block as (DCT2, DST7) when the ratio of the width to the height of the current block is less than 1 and the mode numbers of the intra prediction mode information are 3, 5, 33, B, (B+2), 65, 36, 38, (B−1), odd numbers between 5 and 33, odd numbers between (B+2) and 65, and even numbers between 38 and (B−1);

wherein when the ratios of the width to the height of the current block are 2, 4, 8, and 16, B is 7, 11, 13, and 15; and when the ratios of the width to the height of the current block are 1/2, 1/4, 1/8, and 1/16, B is 61, 57, 55, 53.

In some possible embodiments of the present disclosure, the intra prediction mode range includes intra prediction mode information with mode numbers of 0, 1, 3, 65, and odd numbers between 3 and 65; and determining, based on the ratio of the width to the height of the subblock and the intra prediction mode information of the subblock, the transform pair corresponding to the subblock includes:

determining the transform pair corresponding to the current block as (DST7, DCT2) when the ratio of the width to the height of the current block is equal to 1 and the mode numbers of the intra prediction mode information are 2, 4, 6, 34, and even numbers between 6 and 34; and determining the transform pair corresponding to the current block as (DCT2, DST7) when the ratio of the width to the height of the current block is equal to 1 and the mode numbers of the intra prediction mode information are 36, 38, 40, 66, and even numbers between 40 and 66;

determining the transform pair corresponding to the current block as (DST7, DCT2) when the ratio of the width to the height of the current block is greater than 1 and the mode numbers of the intra prediction mode information are (B+1), (B+3), 34, and even numbers between (B+3) and 34; and determining the transform pair corresponding to the current block as (DCT2, DST7) when the ratio of the width to the height of the current block is greater than 1 and the mode numbers of the intra prediction mode information are 36, 38, 66, 2, 4, (B−1), even numbers between 38 and 66, and even numbers between 4 and (B−1); and determining the transform pair corresponding to the current block as (DST7, DCT2) when the ratio of the width to the height of the current block is less than 1 and the mode numbers of the intra prediction mode information are 2, 4, 6, 34, (B+1), (B+3), 66, even numbers between 6 and 34, and even numbers between (B+3) and 66; and determining the transform pair corresponding to the current block as (DCT2, DST7) when the ratio of the width to the height of the current block is less than 1 and the mode numbers of the intra prediction mode information are 36, 38, (B−1), and even numbers between 38 and (B−1);

wherein when the ratios of the width to the height of the current block are 2, 4, 8, and 16, B is 7, 11, 13, and 15; and when the ratios of the width to the height of the current block are 1/2, 1/4, 1/8, and 1/16, B is 61, 57, 55, 53.

In some possible embodiments of the present disclosure, the method further includes: determining, based on the size information and the intra prediction mode information of the current block, the transform pair corresponding to the current block when the current block does not activate the subblock partition.

In some possible embodiments of the present disclosure, determining, based on the size information and the intra prediction mode information of the current block, the transform pair corresponding to the current block further includes:

determining the transform pair corresponding to the intra prediction mode information as the transform pair corresponding to the current block when it is determined, based on the size information, that the current block fails to satisfy a target dimension constraint condition, wherein the target dimension constraint condition is that the width is greater than or equal to a target value, and the height is greater than or equal to the target value;

when it is determined, based on the size information, that the height of the current block satisfies the target dimension constraint condition and the width of the current block fails to satisfy the target dimension constraint condition, determining DCT2 as a vertical transform kernel in the transform pair corresponding to the current block, and determining a horizontal transform kernel in the transform pair corresponding to the intra prediction mode information as a horizontal transform kernel in the transform pair corresponding to the current block;

when it is determined, based on the size information, that the width of the current block satisfies the target dimension constraint condition and the height of the current block fails to satisfy the target dimension constraint condition, determining DCT2 as a horizontal transform kernel in the transform pair corresponding to the current block, and determining a vertical transform kernel in the transform pair corresponding to the intra prediction mode information as a vertical transform kernel in the transform pair corresponding to the current block; and determining DCT2 as a horizontal transform kernel and a vertical transform kernel in the transform pair corresponding to the current block when it is determined based on the size information, that both the width and the height of the current block satisfy the target dimension constraint condition.

In some possible embodiments of the present disclosure, the subblock partition condition is that the current block is a luma block, the height and the width of the current block are both less than or equal to a first preset value, the current block is a single-line reference during performing intra prediction, and a number of pixels included in the current block is greater than a second preset value.

In a fourth aspect, a coding method is provided. The method includes: acquiring residual data of a current block; determining intra prediction mode information of subblocks of the current block and size information of the subblocks of the current block based on subblock partition information of the current block when the current block satisfies a subblock partition condition and intra subblock partitioning is activated; determining, based on the size information of the subblock and the intra prediction mode information of the subblock, a transform pair corresponding to each subblock; and performing a transform on residual data of the subblocks based on the transform pairs corresponding to the subblocks;

wherein determining, based on the size information of the subblock and the intra prediction mode information of the subblock, the transform pair corresponding to each subblock includes: determining a transform pair corresponding to the intra prediction mode information of each subblock as a transform pair corresponding to the subblock when it is determined, based on the size information of the subblock, that the subblock fails to satisfy a dimension constraint condition, wherein the dimension constraint condition is that a width is not within a first preset value range, and a height is not within a second preset value range.

In some possible embodiments of the present disclosure, the method further includes:

acquiring subblock partition information of the current block when the current block satisfies the subblock partition condition; and adding the subblock partition information to coded data of the current block.

In a fifth aspect, a decoding method is provided. The decoding device includes: an acquiring module, configured to acquire coded data of a current block; a determining module, configured to: determine size information and shape information of subblocks based on subblock partition information of the current block when the current block satisfies a subblock partition condition and it is determined, based on the coded data of the current block, that the current block activates intra subblock partition; and determine, based on the size information and shape information of the subblock, a transform pair corresponding to each subblock; and a transforming module, configured to perform an inverse transform on inversely quantized data of the subblocks based on the transform pairs corresponding to the subblocks;

wherein the determining module is configured to: determine DST7 as a horizontal transform kernel in the transform pair corresponding to the subblock when a width of the subblock satisfies a first dimension constraint condition and a shape of the subblock satisfies a first condition; and determine DST7 as a vertical transform kernel in the transform pair corresponding to the subblock when a height of the subblock satisfies a second dimension constraint condition and the shape of the subblock satisfies a second condition.

In some possible embodiments of the present disclosure, the determining module is further configured to: determine DCT2 as a horizontal transform kernel in the transform pair corresponding to the subblock when the width of the subblock fails to satisfy the first dimension constraint condition and/or the shape of the subblock fails to satisfy the first condition; and determine DCT2 as a vertical transform kernel in the transform pair corresponding to the subblock when the height of the subblock fails to satisfy the second dimension constraint condition and/or the shape of the subblock fails to satisfy the second condition.

In some possible embodiments of the present disclosure, the first dimension constraint condition and the second dimension constraint condition are greater than or equal to a first value, and less than or equal to a second value; the first condition is that the width is less than or equal to the height, and the second condition is that the width is greater than or equal to the height; or the first dimension constraint condition and the second dimension constraint condition are greater than or equal to a first value, and less than or equal to a second value; the first condition is that the width is less than the height, and the second condition is that the width is greater than the height.

In some possible embodiments of the present disclosure, the subblock partition condition is that the current block is a luma block, the height and the width of the current block are both less than or equal to a third value, the current block is a single-line reference during performing intra prediction, and a number of pixels included in the current block is greater than a fourth value.

In a sixth aspect, a coding device is provided. The coding device includes: an acquiring module, configured to acquire residual data of a current block; a determining module, configured to:

determine size information and shape information of subblocks of the current block based on subblock partition information of the current block when the current block satisfies a subblock partition condition and subblock partition is activated; and determine, based on the size information and shape information of the subblock, a transform pair corresponding to each subblock; and a transforming module, configured to perform a transform on residual data of the subblocks based on the transform pairs corresponding to the subblocks;

wherein the determining module is configured to: determine DST7 as a horizontal transform kernel in the transform pair corresponding to the subblock when a width of the subblock satisfies a first dimension constraint condition and a shape of the subblock satisfies a first condition; and determine DST7 as a vertical transform kernel in the transform pair of the subblock when a height of the subblock satisfies a second dimension constraint condition and the shape of the subblock satisfies a second condition.

In some possible embodiments of the present disclosure, the acquiring module is further configured to: acquire the subblock partition information of the current block when the current block satisfies the subblock partition condition; and add the subblock partition information to coded data of the current block.

In a seventh aspect, a decoding device is provided. The decoding device includes: an acquiring module, configured to acquire coded data of a current block; a determining module, configured to: when the current block satisfies a subblock partition condition and it is determined, based on the coded data of the current block, that the current block activates intra-subblock partition, determine size information of subblocks based on subblock partition information of the current block, and determine intra prediction mode information of the subblocks; and determine, based on the size information of the subblock and the intra prediction mode information of the subblock, a transform pair corresponding to each subblock; and a transforming module, configured to perform an inverse transform on inversely quantized data of the subblocks based on the transform pairs corresponding to the subblocks;

wherein the determining module is configured to: determine a transform pair corresponding to the intra prediction mode information of each subblock as the transform pair corresponding to the subblock when it is determined, based on the size information of the subblock, that the subblock fails to satisfy a dimension constraint condition, wherein the dimension constraint condition is that a width is not within a preset value range, and a height is not within the preset value range.

In some possible embodiments of the present disclosure, the determining module is further configured to:

when it is determined, based on the size information of the subblock, that the height of the subblock satisfies the dimension constraint condition and the width of the subblock fails to satisfy the dimension constraint condition, determine DCT2 as a vertical transform kernel in the transform pair corresponding to the subblock, and determine a horizontal transform kernel in the transform pair corresponding to the intra prediction mode information of the subblock as a horizontal transform kernel in the transform pair corresponding to the subblock;

when it is determined, based on the size information of the subblock, that the width of the subblock satisfies the dimension constraint condition and the height of the subblock fails to satisfy the dimension constraint condition, determine DCT2 as a horizontal transform kernel in the transform pair corresponding to the subblock, and determine a vertical transform kernel in the transform pair corresponding to the intra prediction mode information of the subblock as a vertical transform kernel in the transform pair of the subblock; and determine DCT2 as a vertical transform kernel and a vertical transform kernel in the transform pair corresponding to the subblock when it is determined, based on the size information of the subblock, that both the height and the width of the subblock satisfy the dimension constraint condition.

In some possible embodiments of the present disclosure, the determining module is configured to: determine the transform pair corresponding to the subblock as (DCT2, DCT2) when mode numbers of the intra prediction mode information of the subblock are 1, 33, 35; determine the transform pair corresponding to the subblock as (DST7, DST7) when the mode numbers of the intra prediction mode information of the subblock are 0, 31, 32, 34, 36, 37; determine the transform pair corresponding to the subblock as (DST7, DCT8) when the mode numbers of the intra prediction mode information of the subblock are 2, 30, even numbers between 2 and 30, 39, 65, and odd numbers between 39 and 65; and determine the transform pair corresponding to the subblock as (DCT8, DST7) when the mode numbers of the intra prediction mode information of the subblock are 3, 29, odd numbers between 3 and 29, 38, 66, and even numbers between 38 and 66.

In some possible embodiments of the present disclosure, the determining module is configured to: determine the transform pair corresponding to the subblock as a first transform pair when a mode number of the intra prediction mode information of the subblock is 1; determine the transform pair corresponding to the subblock as a second transform pair when the mode numbers of the intra prediction mode information of the subblock are 0, 31, 32, 33, 34, 35, 36, 37; determine the transform pair corresponding to the subblock as a third transform pair when the mode numbers of the intra prediction mode information of the subblock are 2, 30, even numbers between 2 and 30, 39, 65, and odd numbers between 39 and 65; and determine the transform pair corresponding to the subblock as a fourth transform pair when the mode numbers of the intra prediction mode information of the subblock are 3, 29, odd numbers between 3 and 29, 38, 66, and even numbers between 38 and 66.

In some possible embodiments of the present disclosure, the determining module is configured to: determine the transform pair corresponding to the subblock as a first transform pair when a mode number of the intra prediction mode information of the subblock is 1; determine the transform pair corresponding to the subblock as a second transform pair when the mode number of the intra prediction mode information of the subblock is 0; determine the transform pair corresponding to the subblock as a third transform pair when the mode numbers of the intra prediction mode information of the subblock are 2, 34, even numbers between 2 and 34, 35, 65, and odd numbers between 35 and 65; and determine the transform pair corresponding to the subblock as a fourth transform pair when the mode numbers of the intra prediction mode information of the subblock are 3, 33, odd numbers between 3 and 33, 36, 66, and even numbers between 36 and 66.

In some possible embodiments of the present disclosure, the determining module is configured to: determine the transform pair corresponding to the subblock as a first transform pair when the mode number of the intra prediction mode information of the subblock is 1; determine the transform pair corresponding to the subblock as a second transform pair when the mode numbers of the intra prediction mode information of the subblock are to 0, 3, 65, and odd numbers between 3 and 65; determine the transform pair corresponding to the subblock as a third transform pair when the mode numbers of the intra prediction mode information of the subblock are 2, 34, and even numbers between 2 and 34; and determine the transform pair corresponding to the subblock as a fourth transform pair when the mode numbers of the intra prediction mode information of the subblock are 36, 66, and even numbers between 36 and 66.

In some possible embodiments of the present disclosure, the first transform pair is (DCT2, DCT2), the second transform pair is (DST7, DST7), the third transform pair is (DST7, DCT2), and the fourth transform pair is (DCT2, DST7); or the first transform pair is (DCT2, DCT2), the second transform pair is (DST7, DST7), the third transform pair is (DST7, DCT8), and the fourth transform pair is (DCT8, DST7).

In some possible embodiments of the present disclosure, the determining module is configured to: determine the transform pair corresponding to the intra prediction mode information as the transform pair corresponding to each subblock when it is determined, based on the size information of the subblock, that the subblock fails to satisfy the dimension constraint condition and that the intra prediction mode information of the subblock satisfies an intra prediction mode range.

In some possible embodiments of the present disclosure, the determining module is further configured to: determine a ratio of a width to a height of each subblock based on the size information of the subblock when it is determined, based on the size information of the subblock, that the subblock fails to satisfy the dimension constraint condition and that the intra prediction mode information of the subblock fails to satisfy the intra prediction mode range; and determine, based on the ratio of the width to the height of the subblock and the intra prediction mode information of the subblock, the transform pair corresponding to the subblock.

In some possible embodiments of the present disclosure, the intra prediction mode range includes intra prediction mode information with mode numbers of 0, 1, and 31 to 37; or the intra prediction mode range includes intra prediction mode information with mode numbers of 0 and 1; or the intra prediction mode range includes intra prediction mode information with mode numbers of 0, 1, 3, 65, and odd numbers between 3 and 65.

In some possible embodiments of the present disclosure, the intra prediction mode range includes intra prediction mode information with mode numbers of 0, 1, and 31 to 37; and the determining module is further configured to:

determine the transform pair corresponding to the current block as (DST7, DCT2) when the ratio of the width to the height of the current block is equal to 1 and the mode numbers of the intra prediction mode information are 2, 4, 6, 30, 39, 41, 43, 65, even numbers between 6 and 30, and odd numbers between 43 and 65; and determine the transform pair corresponding to the current block as (DCT2, DST7) when the ratio of the width to the height of the current block is equal to 1 and the mode numbers of the intra prediction mode information are 3, 5, 7, 29, and odd numbers between 7 and 29;

determine the transform pair corresponding to the current block as (DST7, DCT2) when the ratio of the width to the height of the current block is greater than 1 and the mode numbers of the intra prediction mode information are (B+1), (B+3), 30, 3, 5, B, 39, 41, 43, 65, even numbers between (B+3) and 30, odd numbers between 5 and B, and odd numbers between 43 and 65; and determine the transform pair corresponding to the current block as (DCT2, DST7) when the ratio of the width to the height of the current block is greater than 1 and the mode numbers of the intra prediction mode information are B+2, B+4, 29, 38, 40, 66, 2, 4, (B−1), odd numbers between B+4 and 29, even numbers between 40 and 66, and even numbers between 4 and (B−1); and determine the transform pair corresponding to the current block as (DST7, DCT2) when the ratio of the width to the height of the current block is less than 1 and the mode numbers of the intra prediction mode information are 2, 4, 6, 30, (B+1), (B+3), 66, 39, 41, (B−2), even numbers between 6 and 30, even numbers between (B+3) and 66, and odd numbers between 41 and (B−2); and determine the transform pair corresponding to the current block as (DCT2, DST7) when the ratio of the width to the height of the current block is less than 1 and the mode numbers of the intra prediction mode information are 3, 5, 29, B, (B+2), 65, 38, 40, (B−1), odd numbers between 5 and 29, odd numbers between (B+2) and 65, and even numbers between 40 and (B−1);

wherein when the ratios of the width to the height of the current block are 2, 4, 8, and 16, B is 7, 11, 13, and 15; and when the ratios of the width to the height of the current block are 1/2, 1/4, 1/8, and 1/16, B is 61, 57, 55, 53.

In some possible embodiments of the present disclosure, the intra prediction mode range includes intra prediction mode information with mode numbers of 0 and 1; and the determining module is further configured to:

determine the transform pair corresponding to the current block as (DST7, DCT2) when the ratio of the width to the height of the current block is equal to 1 and the mode numbers of the intra prediction mode information are 2, 4, 6, 34, 35, 37, 39, 41, 43, 65, even numbers between 6 and 34, and odd numbers between 43 and 65; and determine the transform pair corresponding to the current block as (DCT2, DST7) when the ratio of the width to the height of the current block is equal to 1 and the mode numbers of the intra prediction mode information are 3, 5, 7, 33, 36, 38, 40, 66, odd numbers between 7 and 33, and even numbers between 40 and 66;

determine the transform pair corresponding to the current block as (DST7, DCT2) when the ratio of the width to the height of the current block is greater than 1 and the mode numbers of the intra prediction mode information are (B+1), (B+3), 34, 3, 5, B, 35, 37, 39, 65, even numbers between (B+3) and 34, odd numbers between 5 and B, and odd numbers between 39 and 65; and determine the transform pair corresponding to the current block as (DCT2, DST7) when the ratio of the width to the height of the current block is greater than 1 and the mode numbers of the intra prediction mode information are (B+2), (B+4), 33, 2, 4, (B−1), 36, 38, 66, odd numbers between (B+4) and 33, even numbers between 4 and (B−1), and even numbers between 38 and 66; and determine the transform pair corresponding to the current block as (DST7, DCT2) when the ratio of the width to the height of the current block is less than 1 and the mode numbers of the intra prediction mode information are 2, 4, 6, 34, (B+1), (B+3), 66, 35, 37, 39, (B−2), even numbers between 6 and 34, odd numbers between (B+3) and 66, and odd numbers between 39 and (B−2); and determine the transform pair corresponding to the current block as (DCT2, DST7) when the ratio of the width to the height of the current block is less than 1 and the mode numbers of the intra prediction mode information are 3, 5, 33, B, (B+2), 65, 36, 38, (B−1), odd numbers between 5 and 33, odd numbers between (B+2) and 65, and even numbers between 38 and (B−1);

wherein when the ratios of the width to the height of the current block are 2, 4, 8, and 16, B is 7, 11, 13, and 15; and when the ratios of the width to the height of the current block are 1/2, 1/4, 1/8, and 1/16, B is 61, 57, 55, 53.

In some possible embodiments of the present disclosure, the intra prediction mode range includes intra prediction mode information with mode numbers of 0, 1, 3, 65, and odd numbers between 3 and 65; and the determining module is further configured to:

determine the transform pair corresponding to the current block as (DST7, DCT2) when the ratio of the width to the height of the current block is equal to 1 and the mode numbers of the intra prediction mode information are 2, 4, 6, 34, and even numbers between 6 and 34; and determine the transform pair corresponding to the current block as (DCT2, DST7) when the ratio of the width to the height of the current block is equal to 1 and the mode numbers of the intra prediction mode information are 36, 38, 40, 66, and even numbers between 40 and 66;

determine the transform pair corresponding to the current block as (DST7, DCT2) when the ratio of the width to the height of the current block is greater than 1 and the mode numbers of the intra prediction mode information are (B+1), (B+3), 34, and even numbers between (B+3) and 34; and determine the transform pair corresponding to the current block as (DCT2, DST7) when the ratio of the width to the height of the current block is greater than 1 and the mode numbers of the intra prediction mode information are 36, 38, 66, 2, 4, (B−1), even numbers between 38 and 66, and even numbers between 4 and (B−1); and determine the transform pair corresponding to the current block as (DST7, DCT2) when the ratio of the width to the height of the current block is less than 1 and the mode numbers of the intra prediction mode information are 2, 4, 6, 34, (B+1), (B+3), 66, even numbers between 6 and 34, and even numbers between (B+3) and 66; and determine the transform pair corresponding to the current block as (DCT2, DST7) when the ratio of the width to the height of the current block is less than 1 and the mode numbers of the intra prediction mode information are 36, 38, (B−1), and even numbers between 38 and (B−1);

wherein when the ratios of the width to the height of the current block are 2, 4, 8, and 16, B is 7, 11, 13, and 15; and when the ratios of the width to the height of the current block are 1/2, 1/4, 1/8, and 1/16, B is 61, 57, 55, 53.

In some possible embodiments of the present disclosure, the determining module is further configured to: determine, based on the size information and the intra prediction mode information of the current block, the transform pair corresponding to the current block when the current block does not activate the subblock partition.

In some possible embodiments of the present disclosure, the determining module is further configured to:

determine the transform pair corresponding to the intra prediction mode information as the transform pair corresponding to the current block when it is determined, based on the size information, that the current block fails to satisfy a target dimension constraint condition, wherein the target dimension constraint condition is that the width is greater than or equal to a target value, and the height is greater than or equal to the target value;

when it is determined, based on the size information, that the height of the current block satisfies the target dimension constraint condition and the width of the current block fails to satisfy the target dimension constraint condition, determine DCT2 as a vertical transform kernel in the transform pair corresponding to the current block, and determine a horizontal transform kernel in the transform pair corresponding to the intra prediction mode information as a horizontal transform kernel in the transform pair corresponding to the current block;

when it is determined, based on the size information, that the width of the current block satisfies the target dimension constraint condition and the height of the current block fails to satisfy the target dimension constraint condition, determine DCT2 as a horizontal transform kernel in the transform pair corresponding to the current block, and determine a vertical transform kernel in the transform pair corresponding to the intra prediction mode information as a vertical transform kernel in the transform pair corresponding to the current block; and determine DCT2 as a horizontal transform kernel and a vertical transform kernel in the transform pair corresponding to the current block when it is determined based on the size information, that both the width and the height of the current block satisfy the target dimension constraint condition.

In some possible embodiments of the present disclosure, the subblock partition condition is that the current block is a luma block, the height and the width of the current block are both less than or equal to a first preset value, the current block is a single-line reference during performing intra prediction, and a number of pixels included in the current block is greater than a second preset value.

In an eighth aspect, a coding device is provided. The coding device includes: an acquiring module, configured to acquire residual data of a current block; a determining module, configured to: determine intra prediction mode information of subblocks of the current block and size information of the subblocks of the current block based on subblock partition information of the current block when the current block satisfies a subblock partition condition and intra subblock partitioning is activated; and determine, based on the size information of the subblock and the intra prediction mode information of the subblock, a transform pair corresponding to each subblock; and a transforming module, configured to perform a transform on residual data of the subblocks based on the transform pairs corresponding to the subblocks;

wherein the determining module is configured to: determine a transform pair corresponding to the intra prediction mode information of each subblock as a transform pair corresponding to the subblock when it is determined, based on the size information of the subblock, that the subblock fails to satisfy a dimension constraint condition, wherein the dimension constraint condition is that a width is not within a first preset value range, and a height is not within a second preset value range.

In some possible embodiments of the present disclosure, the acquiring module is further configured to: acquire subblock partition information of the current block when the current block satisfies the subblock partition condition; and add the subblock partition information to coded data of the current block.

In a ninth aspect, a decoding device is provided. The decoding device includes a processor and a memory storing a computer program therein; wherein the computer program, when run by the processor, causes the processor to implement the steps of the decoding method according to any one of the first aspect and the third aspect.

In a tenth aspect, a coding device is provided. The coding device includes a processor and a memory storing a computer program therein; wherein the computer program, when run by the processor, cause the processor to implement the steps of the coding method according to any one of the second aspect and the fourth aspect.

In an eleventh aspect, a computer-readable storage medium is provided. The computer-readable storage medium is configured to store a computer program therein, the computer program, when run by a processor, cause the processor to implement the steps of the method according to any one of the first aspect to the fourth aspect.

In a twelfth aspect, a system for coding and decoding is provided. The system includes a coding device and a decoding device, wherein the coding device is the coding device according to the sixth aspect; and the decoding device is the decoding device according to the fifth aspect; or the coding device is the coding device according to the eighth aspect; and the decoding device is the decoding device according to the seventh aspect.

DETAILED DESCRIPTION

Figure 1:
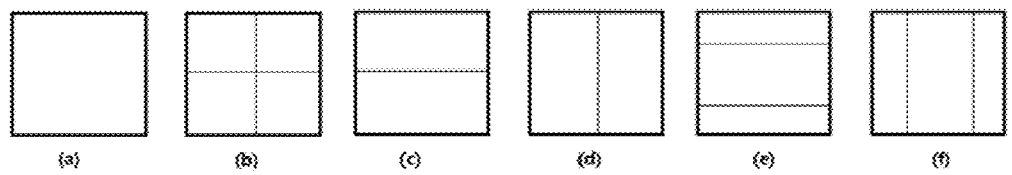
FIG. 1 is a schematic diagram showing partition types of a block according to an embodiment of the present disclosure.

For clearer descriptions of the objectives, technical solutions and advantages in the present disclosure, the embodiments of the present disclosure are described in further detail hereinafter with reference to the accompanying drawings.

In the related art, during the transform, a preset transform pair (the transform pair includes a horizontal transform kernel and a vertical transform kernel) is selected, and subblocks obtained by partitioning the current block are subjected to transform to acquire a transform coefficient. Correspondingly, an inverse transform corresponding to the transform is performed at a decoding device, i.e., selecting the preset transform pair used in the coding, and performing the inverse transform on the subblocks obtained by partitioning the current block to acquire residual data corresponding to the subblocks.

In this way, because the same subblock is transformed using different transform pairs, the compression effect is quite different, the transforms of all subblocks by using the same preset transform pair may result in poor coding and decoding performance.

The present disclosure provides a coding method and a decoding method. The coding method may be performed by a coding device. The decoding method may be performed a decoding device. Further, the coding device or the decoding device may be a device capable of coding and/or decoding video data, such as a server, a computer, or a mobile phone.

A processor, a memory, a transceiver, and the like may be disposed in the coding device or the decoding device. The processor may be configured to code and/or decode data. The memory may be configured to store data required for and data generated in a coding and/or decoding process. The transceiver may be configured to receive and transmit data, for example, to acquire the video data.

Concepts possibly involved in the embodiments of the present disclosure are explained first before the embodiments are described.

Transform Kernel:

In video coding, transform is an indispensable phase for video data compression, and enables energy of signals to be more concentrated. In addition, a transform technique based on discrete cosine transform (DCT)/discrete sine transform (DST) has been a mainstream transform technique of video coding. Each of the DCT and the DST specifically includes a plurality of transform kernels based on different basis functions. The basis functions of three commonly-used transform kernels are given in Table 1.

TABLE 1

| Type of transform kernel | Basic function $T_i(j)$, $i, j = 0, 1, \ldots, N - 1$ |
| --- | --- |
| DCT2 | $T_i(j) = \omega_0 \cdot \sqrt{\dfrac{2}{N}} \cdot \cos\left(\dfrac{\pi \cdot i \cdot (2j+1)}{2N}\right)$, in which $\omega_0 = \begin{cases} 1, & i \neq 0 \\ \sqrt{\dfrac{2}{N}}, & i = 0 \end{cases}$ |
| DCT8 | $T_i(j) = \sqrt{\dfrac{4}{2N+1}} \cdot \cos\left(\dfrac{\pi \cdot (2i+1) \cdot (2j+1)}{4N+2}\right)$ |
| DST7 | $T_i(j) = \sqrt{\dfrac{4}{2N+1}} \cdot \sin\left(\dfrac{\pi \cdot (2i+1) \cdot (j+1)}{2N+1}\right)$ |

Forward transform and inverse transform:

In video coding, a transform process includes a forward transform and an inverse transform, which are also referred to as a forward transform and a backward transform. Forward transform means that a two-dimensional residual signal (a residual coefficient) is converted to a two-dimensional spectrum signal (a transform coefficient) with energy more concentrated and then the transform coefficient is quantized, such that a high-frequency component is effectively removed and intermediate-frequency and low-frequency components are retained, thereby achieving the effect of compression. It is expressed in a matrix as formula (1):

$$F = B \cdot f \cdot A^T \quad (1),$$

wherein M represents a width of a residual block, N represents a height of the residual block, f represents an original residual signal of N*M dimensions, and F represents a frequency-domain signal of N*M dimensions. A and B represent an M*M-dimensional transform matrix and an N*N-dimensional transform matrix respectively, both of which satisfy orthogonality.

Inverse transform, also called reverse transform, is an inverse process of forward transform. That is, the frequency-domain signal F is converted to a time-domain residual signal f by orthogonal transform matrices A and B. It is expressed in a matrix as formula (2):

$$f = B^T \cdot F \cdot A \quad (2)$$

Horizontal transform and vertical transform:

In a transform phase of video coding, a two-dimensional residual signal is input. As shown in formula (3), if $X = A \cdot f^T$, $F = B \cdot X^T$.

$$F = B \cdot f \cdot A^T = B \cdot (A \cdot f^T)^T \quad (3)$$

Therefore, the forward transform of one two-dimensional residual signal is realized by one-dimensional forward transform twice. Upon the first forward transform, an M*N signal X is acquired and a correlation between pixels in a horizontal direction of the two-dimensional residual signal is canceled. Therefore, the first forward transform is referred to as a horizontal transform, and A is referred to as a horizontal transform matrix. Upon the second forward transform, a correlation between pixels in a vertical direction of the two-dimensional residual signal is canceled. Therefore, the second forward transform is referred to as a vertical transform, and B is referred to as a vertical transform matrix.

Transform Pair:

In a next-generation video coding standard, a transform unit (TU) may be a rectangular block. Therefore, M is not necessarily equal to N, and thus the dimensions of A and B are not necessarily equal. In addition, the next-generation video coding standard supports that A and B are not transform matrices produced by the same transform kernel. Thus, there is a transform pair {H, V} composed of transform kernels corresponding to A and B respectively in the transform, where H is referred to as a horizontal transform kernel and V is referred to as a vertical transform kernel.

Block Partition:

In high-efficiency video coding (HEVC), a 64*64 coding tree unit (CTU) is recursively partitioned into coding units (CU) using a quadtree. Whether to use intra-frame coding or inter-frame coding is determined at a leaf node CU level. The CU is further partitioned into two or four prediction units (PU), and the same prediction information is used in the same PU. After a residual signal is acquired upon completion of prediction, one CU is further partitioned into a plurality of TUs using the quad-tree.

Figure 2:
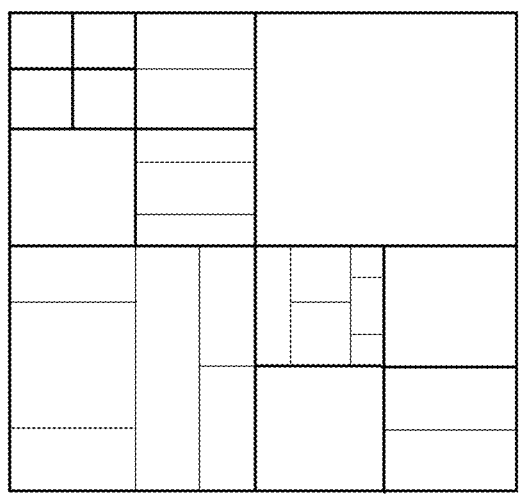
FIG. 2 is a schematic diagram showing that a CTU is partitioned into CUs according to an embodiment of the present disclosure.

However, in newly-proposed versatile video coding (VVC), a block partition technology has changed greatly. An original partition mode is replaced with a binary-tree/triple-tree/quad-tree (BT/TT/QT)) hybrid partition structure, the original concepts of CU, PU, and TU are canceled, and a more flexible partition mode of the CU is supported. The CU is subjected to square or rectangular partitioning. The CTU is firstly subjected to quad-tree partitioning, and then each of leaf nodes acquired from quad-tree partitioning is further subjected to binary-tree partitioning and triple-tree partitioning. That is, totally five partitioning schemes are available: quad-tree partitioning, horizontal binary-tree partitioning, vertical binary-tree partitioning, horizontal triple-tree partitioning and vertical triple-tree partitioning, as shown in FIG. 1, which shows the five partitioning schemes. In FIG. 1, (a) represents no partitioning, (b) represents quad-tree partitioning, (c) represents horizontal binary-tree partitioning, (d) represents vertical binary-tree partitioning, (e) represents horizontal triple-tree partitioning and (f) represents vertical triple-tree partitioning. As shown in FIG. 2, an exemplary diagram showing that one CTU is partitioned into CUs is provided.

Figure 3:
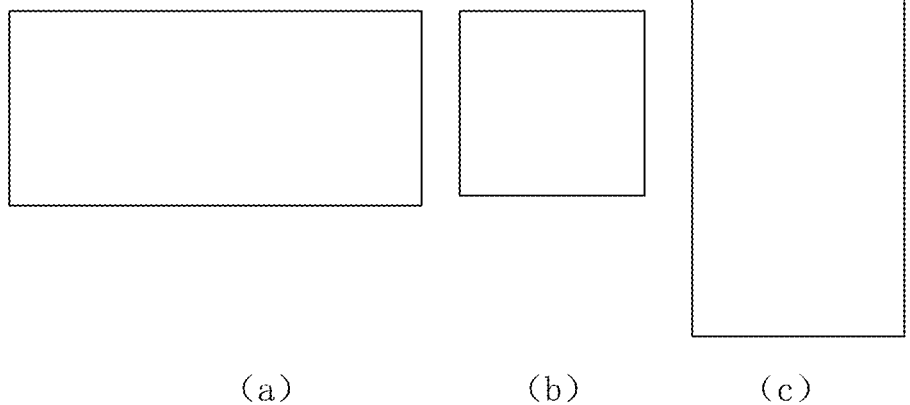
FIG. 3 is a schematic diagram showing three commonly-used blocks according to an embodiment of the present disclosure.

Therefore, based on the partition schemes, the block usually has three shapes as shown in FIG. 3. In FIG. 3, (a) represents a block whose width is greater than its height, (b) represents a block whose width is equal to its height, and (c) represents a block whose width is smaller than its height.

Figure 4:
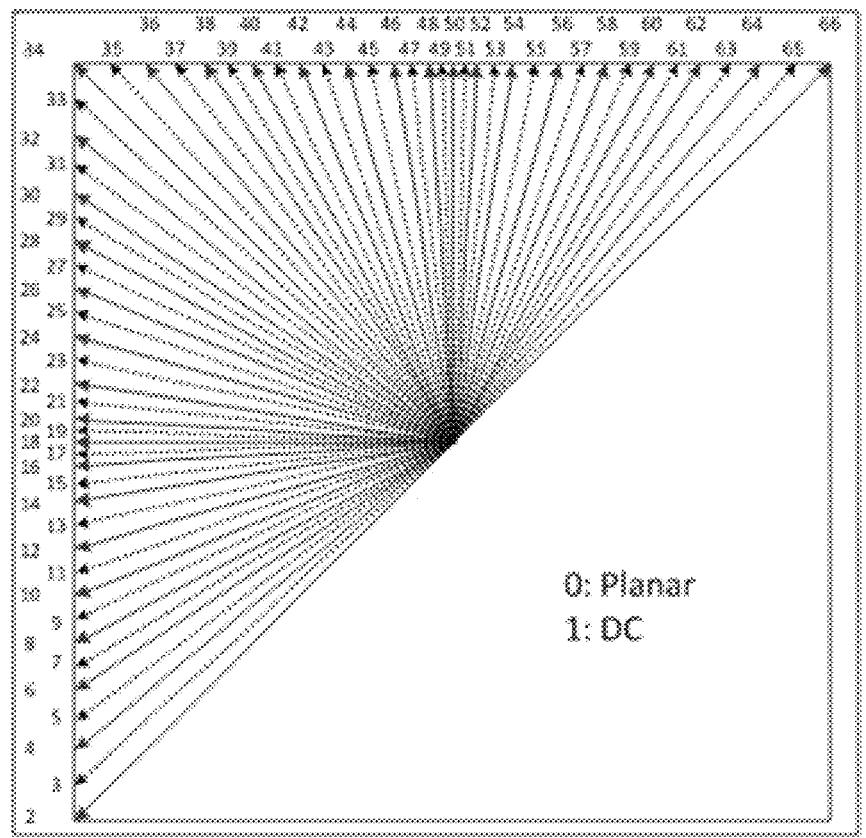
FIG. 4 is a schematic diagram of directions when intra prediction is performed according to an embodiment of the present disclosure.

Intra Prediction:

Intra prediction means that considering a strong spatial-domain correlation between adjacent blocks in an image, a currently uncoded block is predicted by using surrounding pixels, which have been reconstructed, as reference pixels. Therefore, only a residual signal (an original signal-a prediction signal) needs to be subjected to subsequent coding, instead of coding the original signal. In this way, the spatial-domain redundancy is effectively removed and the compression efficiency of a video signal is greatly improved. In addition, in intra prediction, more densely arranged angles achieve better the prediction effects. FIG. 4 shows a diagram of angular directions when intra prediction is performed in 67 intra prediction modes given by VVC, wherein the number of intra prediction modes is increased to 65 from 33 of HEVC. A mode number 0 indicates a planar mode; a mode number 1 indicates s a DC mode (the DC mode means that predicted pixels of the current block are the average of reference pixels), black solid lines represent the angular directions (2, 4, 6, 8, . . . , 64, 66) of original HEVC, and dashed lines represent added angular directions (3, 5, 7, 9, . . . , 63, 65). With the denser angular directions, boundaries of any direction in a natural video may be more effectively captured, and more reference information may be used for rate-distortion cost selection, such that a more suitable intra prediction mode is found to predict the current block more accurately. Thus, a prediction block is closer to the original block, and fewer bits need to be transmitted for coding the current block, achieving higher coding performance. When intra prediction coding is performed, these 67 intra-frame modes are applied to coded blocks of all sizes, including a luma component and a chroma component.

In FIG. 4, where the mode number of the intra prediction mode is 2 to 34, an angle between an angular direction and a horizontal rightward direction is −45 degrees to 45 degrees; and where the mode number of the intra prediction mode is 35 to 66, the angle between the angular direction and the horizontal rightward direction is −135 degrees to 45 degrees.

It should be noted that in a plane rectangular coordinate system, the horizontal rightward direction is a positive direction of the x-axis, and a vertical upward direction is a positive direction of the y-axis. In this way, an angle formed by a ray with the origin as a vertex (the ray is in a direction distal from the origin) in each of a first quadrant and a second quadrant and the positive direction of the x-axis is a positive, and an angle formed by a ray with the origin as a vertex (the ray is in the direction distal from the origin) in each of a third quadrant and a fourth quadrant and the positive direction of the x-axis is negative. For example, an angle between the horizontal rightward direction and the axis of symmetry (in the direction distal from the origin) in the fourth quadrant is −45 degrees.

Wide-Angle Intra Prediction:

For rectangular blocks, a wide-angle prediction mode based on block shapes is introduced to replace some traditional intra prediction modes. The original mode numbers are still used in the replacement mode, in this way, there are still 65 angle modes in total, but they may be adjusted based on different shapes. The details are shown in FIG. 5.

Figure 5:
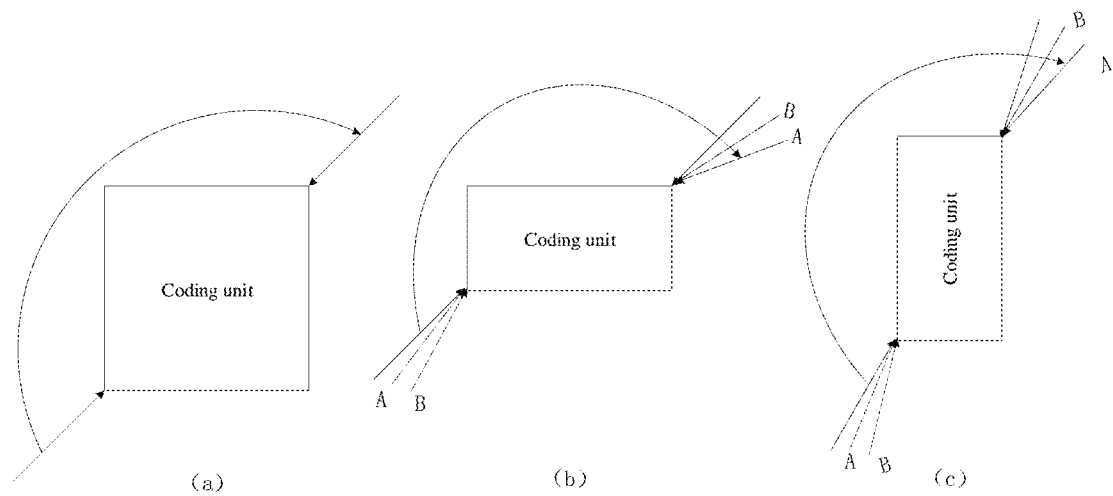
FIG. 5 is a schematic diagram of adjustment based on a block shape according to an embodiment of the present disclosure.

In FIG. 5, (a) shows a square block for which the angle direction is just clockwise rotated from 45 degrees to −135 degrees, and thus no adjustment is required.

In FIG. 5, (b) shows a block whose width is greater than its height, and the following adjustment needs to be made. That is, several angles at the lower left corners are replaced with several angles greater than −135 degrees at the upper right corner.

In FIG. 5, (c) shows a block whose width is less than its height, and the following adjustment needs to be made. That is, several angles at the upper right corners are replaced with several angles less than 45 degrees at the lower left corner.

A mapping relationship of the specific wide-angle prediction modes is shown in Table 2:

TABLE 2

| Width (W)/height (H) ratio | Intra prediction mode (mode number) to be replaced |
| --- | --- |
| W/H == 16 | Modes 12, 13, 14, 15 |
| W/H == 8 | Modes 12, 13 |
| W/H == 4 | Modes 2, 3, 4, 5, 6, 7, 8, 9, 10, 11 |
| W/H == 2 | Modes 2, 3, 4, 5, 6, 7, |
| W/H == 1 | None |
| W/H == 1/2 | Modes 61, 62, 63, 64, 65, 66 |
| W/H == 1/4 | Mode 57, 58, 59, 60, 61, 62, 63, 64, 65, 66 |
| W/H == 1/8 | Modes 55, 56 |
| W/H == 1/16 | Modes 53, 54, 55, 56 |

Figure 6:
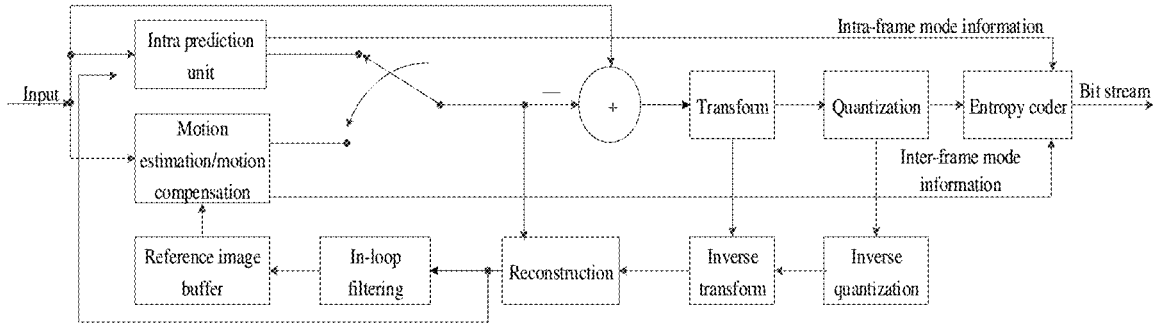
FIG. 6 is a schematic diagram of coding according to an embodiment of the present disclosure.

An embodiment of the present disclosure provides a common coding frame. As shown in FIG. 6, a complete video coding method generally includes prediction, transform, quantization, entropy coding, in-loop filtering and the like. The prediction specifically includes intra prediction and inter prediction. The intra prediction means that considering a strong spatial-domain correlation between adjacent blocks in an image, a currently uncoded block is predicted by using surrounding pixels, which have been reconstructed, as reference pixels. Therefore, only a residual signal (an original signal-a prediction signal) needs to be subjected to subsequent coding, instead of coding the original signal. As a result, the spatial-domain redundancy is effectively removed and the compression efficiency of a video signal is greatly improved. The inter prediction means that by using a time-domain correlation of video signals, pixels of a current image are predicted with pixels of an adjacent coded image to achieve the purpose of removing the time-domain redundancy of a video. In inter prediction, due to a strong time-domain correlation of videos, that is, two frames of images adjacent in the time domain have many similar image blocks, the image blocks of the current frame are often subjected to motion search in the adjacent reference image to find a block that best matches the current block as a reference block. Due to a high similarity and a very small difference value between the reference block and the current block, the bit rate overhead of coding the difference value is usually much lower than the bit rate overhead caused by directly coding the pixel value of the current block.

Figure 7:
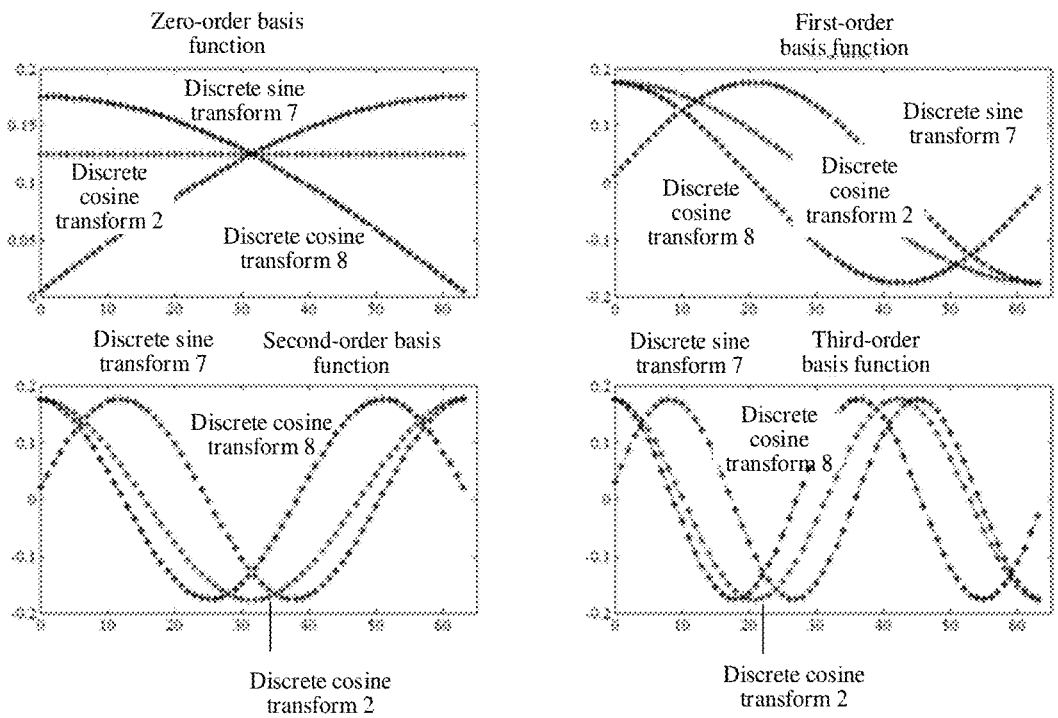
FIG. 7 is a schematic diagram of a distributed signal according to an embodiment of the present disclosure.

In the transform process, for the same TU (which may also be referred to as a residual block or a current block), when different transform pairs are used to compress the residual block, the compression effects are quite different. This is determined by a basis function of the transform kernel itself. As shown in FIG. 7, corresponding to the basis functions of three transform kernels, i.e., DCT2, DST7, and DCT8, input signal bits are 64 points. It can be seen from a zero-order basis function in the figure that DCT2 has a relatively stronger energy concentration effect on uniformly distributed signals, and a direct current component formed is a multiple of the average value of the input signals. DST7 has a relatively stronger energy concentration effect on input signals with ascending amplitudes. DCT8 has a relatively stronger energy concentration effect on input signals with descending amplitudes.

Figure 8:
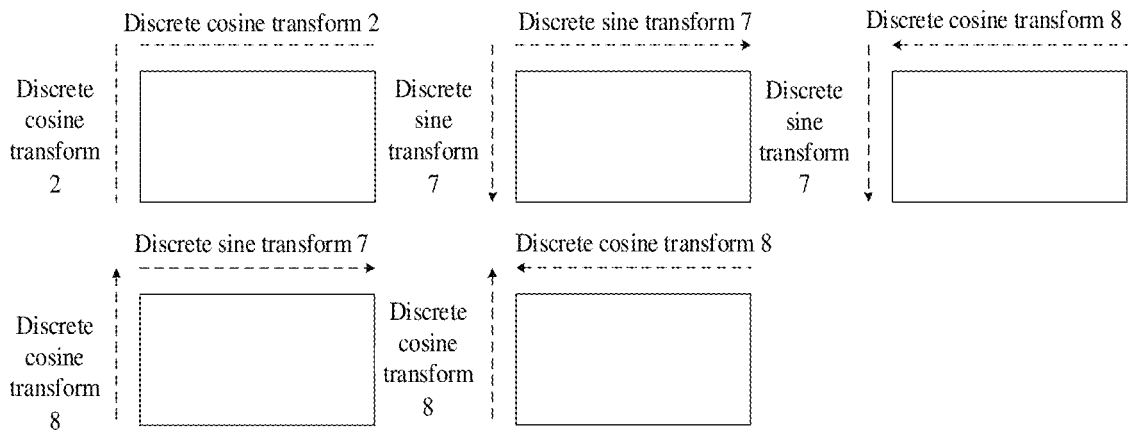
FIG. 8 is a schematic diagram of residual data distribution according to an embodiment of the present disclosure.

For more intuitively experiencing relationships between different transform kernels and residual properties, as shown in FIG. 8, five different horizontal and vertical transform pairs represent different types of residual distribution. The transform kernel type {DCT2, DCT2} represents that the residual of the TU is uniformly distributed, and the transform kernel type {DST7, DST7} represents that the residual distribution of the TU increases sequentially from left to right and from top to bottom, and that the residual of the TU is mainly distributed at the lower right corner of the TU. Similarly, {DCT8, DST7} represents that the residual is mainly distributed at the lower left corner of the TU, {DST7, DCT8} represents that the residual is mainly distributed at the upper right corner of the TU, and {DCT8, DCT8} represents that the residual is mainly distributed at the upper left corner of the TU.

An embodiment of the present disclosure provides a decoding method. A flowchart of this method may be shown in FIG. 9.

In step 901, a decoding device acquires coded data of a current block.

In practice, where coded data needs to be decoded, the decoding device acquires the coded data, then acquires the coded data of the current block by performing entropy decoding on the coded data and performing inverse quantization on an entropy decoding result.

In step 902, the decoding device determines size information and shape information of subblocks based on subblock partition information of the current block when the current block satisfies a subblock partition condition and it is determined, based on the coded data of the current block, that the current block activates intra subblock partition.

The subblock partition information indicates how to partition the current block. For example, for an 8*4 current block, it may be horizontally partitioned into two 8*2 subblocks.

In practice, in response to acquiring the current block, the decoding device may determine whether the current block satisfies the subblock partition condition; check from the coded data of the current block whether a flag bit of intra subblock partitioning is a preset flag when the current block satisfies the subblock partition condition; determine that the current block activates intra subblock partitioning when the flag position is the preset flag; or determine that the current block does not activate the intra subblock partitioning when the flag bit is not the preset flag.

At the decoding device, when it is determined that the current block activates intra subblock partition, the subblock partition information of the current block is acquired from the coded data of the current block; then subblocks are acquired by partitioning the current block based on the subblock partition information of the current block; and the number of pixels of each subblock of the current block in a height direction (i.e., a height of each subblock) is determined, and the number of pixels in a width direction (i.e., a width of each subblock) is determined. In this way, the size information of the subblocks is acquired. The shape information of the subblocks may be then determined based on the heights and widths of the subblocks. The shape information means that the height of each subblock is greater than the width, the height of each subblock is less than the width, and the height of each subblock is equal to the width.

In some possible embodiments of the present disclosure, the subblock partition condition is that the current block is a luma block and the height and the width of the current block are both less than or equal to a third value, and the current block is a single-line reference when being subjected to intra prediction and the number of pixels included in the current block is greater than a fourth value.

The third value may be preset and stored in the decoding device. The third value may be 64. The current block being the single-line reference during the intra prediction means that only one line is referenced during the intra prediction of the current block. The fourth value may be preset and stored in the decoding device. The fourth value may be 16.

In step 903, the decoding device determines, based on the size information and shape information of each subblock, a transform pair corresponding to the subblock. Determining, based on the size information and shape information of each subblock, the transform pair corresponding to the subblock includes: determining DST7 as a horizontal transform kernel in the transform pair corresponding to the subblock when a width of the subblock satisfies a first dimension constraint condition and a shape of the subblock satisfies a first condition; and determining DST7 as a vertical transform kernel in the transform pair corresponding to the subblock when a height of the subblock satisfies a second dimension constraint condition and the shape of the subblock satisfies a second condition.

The first dimension constraint condition is that the width is greater than or equal to the first value, and less than or equal to the second value; the first condition is that the width is less than or equal to the height; the second dimension constraint condition is that the height is greater than or equal to the first value, and less than or equal to the second value; and the second condition is that the width is greater than or equal to the height. Alternatively, the first dimension constraint condition is that the width is greater than or equal to the first value, and less than or equal to the second value; the second dimension constraint condition is that the height is greater than or equal to the first value, and less than or equal to the second value; the first condition is that the width is less than or equal to the height; and the second condition is that the width is greater than the height.

The first value and the second value may be preset and stored in the decoding device. The first value may be 4, and the second value may be 16. One transform pair includes one horizontal transform kernel and one vertical transform kernel.

In practice, each subblock of the current block is processed as follows.

The decoding device may determine whether the width of the subblock satisfies the first dimension constraint condition and whether the shape of the subblock satisfies the first condition; and determine whether the height of the subblock satisfies the second dimension constraint condition and whether the shape of the subblock satisfies the second condition. DST7 is determined as the horizontal transform kernel in the transform pair corresponding to the subblock when the width of the subblock satisfies the first dimension constraint condition and the shape of the subblock satisfies the first condition. DST7 is determined as the vertical transform kernel in the transform pair corresponding to the subblock when the height of the subblock satisfies the second dimension constraint condition and the shape of the subblock satisfies the second condition.

In addition, in some possible embodiments of the present disclosure, DCT2 is determined as the horizontal transform kernel in the transform pair corresponding to the subblock when the width of the subblock fails to satisfy the first dimension constraint condition and/or the shape of the subblock fails to satisfy the first condition. DCT2 is determined as the vertical transform kernel in the transform pair corresponding to the subblock when the height of the subblock fails to satisfy the second dimension constraint condition and/or the shape of the subblock fails to satisfy the second condition.

In practice, DCT2 is determined as the horizontal transform kernel in the transform pair corresponding to the subblock when at least one of the cases where the width of the subblock fails to satisfy the first dimension constraint condition and the shape of the subblock fails to satisfy the first condition is true. DCT2 is determined as the vertical transform kernel in the transform pair corresponding to the subblock when at least one of the cases that the height of the subblock fails to satisfy the second dimension constraint condition and the shape of the subblock fails to satisfy the second condition is true.

In this way, after the horizontal transform kernel and vertical transform kernel of the subblock are determined, the horizontal transform kernel and the vertical transform kernel may form a transform pair corresponding to the subblock. For any subblock, the transform pair can be determined by the above fashion, thus, the transform pairs corresponding to subblocks can be determined.

In step 904, the decoding device performs an inverse transform on inversely quantized data of the subblocks based on the transform pairs corresponding to the subblocks.

In practice, after the transform pairs corresponding to the subblocks are determined, the subblocks are subjected to inverse transform by the corresponding transform pairs to acquire residual data corresponding to the subblocks. Then, pixel values of pixels in a reconstructed area around the current block are used to construct prediction signals of the subblocks according to an intra prediction mode used during coding. For each subblock, reconstruction information of the subblock is acquired by adding up the residual data of the subblock and the prediction signal. In this way, the reconstruction information of the subblocks can be acquired, and the reconstruction information corresponding to the current block may be acquired by merging the reconstruction information of the subblocks.

In this way, the decoding of the current block is completed. Each current block is processed in accordance with the process shown in FIG. 9, so as to decode a whole segment of video data.

It should be noted that, in the aforementioned embodiment, after the current block is partitioned, the subblocks have the same width and the same height.

Figure 9:
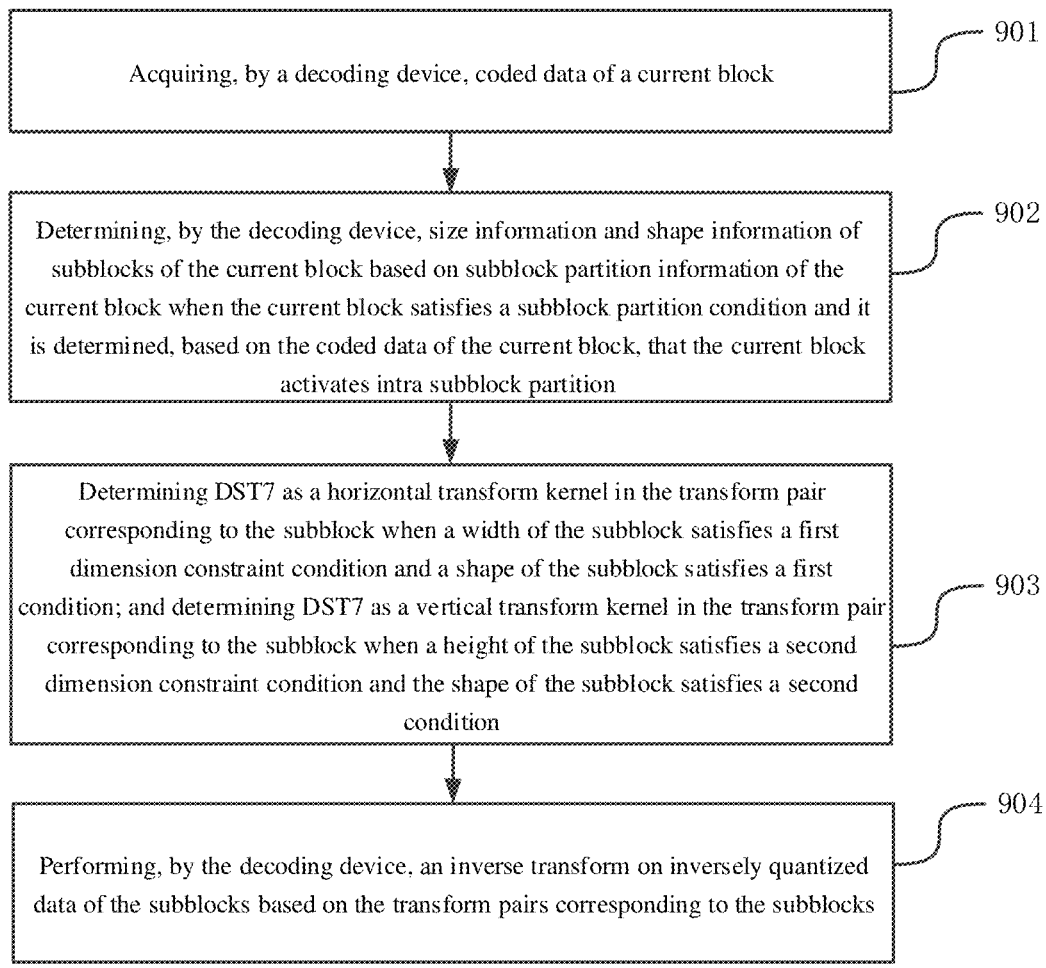
FIG. 9 is a flowchart of a decoding method according to an embodiment of the present disclosure.
Figure 10:
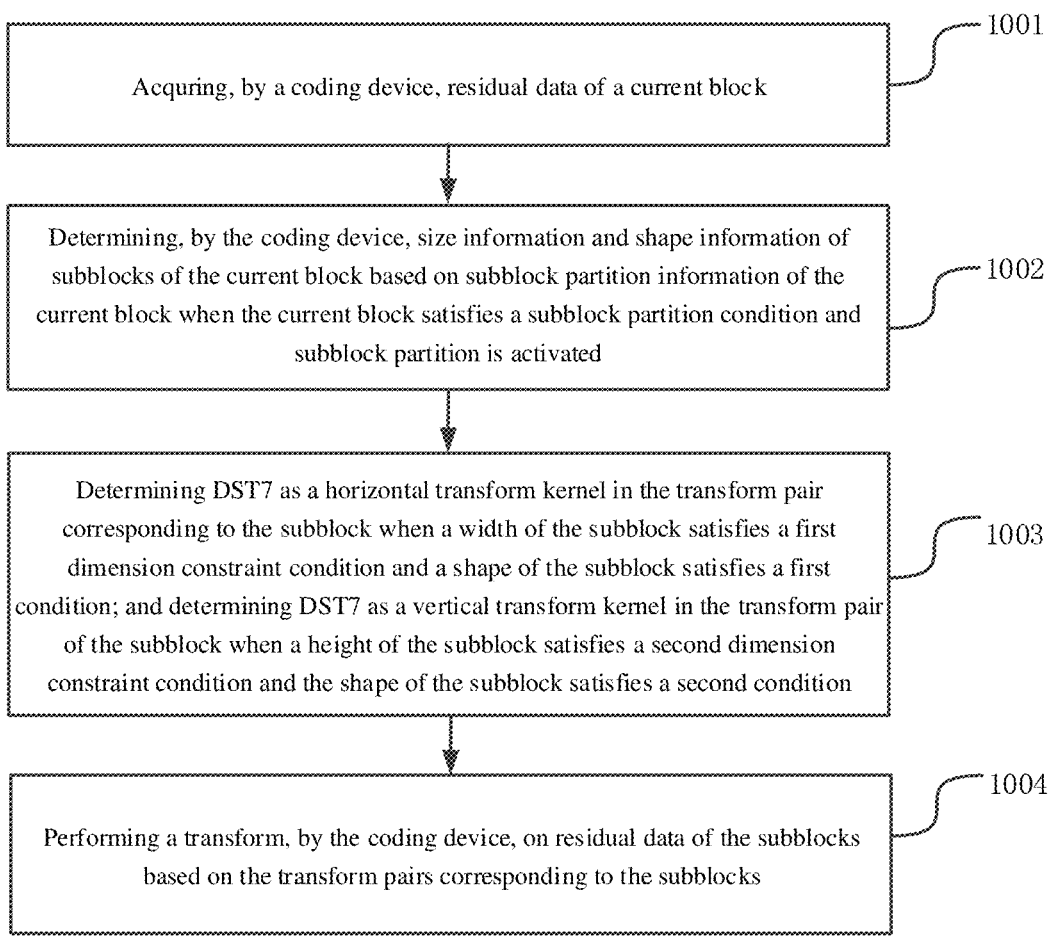
FIG. 10 is a flowchart of a coding method according to an embodiment of the present disclosure.

Corresponding to the decoding method shown in FIG. 9, as shown in FIG. 10, an embodiment of the present disclosure further provides a coding process. The process may include the following steps.

In step 1001, a coding device acquires residual data of a current block.

In practice, the coding device performs intra prediction first when coding video data, to acquire residual data (the method for acquiring the residual data is consistent with the existing video coding standards, which is not repeated). The residual data is taken as the residual data of the current block to be processed.

In step 1002, the coding device determines size information and shape information of subblocks of the current block based on subblock partition information of the current block when the current block satisfies a subblock partition condition and intra subblock partitioning is activated.

The subblock partition information indicates how to partition the current block. For example, for an 8*4 current block, it may be horizontally partitioned into two 8*2 subblocks.

In practice, in response to acquiring the residual data of the current block, the coding device may determine whether the current block satisfies the subblock partition condition; and determine whether the intra subblock partitioning is activated when the subblock partition condition is satisfied. When a switch for intra subblock partitioning is powered on, it is indicated that the intra subblock partitioning may be activated and the current block can be partitioned, the heights and widths of the subblocks acquired by partitioning the current block are then determined. The width of the current block is the number of pixels contained in the current block in its width direction, the height of the current block is the number of pixels contained in the current block in its height direction, the width of each subblock is the number of pixels contained in the subblock in its width direction, and the height of each subblock is the number of pixels contained in the subblock in its height direction. In this way, the size information of each subblock can be acquired. For a current block of M*N, M represents the width of the current block, and N represents the height of the current block.

The shape information of the subblocks may be then determined based on the heights and widths of the blocks. The shape information means that the height of the subblock is greater than, less than or equal to the width of the subblock.

In some possible embodiments of the present disclosure, the subblock partition condition is that the current block is a luma block and the height and the width of the current block are both less than or equal to a third value, and the current block is a single-line reference when being subjected to intra prediction and the number of pixels included in the current block is greater than a fourth value.

The third value may be preset and stored in the coding device. The third value may be 64. The current block being the single-line reference during the intra prediction means that only one line is referenced during the intra prediction of the current block. The fourth value may be preset and stored in the coding device. The fourth value may be 16.

In step 1003, the coding device determines a transform pair corresponding to each subblock based on the size information and shape information of the subblock. Determining the transform pair corresponding to each subblock based on the size information and shape information of the subblock includes: determining DST7 as a horizontal transform kernel in the transform pair corresponding to the subblock when a width of the subblock satisfies a first dimension constraint condition and a shape of the subblock satisfies a first condition; and determining DST7 as a vertical transform kernel in the transform pair corresponding to the subblock when a height of the subblock satisfies a second dimension constraint condition and the shape of the subblock satisfies a second condition.

Each subblock of the current block is processed as follows.

The coding device may determine whether the width of the subblock satisfies the first dimension constraint condition and whether the shape of the subblock satisfies the first condition; and determine whether the height of the subblock satisfies the second dimension constraint condition and whether the shape of the subblock satisfies the second condition. DST7 is determined as the horizontal transform kernel in the transform pair corresponding to the subblock when the width of the subblock satisfies the first dimension constraint condition and the shape of the subblock satisfies the first condition. DST7 is determined as the vertical transform kernel in the transform pair corresponding to the subblock when the height of the subblock satisfies the second dimension constraint condition and the shape of the subblock satisfies the second condition.

In addition, in some possible embodiments of the present disclosure, DCT2 is determined as the horizontal transform kernel in the transform pair corresponding to the subblock when the width of the subblock fails to satisfy the first dimension constraint condition and/or the shape of the subblock fails to satisfy the first condition. DCT2 is determined as the vertical transform kernel in the transform pair corresponding to the subblock when the height of the subblock fails to satisfy the second dimension constraint condition and/or the shape of the subblock fails to satisfy the second condition.

In practice, DCT2 is determined as the horizontal transform kernel in the transform pair corresponding to the subblock when at least one of the cases where the width of the subblock fails to satisfy the first dimension constraint condition and the shape of the subblock fails to satisfy the first condition is true. DCT2 is determined as the vertical transform kernel in the transform pair corresponding to the subblock when at least one of the cases where the height of the subblock fails to satisfy the second dimension constraint condition and the shape of the subblock fails to satisfy the second condition is true.

In this way, when the horizontal transform kernel and vertical transform kernel of the subblock are determined, the horizontal transform kernel and the vertical transform kernel may form a transform pair corresponding to the subblock. For any subblock, the transform pair can be determined by the above fashion, thus, the transform pairs corresponding to each subblock can be determined.

In step 1004, the coding device performs a transform on residual data of the subblocks based on the transform pairs corresponding to the subblocks.

In practice, in response to determining the transform pairs corresponding to the subblocks, the coding device acquires a transform coefficient corresponding to the subblock by transforming each subblock based on the transform pair corresponding to the subblock; then acquires a quantization coefficient by quantizing the transform coefficient; and acquires coded data corresponding to the subblock by entropy coding the quantization coefficient.

In this way, the coded data corresponding to the current block can be acquired based on the above processing for each subblock, such that the coding of the current block is completed. Each current block may be processed in accordance with the process shown in FIG. 10, so as to code a whole segment of video data.

In some possible embodiments of the present disclosure, in order to quickly perform subblock partitioning on the current block by the decoding device, the following processing may be performed: acquiring the subblock partition information of the current block when the current block satisfies the subblock partition condition; and adding the subblock partition information to coded data of the current block.

In practice, the coding device may acquire the subblock partition information of the current block when the current block satisfies the subblock partition condition; and add the subblock partition information to the coded data of the current block. In this way, the decoding device may subsequently acquire, from the coded data of the current block, the subblock partition information of the current block for decoding.

In addition, in the embodiments of the present disclosure, the process for acquiring the subblock partition information by the coding device is also provided.

The coding device may partition the current block horizontally or vertically into several small subblocks. For example, for a 16*8 current block, it may be partitioned into four 16*2 subblocks horizontally or into four 4*8 subblocks vertically. However, for a 4*8 block, it may be partitioned into two 4*4 subblocks or two 2*8 subblocks. It may be noted that the number of subblocks can be only 2 (for 4*8, 8*4 subblocks). In addition, each subblock contains at least 16 pixels, such that the 4*4 block is not partitioned again, and there is no need to make corresponding grammar declarations at the coding device and the decoding device. The specific partitioning rules are shown in Table 3. As for whether to partition horizontally or vertically, it needs to be determined by the coding device based on an RDO criterion. In order to save the coding time, the partitioned intra subblocks share an intra prediction mode of the current block (that is, the subblocks obtained by partitioning the current block have the same intra prediction mode as the current block).

TABLE 3

|   | Horizontal | Vertical |
|---|---|---|
| w | W | $\begin{cases} \dfrac{W}{4}, \text{if } \dfrac{W}{4} * H \geq 16 \\ \dfrac{16}{H}, \text{if } \dfrac{W}{4} * H < 16 \end{cases}$ |
| h | $\begin{cases} \dfrac{H}{4}, \text{if } \dfrac{H}{4} * W \geq 16 \\ \dfrac{16}{W}, \text{if } \dfrac{H}{4} * W < 16 \end{cases}$ | H |
| K | $\dfrac{H}{h}$ | $\dfrac{W}{w}$ |

Figure 11:
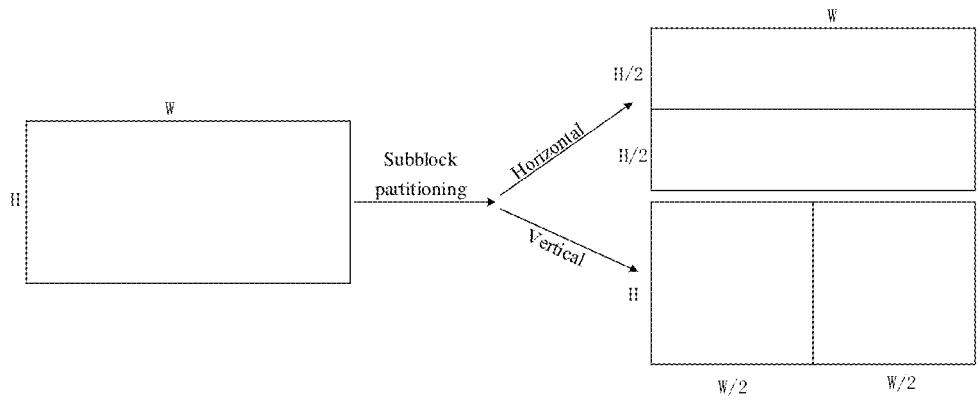
FIG. 11 is a schematic diagram of partitioning subblocks according to an embodiment of the present disclosure.

In Table 3, w represents the width of each subblock, h represents the height of each subblock, K represents the number of subblocks that may be partitioned, W represents the width of the current block, and H represents the height of the current block. The current block may be partitioned horizontally and vertically according to Table 3. For example, as shown in FIG. 11, for an 8*4 current block, it may be horizontally partitioned into two 8*2 subblocks, or be vertically partitioned into two 4*4 subblocks.

The process of determining the subblock partition information based on the RDO criterion may include: determining a plurality of split types of the current block first according to Table 3; then performing coding based on each split type; and then performing decoding to determine the split type with the least rate-distortion cost as the final split type of the current block. In this way, the subblock partition information of the current block is acquired.

In the embodiments of the present disclosure, at the coding device, the transform pairs corresponding to the subblocks are determined directly based on the size information and shape information of the subblocks of the current block; and the determined transform pairs are coded. Similarly, at the decoding device, the transform pairs corresponding to the subblocks are directly determined based on the size information and shape information of the subblocks of the current block; and the determined transform pairs are decoded. In this way, since the transform pairs are determined based on the size information and shape information, instead of using the same transform pair for all subblocks, the coding and decoding performance can be improved. Moreover, when the transform pairs are derived, only the heights and widths are used, such that the derivation is simpler, and the coding and decoding performance can be further improved.

Another embodiment of the present disclosure provides a decoding method. A flowchart of this method may be shown in FIG. 12.

In step 1201, a decoding device acquires coded data of a current block.

In practice, where coded data needs to be decoded, the decoding device acquires the coded data, then acquires the coded data of the current block by performing entropy decoding on the coded data and performing inverse quantization on an entropy decoding result.

In step 1202, when the current block satisfies a subblock partition condition and it is determined, based on the coded data of the current block, that the current block activates intra-subblock partition, the decoding device determines size information of subblocks based on subblock partition information of the current block.

The subblock partition information indicates how to partition the current block. For example, for an 8*4 current block, it may be horizontally partitioned into two 8*2 subblocks.

In practice, in response to acquiring the current block, the decoding device can determine whether the current block satisfies a subblock partition condition; check from the coded data of the current block whether a flag bit of intra subblock partitioning is a preset flag when the current block satisfies the subblock partition condition; determine that the current block activates intra subblock partitioning when the flag bit is the preset flag; or determine that the current block does not activate the intra subblock partitioning when the flag bit is not the preset flag.

At the decoding device, when it is determined that the current block activates intra subblock partition, the subblock partition information of the current block is acquired from the coded data of the current block; then subblocks are acquired by partitioning the current block based on the subblock partition information of the current block; and the number of pixels of each subblock of the current block in a height direction (i.e., a height of each subblock) is determined, and the number of pixels in a width direction (i.e., a width of each subblock) is determined. In this way, the size information of the subblocks is acquired. In addition, the content of a flag bit configured to indicate the intra prediction mode information may be acquired from the coded data of the current block, that is, the intra prediction mode information of the current block may be acquired.

In some possible embodiments of the present disclosure, the subblock partition condition is that the current block is a luma block and the height and the width of the current block are both less than or equal to a first preset value, and the current block is a single-line reference when being subjected to intra prediction and the number of pixels included in the current block is greater than a second preset value.

The first preset value may be preset and stored in the decoding device (the same as the third value as mentioned above). The first preset value may be 64. The current block being the single-line reference during the intra prediction means that only one line is referenced during the intra prediction of the current block. The second preset value may be preset and stored in the decoding device. The second preset value may be 16 (the same as the fourth value as mentioned above).

In step 1203, the decoding device determines, based on the size information and the intra prediction mode information of each subblock, a transform pair corresponding to the subblock. Determining, based on the size information and the intra prediction mode information of each subblock, the transform pair corresponding to the subblock includes: determining the transform pair corresponding to the intra prediction mode information of each subblock as the transform pair corresponding to the subblock when it is determined, based on the size information of the subblock, that the subblock fails to satisfy a dimension constraint condition.

The dimension constraint condition is that the width is not within a preset value range, and the height is not within the preset value range. The preset value range is (2, 32) (excluding 2 and 32). "Not within the preset value range" means being greater than 32 and/or less than 2.

In practice, each subblock of the current block is processed as follows:

for any subblock, the decoding device may determine whether the size information of the subblock satisfies the dimension constraint condition; determine a corresponding transform pair in corresponding relationships between the intra prediction mode information and the transform pairs by using the intra prediction mode information of the current block when the dimension constraint condition (the width is not within the preset value range and the height is not within the preset value range) is not satisfied; and determine this transform pair as the transform pair of the subblock.

In addition, in some possible embodiments of the present disclosure, when it is determined, based on the size information of the subblock, that the height of the subblock satisfies the dimension constraint condition and the width of the subblock fails to satisfy the dimension constraint condition, DCT2 is determined as a vertical transform kernel in the transform pair corresponding to the subblock, and a horizontal transform kernel in the transform pair corresponding to the intra prediction mode information of the subblock is determined as a horizontal transform kernel in the transform pair corresponding to the subblock. When it is determined, based on the size information of the subblock, that the width of the subblock satisfies the dimension constraint condition and the height of the subblock fails to satisfy the dimension constraint condition, DCT2 is determined as a horizontal transform kernel in the transform pair corresponding to the subblock, and a vertical transform kernel in the transform pair corresponding to the intra prediction mode information of the subblock is determined as a vertical transform kernel in the transform pair corresponding to the subblock. When it is determined based on the size information of each subblock that both the height and the width of the subblock satisfy the dimension constraint condition, DCT2 is determined as a horizontal transform kernel and a vertical transform kernel in the transform pair corresponding to the subblock.

In practice, when the height of the subblock satisfies the dimension constraint condition and the width of the subblock fails to satisfy the dimension constraint condition, DCT2 may be determined as the vertical transform kernel in the transform pair corresponding to each subblock. In addition, a transform pair corresponding to the intra prediction mode information of the current block may be directly determined from corresponding relationships between the intra prediction mode information and the transform pairs based on the intra prediction mode information. The horizontal transform kernel in this transform pair is determined as a horizontal transform kernel corresponding to the current block.

When the width of the subblock satisfies the dimension constraint condition and the height of the subblock fails to satisfy the dimension constraint condition, DCT2 may be determined as the horizontal transform kernel in the transform pair corresponding to each subblock. In addition, a transform pair corresponding to the intra prediction mode information of the current block may be directly determined from corresponding relationships between the intra prediction mode information and the transform pairs based on the intra prediction mode information. The vertical transform kernel in this transform pair is determined as a vertical transform kernel corresponding to the current block.

When both the height and the width of the subblock satisfy the dimension constraint condition, DCT2 is determined as the horizontal transform kernel and the vertical transform kernel in the transform pair corresponding to the subblock.

In this way, the transform pairs corresponding to the subblocks may be determined based on the above fashion.

In step 1204, the decoding device performs an inverse transform on inversely quantized data of the subblocks based on the transform pairs corresponding to the subblocks.

In practice, after the transform pairs corresponding to the subblocks are determined, the subblocks is subjected to inverse transform by the corresponding transform pairs to acquire residual data corresponding to the subblocks. Then, pixel values of pixels in a reconstructed area around the current block are used to construct prediction signals of the subblocks based on an intra prediction mode used during coding. For each subblock, reconstruction information of the subblock is acquired by adding up the residual data of the subblock and the prediction signal. In this way, the reconstruction information of the subblocks may be acquired, and the reconstruction information corresponding to the current block may be acquired by merging the reconstruction information of the subblocks.

In this way, the decoding of the current block is completed. Each current block is processed in accordance with the process shown in FIG. 12, so as to decode a whole segment of video data.

It should be noted that, in the aforementioned embodiment, after the current block is partitioned, the subblocks have the same width and the same height.

In step 1203, in some possible embodiments of the present disclosure, the transform pair corresponding to the intra prediction mode information of the subblock may be determined as the transform pair corresponding to the subblock in the following fashions.

In a first fashion, when the mode numbers of the intra prediction mode information of the subblock are 1, 33, 35, the transform pair corresponding to the subblock is determined as (DCT2, DCT2); when the mode numbers of the intra prediction mode information of the subblock are 0, 31, 32, 34, 36, 37, the transform pair corresponding to the subblock is determined as (DST7, DST7); when the mode numbers of the intra prediction mode information of the subblock are 2, 30, even numbers between 2 and 30, 39, 65, and odd numbers between 39 to 65, the transform pair corresponding to the subblock is determined as (DST7, DCT8); and when the mode numbers of the intra prediction mode information of the subblock are 3, 29, odd number between 3 and 29, 38, 66, and even numbers between 38 to 66, the transform pair corresponding to the subblock is determined as (DCT8, DST7).

In practice, corresponding relationships between intra prediction mode information and transform pairs are provided, as listed in Table 4:

TABLE 4

| Intra prediction mode information (mode number) | Transform pair | |
|---|---|---|
| | Horizontal transform kernel | Vertical transform kernel |
| 1, 33, 35 | DCT2 | DCT2 |
| 0, 31, 32, 34, 36, 37 | DST7 | DST7 |
| 2, 4, 6, . . . , 28, 30 39, 41, 43, . . . , 63, 65 | DST7 | DCT8 |
| 3, 5, 7, . . . , 27, 29 38, 40, 42, . . . , 64, 66 | DCT8 | DST7 |

In a second fashion, when the mode number of the intra prediction mode information of the subblock is 1, the transform pair corresponding to the subblock is determined as a first transform pair; when the mode numbers of the intra prediction mode information of the subblock are 0, 31, 32, 33, 34, 35, 36, 37, the transform pair corresponding to the subblock is determined as a second transform pair; when the mode numbers of the intra prediction mode information of the subblock are 2, 30, even numbers between 2 and 30, 39, 65, and odd numbers between 39 and 65, the transform pair corresponding to the subblock is determined as a third transform pair; and when the mode numbers of the intra prediction mode information of the subblock are 3, 29, odd number between 3 and 29, 38, 66, and even numbers between 38 and 66, the transform pair corresponding to the subblock is determined as a fourth transform pair.

In practice, corresponding relationships between intra prediction mode information and transform pairs are provided, as listed in Table 5:

TABLE 5

| Intra prediction mode information (mode number) | Transform pair |
|---|---|
| 1 | First transform pair |
| 0, 31, 32, 33, 34, 35, 36, 37 | Second transform pair |
| 2, 4, 6, ..., 28, 30<br>39, 41, 43, ..., 63, 65 | Third transform pair |
| 3, 5, 7, ..., 27, 29<br>38, 40, 42, ..., 64, 66 | Fourth transform pair |

In a third fashion, when the mode number of the intra prediction mode information of the subblock is 1, the transform pair corresponding to the subblock is determined as a first transform pair; when the mode number of the intra prediction mode information of the subblock is 0, the transform pair corresponding to the subblock is determined as a second transform pair; when the mode numbers of the intra prediction mode information of the subblock are 2, 34, even numbers between 2 and 34, 35, 65, and odd numbers between 35 and 65, the transform pair corresponding to the subblock is determined as a third transform pair; and when the mode numbers of the intra prediction mode information of the subblock are 3, 33, odd number between 3 and 33, 36, 66, and even numbers between 36 and 66, the transform pair corresponding to the subblock is determined as a fourth transform pair.

In practice, corresponding relationships between intra prediction mode information and transform pairs are provided, as listed in Table 6:

TABLE 6

| Intra prediction mode information (mode number) | Transform pair |
|---|---|
| 1 | First transform pair |
| 0 | Second transform pair |
| 2, 4, 6, ..., 28, 30, 32, 34<br>35, 37, 39, 41, 43, ..., 63, 65 | Third transform pair |
| 3, 5, 7, ..., 27, 29, 31, 33<br>36, 38, 40, 42, ..., 64, 66 | Fourth transform pair |

In a fourth fashion, when the mode number of the intra prediction mode information of the subblock is 1, the transform pair corresponding to the subblock is determined as a first transform pair; when the mode numbers of the intra prediction mode information of the subblock are 0, 3, 65, and odd numbers between 3 and 65, the transform pair corresponding to the subblock is determined as a second transform pair; when the mode numbers of the intra prediction mode information of the subblock are 2, 34, and even numbers between 2 and 34, the transform pair corresponding to the subblock is determined as a third transform pair; and when the mode numbers of the intra prediction mode information of the subblock are 36, 66, and even numbers between 36 and 66, the transform pair corresponding to the subblock is determined as a fourth transform pair.

In practice, corresponding relationships between intra prediction mode information and transform pairs are provided, as listed in Table 7:

TABLE 7

| Intra prediction mode information (mode number) | Transform pair |
|---|---|
| 1 | First transform pair |
| 0, 3, 5, 7, ..., 63, 65 | Second transform pair |
| 2, 4, 6, ..., 28, 30, 32, 34 | Third transform pair |
| 36, 38, 40, 42, ..., 64, 66 | Fourth transform pair |

It should be noted that in the Tables 4 to 7, the angle directions of the intra prediction modes with adjacent mode numbers are similar, and then the residual characteristics are similar. By using two different transform pairs for transform, the coding time can be saved, and suitable transform pairs may also be selected.

In some possible embodiments of the present disclosure, the first transform pair, the second transform pair, the third transform pair and the fourth transform pair may be combined in a plurality of fashions. Two possible combinations are given as below.

In a first combination, the first transform pair is (DCT2, DCT2), the second transform pair is (DST7, DST7), the third transform pair is (DST7, DCT2), and the fourth transform pair is (DCT2, DST7).

In a second combination, the first transform pair is (DCT2, DCT2), the second transform pair is (DST7, DST7), the third transform pair is (DST7, DCT8), and the fourth transform pair is (DCT8, DST7).

In some possible embodiments of the present disclosure, determining the transform pair corresponding to the intra prediction mode information of the subblock as the transform pair corresponding to the subblock should satisfy the following conditions. The practice is as follows:

determining the transform pair corresponding to the intra prediction mode information as the transform pair corresponding to each subblock when it is determined, based on the size information of the subblock, that the subblock fails to satisfy the dimension constraint condition and that the intra prediction mode information of the subblock satisfies an intra prediction mode range.

The intra prediction mode range may be preset, and stored in the decoding device. The intra prediction mode range includes intra prediction modes with mode numbers of 0, 1, and 31 to 37 (see Table 8 and Table 9); or the intra prediction mode range includes intra prediction modes with mode numbers of 0, and 1 (see Table 10); or the intra prediction mode range includes intra prediction modes with mode numbers of 0, 1, 3, 65, and odd numbers between 3 and 65 (see Table 11).

In practice, in response to acquiring the mode number of the intra prediction mode information of each subblock from the coded data, the decoding device may determine whether the mode number is within the intra prediction mode range; and directly determine a transform pair corresponding to the intra prediction mode information as the transform pair corresponding to the subblock from the corresponding relationships between the intra prediction mode information and the transform pairs when the mode number is within the intra prediction mode range.

In some possible embodiments of the present disclosure, when the mode number of the intra prediction mode information of the current block is not within the intra prediction mode range, the following several processes may be performed.

A ratio of a width to a height of each subblock is determined based on the size information of the subblock when it is determined, based on the size information of the subblock, that the subblock fails to satisfy the dimension constraint condition and that the intra prediction mode information of the subblock fails to satisfy the intra prediction mode range. A transform pair corresponding to the subblock is determined based on the ratio of the width to the height of the subblock and the intra prediction mode information of the subblock.

In practice, with respect to any subblock, in response to acquiring the mode number of the intra prediction mode information of the subblock from the coded data, the decoding device may determine whether the mode number is within the intra prediction mode range; determine a ratio of the width to the height of the subblock when the mode number is not within the intra prediction mode range; and determine a transform pair corresponding to the subblock based on the ratio of the width to the height of the subblock and the intra prediction mode information of the subblock.

In some possible embodiments of the present disclosure, when the mode number of the intra prediction mode information of the current block is not within the intra prediction mode range, the following several processing fashions may be employed.

In a first fashion, as listed in Table 8, the intra prediction mode range includes intra prediction mode information with mode numbers of 0, 1, and 31 to 37.

The width of the subblock is represented by w, and the height of the subblock is represented by h.

When the ratio of the width to the height of the subblock is 1 (i.e., w=h), the transform pair corresponding to the intra prediction mode information with mode numbers of 2, 4, 6, . . . , 30, 39, 41, 43, . . . , 65 is (DST7, DCT2) (the first ellipsis represents even numbers between 6 and 30, and the second ellipsis represents odd numbers between 43 and 65), that is, the transform pair corresponding to the subblock is (DST7, DCT2).

When the ratio of the width to the height of the subblock is 1 (i.e., w=h), the transform pair corresponding to the intra prediction mode information with mode numbers of 3, 5, 7, . . . , 29, 38, 40, 42, . . . , 66 is (DCT2, DST7) (the first ellipsis represents odd numbers between 7 and 29, and the second ellipsis represents even numbers between 42 and 66), that is, the transform pair corresponding to the subblock is (DCT2, DST7).

When the ratio of the width to the height of the subblock is greater than 1 (i.e., w>h), the transform pair corresponding to the intra prediction mode information with mode numbers of B+1, B+3, . . . , 30, 3, 5, B, 39, 41, 43, . . . , 65 is (DST7, DCT2) (the first ellipsis represents even numbers between B+3 and 30, the second ellipsis represents odd numbers between 5 and B, and the third ellipsis represents odd numbers between 43 and 65), that is, the transform pair corresponding to the subblock is (DST7, DCT2).

When the ratio of the width to the height of the subblock is greater than 1 (i.e., w>h), the transform pair corresponding to the intra prediction mode information with mode numbers of B+2, B+4, . . . , 29, 38, 40, . . . , 66, 2, 4, . . . , (B−1) is (DCT2, DST7) (the first ellipsis represents odd numbers between B+4 and 29, the second ellipsis represents even numbers between 40 and 66, and the third ellipsis represents even numbers between 4 and (B−1)), that is, the transform pair corresponding to the subblock is (DCT2, DST7).

When the ratio of the width to the height of the subblock is less than 1 (i.e., w<h), the transform pair corresponding to the intra prediction mode information with mode numbers of 2, 4, 6, . . . , 30, B+1, B+3, . . . , 66, 39, 41, . . . , B−2 is (DST7, DCT2) (the first ellipsis represents even numbers between 6 and 30, the second ellipsis represents even numbers between (B+3) and 66, and the third ellipsis represents odd numbers between 41 and B−2), that is, the transform pair corresponding to the subblock is (DST7, DCT2).

When the ratio of the width to the height of the subblock is less than 1 (i.e., w<h), the transform pair corresponding to the intra prediction mode information with mode numbers of 3, 5, . . . , 29, B, B+2, 65, 38, 40, . . . , (B−1) is (DCT2, DST7) (the first ellipsis represents odd numbers between 5 and 29, the second ellipsis represents odd numbers between (B+2) and 65, and the third ellipsis represents even numbers between 40 and (B−1), that is, the transform pair corresponding to the subblock is (DCT2, DST7).

TABLE 8

| | Intra prediction mode information (mode number) | Transform pair | |
|---|---|---|---|
| | | Horizontal transform kernel | Vertical transform kernel |
| | 1, 33, 35 | DCT2 | DCT2 |
| | 0, 31, 32, 34, 36, 37 | DST7 | DST7 |
| w = h | 2, 4, 6, ..., 30<br>39, 41, 43, ..., 65 | DST7 | DCT2 |
| w > h | B + 1, B + 3, ..., 30<br>3, 5, ..., B<br>39, 41, 43, ..., 65 | | |
| w < h | 2, 4, 6, ..., 30<br>B + 1, B + 3, ..., 66<br>39, 41, ..., B − 2 | | |
| w = h | 3, 5, 7, ..., 29<br>38, 40, 42, ..., 66 | DCT2 | DST7 |
| w > h | B + 2, B + 4, ..., 29<br>38, 40, ..., 66<br>2, 4, ..., (B − 1) | | |
| w < h | 3, 5, ..., 29<br>B, B + 2, ..., 65<br>38, 40, ..., (B − 1) | | |

In a second fashion, as listed in Table 9, the intra prediction mode range includes intra prediction mode information with mode numbers of 0, 1, and 31 to 37. The width of the subblock is represented by w, and the height of the subblock is represented by h.

When the ratio of the width to the height of the subblock is 1 (i.e., w=h), the transform pair corresponding to the intra prediction mode information with mode numbers of 2, 4, 6, . . . , 30, 39, 41, 43, . . . , 65 is (DST7, DCT2) (the first ellipsis represents even numbers between 6 and 30, and the second ellipsis represents odd numbers between 43 and 65), that is, the transform pair corresponding to the subblock is (DST7, DCT2).

When the ratio of the width to the height of the subblock is 1 (i.e., w=h), the transform pair corresponding to the intra prediction mode information with mode numbers of 3, 5, 7, . . . , 29, 38, 40, 42, . . . , 66 is (DCT2, DST7) (the first ellipsis represents odd numbers between 7 and 29, and the second ellipsis represents even numbers between 42 and 66), that is, the transform pair corresponding to the subblock is (DCT2, DST7).

When the ratio of the width to the height of the subblock is greater than 1 (i.e., w>h), the transform pair corresponding to the intra prediction mode information with mode numbers of B+1, B+3, . . . , 30, 3, 5, B, 39, 41, 43, . . . , 65 is (DST7, DCT2) (the first ellipsis represents even numbers between B+3 and 30, the second ellipsis represents odd numbers between 5 and B, and the third ellipsis represents odd numbers between 43 and 65), that is, the transform pair corresponding to the subblock is (DST7, DCT2).

When the ratio of the width to the height of the subblock is greater than 1 (i.e., w>h), the transform pair corresponding to the intra prediction mode information with mode numbers of B+2, B+4, . . . , 29, 38, 40, . . . , 66, 2, 4, . . . , (B−1) is (DCT2, DST7) (the first ellipsis represents odd numbers between B+4 and 29, the second ellipsis represents even numbers between 40 and 66, and the third ellipsis represents even numbers between 4 and (B−1)), that is, the transform pair corresponding to the subblock is (DCT2, DST7).

When the ratio of the width to the height of the subblock is less than 1 (i.e., w<h), the transform pair corresponding to the intra prediction mode information with mode numbers of 2, 4, 6, . . . , 30, B+1, B+3, . . . , 66, 39, 41, . . . , B−2 is (DST7, DCT2) (the first ellipsis represents even numbers between 6 and 30, the second ellipsis represents even numbers between (B+3) and 66, and the third ellipsis represents odd numbers between 41 and B−2), that is, the transform pair corresponding to the subblock is (DST7, DCT2).

When the ratio of the width to the height of the subblock is less than 1 (i.e., w<h), the transform pair corresponding to the intra prediction mode information with mode numbers of 3, 5, . . . , 29, B, B+2, 65, 38, 40, . . . , (B−1) is (DCT2, DST7) (the first ellipsis represents odd numbers between 5 and 29, the second ellipsis represents odd numbers between B+2 and 65, and the third ellipsis represents even numbers between 40 and (B−1)), that is, the transform pair corresponding to the subblock is (DCT2, DST7).

TABLE 9

| | Intra prediction mode information (mode number) | Horizontal transform kernel | Vertical transform kernel |
|---|---|---|---|
| | 1 | DCT2 | DCT2 |
| | 0, 31, 32, 33, 34, 35, 36, 37 | DST7 | DST7 |
| w = h | 2, 4, 6, ..., 30 | DST7 | DCT2 |
| | 39, 41, 43, ..., 65 | | |
| w > h | B + 1, B + 3, ..., 30 | | |
| | 3, 5, ..., B | | |
| | 39, 41, 43, ..., 65 | | |
| w < h | 2, 4, 6, ..., 30 | | |
| | B + 1, B + 3, ..., 66 | | |
| | 39, 41, ..., B − 2 | | |
| w = h | 3, 5, 7, ..., 29 | DCT2 | DST7 |
| | 38, 40, 42, ..., 66 | | |
| w > h | B + 2, B + 4, ..., 29 | | |
| | 38, 40, ..., 66 | | |
| | 2, 4, ..., (B − 1) | | |
| w < h | 3, 5, ..., 29 | | |
| | B, B + 2, ..., 65 | | |
| | 38, 40, ..., (B − 1) | | |

In a third fashion, as listed in Table 10, the intra prediction mode range includes intra prediction mode information with mode numbers of 0 and 1. The width of the subblock is represented by w, and the height of the subblock is represented by h.

When the ratio of the width to the height of the subblock is 1 (i.e., w=h), the transform pair corresponding to the intra prediction mode information with mode numbers of 2, 4, 6, . . . , 34, 35, 37, 39, 41, 43, . . . , 65 is (DST7, DCT2) (the first ellipsis represents even numbers between 6 and 34, and the second ellipsis represents odd numbers between 43 and 65), that is, the transform pair corresponding to the subblock is (DST7, DCT2).

When the ratio of the width to the height of the subblock is 1 (i.e., w=h), the transform pair corresponding to the intra prediction mode information with mode numbers of 3, 5, 7, . . . , 33, 36, 38, 40, . . . , 66 is (DCT2, DST7) (the first ellipsis represents odd numbers between 7 and 33, and the second ellipsis represents even numbers between 40 and 66), that is, the transform pair corresponding to the subblock is (DCT2, DST7).

When the ratio of the width to the height of the subblock is greater than 1 (i.e., w>h), the transform pair corresponding to the intra prediction mode information with mode numbers of B+1, B+3, . . . , 34, 3, 5, B, 35, 37, 39, . . . , 65 is (DST7, DCT2) (the first ellipsis represents even numbers between B+3 and 34, the second ellipsis represents odd numbers between 5 and B, and the third ellipsis represents odd numbers between 39 and 65), that is, the transform pair corresponding to the subblock is (DST7, DCT2).

When the ratio of the width to the height of the subblock is greater than 1 (i.e., w>h), the transform pair corresponding to the intra prediction mode information with mode numbers of B+2, B+4, . . . , 33, 2, 4, . . . , (B−1), 36, 38, . . . , 66 is (DCT2, DST7) (the first ellipsis represents odd numbers between (B+4) and 33, the second ellipsis represents even numbers between 4 and (B−1), and the third ellipsis represents even numbers between 38 and 66), that is, the transform pair corresponding to the subblock is (DCT2, DST7).

When the ratio of the width to the height of the subblock is less than 1 (i.e., w<h), the transform pair corresponding to the intra prediction mode information with mode numbers of 2, 4, 6, . . . , 34, B+1, B+3, . . . , 66, 35, 37, 39, . . . , B−2 is (DST7, DCT2) (the first ellipsis represents even numbers between 6 and 34, the second ellipsis represents even numbers between (B+3) and 66, and the third ellipsis represents odd numbers between 39 and B−2), that is, the transform pair corresponding to the subblock is (DST7, DCT2).

When the ratio of the width to the height of the subblock is less than 1 (i.e., w<h), the transform pair corresponding to the intra prediction mode information with mode numbers of 3, 5, . . . , 33, B, B+2, 65, 36, 38, . . . , (B−1) is (DCT2, DST7) (the first ellipsis represents odd numbers between 5 and 33, the second ellipsis represents odd numbers between B+2 and 65, and the third ellipsis represents even numbers between 38 and (B−1)), that is, the transform pair corresponding to the subblock is (DCT2, DST7).

TABLE 10

| | Intra prediction mode information (mode number) | Horizontal transform kernel | Vertical transform kernel |
|---|---|---|---|
| | 1 | DCT2 | DCT2 |
| | 0 | DST7 | DST7 |
| w = h | 2, 4, 6, ..., 34 | DST7 | DCT2 |
| | 35, 37, 39, ..., 65 | | |
| w > h | B + 1, B + 3, ..., 34 | | |
| | 3, 5, ..., B | | |
| | 35, 37, 39, ..., 65 | | |
| w < h | 2, 4, 6, ..., 34 | | |
| | B + 1, B + 3, ..., 66 | | |
| | 35, 37, 39, ..., B − 2 | | |
| w = h | 3, 5, 7, ..., 33 | DCT2 | DST7 |
| | 36, 38, 40, 42, ..., 66 | | |
| w > h | B + 2, B + 4, ..., 33 | | |
| | 36, 38, ..., 66 | | |
| | 2, 4, ..., (B − 1) | | |

TABLE 10-continued

| | | Transform pair | |
|---|---|---|---|
| | Intra prediction mode information (mode number) | Horizontal transform kernel | Vertical transform kernel |
| w < h | 3, 5, ..., 33<br>B, B + 2, ..., 65<br>36, 38, ..., (B − 1) | | |

In a fourth fashion, as listed in Table 11, the intra prediction mode range includes intra prediction mode information with mode numbers of 0, 1, 3, 65, and odd numbers between 3 to 65. The width of the subblock is represented by w, and the height of the subblock is represented by h.

When the ratio of the width to the height of the subblock is 1 (i.e., w=h), the transform pair corresponding to the intra prediction mode information with mode number of 2, 4, 6, . . . , 34 is (DST7, DCT2) (the ellipsis represents even numbers between 6 and 34), that is, the transform pair corresponding to the subblock is (DST7, DCT2).

When the ratio of the width to the height of the subblock is 1 (i.e., w=h), the transform pair corresponding to the intra prediction mode information with mode numbers of 36, 38, 40, . . . , 66 is (DCT2, DST7) (the ellipsis represents even numbers between 40 and 66), that is, the transform pair corresponding to the subblock is (DCT2, DST7).

When the ratio of the width to the height of the subblock is greater than 1 (i.e., w>h), the transform pair corresponding to the intra prediction mode information with mode numbers of B+1, B+3, . . . , 34 is (DST7, DCT2) (the ellipsis represents even numbers between (B+3) and 34), that is, the transform pair corresponding to the subblock is (DST7, DCT2).

When the ratio of the width to the height of the subblock is greater than 1 (i.e., w>h), the transform pair corresponding to the intra prediction mode information with mode numbers of 36, 38, . . . , 66, 2, 4, 40, . . . , (B−1) is (DCT2, DST7) (the first ellipsis represents even numbers between 38 and 66, and the second ellipsis represents even numbers between 4 and (B−1)), that is, the transform pair corresponding to the subblock is (DCT2, DST7).

When the ratio of the width to the height of the subblock is less than 1 (i.e., w<h), the transform pair corresponding to the intra prediction mode information with mode numbers of 2, 4, 6, . . . , 34, B+1, B+3, . . . , 66 is (DST7, DCT2) (the first ellipsis represents even numbers between 6 and 34, and the second ellipsis represents even numbers between (B+3) and 66), that is, the transform pair corresponding to the subblock is (DST7, DCT2).

When the ratio of the width to the height of the subblock is less than 1 (i.e., w<h), the transform pair corresponding to the intra prediction mode information with mode numbers of 36, 38, . . . , (B−1) is (DCT2, DST7) (the ellipsis represents even numbers between 38 and (B−1)), that is, the transform pair corresponding to the subblock is (DCT2, DST7).

TABLE 11

| | | Transform pair | |
|---|---|---|---|
| | Intra prediction mode information (mode number) | Horizontal transform kernel | Vertical transform kernel |
| | 1 | DCT2 | DCT2 |
| | 0, 3, 5, 7, ..., 63, 65 | DST7 | DST7 |

TABLE 11-continued

| | | Transform pair | |
|---|---|---|---|
| | Intra prediction mode information (mode number) | Horizontal transform kernel | Vertical transform kernel |
| w = h | 2, 4, 6, ..., 34 | DST7 | DCT2 |
| w > h | B + 1, B + 3, ..., 34 | | |
| w < h | 2, 4, 6, ..., 34<br>B + 1, B + 3, ..., 66 | | |
| w = h | 36, 38, 40, 42, ..., 66 | DCT2 | DST7 |
| w > h | 36, 38, ..., 66<br>2, 4, ..., (B − 1) | | |
| w < h | 36, 38, ..., (B − 1) | | |

It should be noted that Table 8 to Table 11 take the influence of the intra prediction mode being a wide angle mode into consideration, wherein B in the wide angle mode is determined by the ratio of the width to height of each subblock of the current block. In Table 8 to Table 11, when w/h=2, 4, 6, and 8, the corresponding B is 7, 11, 13, and 15; and when w/h=1/2, 1/4, 1/6, 1/8, the corresponding B is 61, 57, 55, 53.

It should also be noted that, in Table 8 to Table 11, the intra prediction modes with adjacent mode numbers generally correspond to different transform pairs.

In some possible embodiments of the present disclosure, when the current block does not activate intra-subblock partition, the following process may be performed: determining, based on the size information and the intra prediction mode information of the current block, a transform pair corresponding to the current block when the current block does not activate intra-subblock partition.

In practice, the transform pair corresponding to the current block may be determined jointly based on the size information and the intra prediction mode information of the current block when the current block does not activate intra-subblock partition.

In some possible embodiments of the present disclosure, determining, based on the size information and the intra prediction mode information of the current block, the transform pair corresponding to the current block jointly may include:

determining the transform pair corresponding to the intra prediction mode information as the transform pair corresponding to the current block when it is determined, based on the size information, that the current block fails to satisfy a target dimension constraint condition; when it is determined, based on the size information, that the height of the current block satisfies the target dimension constraint condition and the width of the current block fails to satisfy the target dimension constraint condition, determining DCT2 as a vertical transform kernel in the transform pair corresponding to the current block, and determining a horizontal transform kernel in the transform pair corresponding to the intra prediction mode information as a horizontal transform kernel in the transform pair corresponding to the current block; when it is determined, based on the size information, that the width of the current block satisfies the target dimension constraint condition and the height of the current block fails to satisfy the target dimension constraint condition, determining DCT2 as a horizontal transform kernel in the transform pair corresponding to the current block, and determining a vertical transform kernel in the transform pair corresponding to the intra prediction mode information as a vertical transform kernel in the transform pair corresponding to the current block; and determining DCT2 as a horizontal transform kernel and a vertical transform kernel in the transform pair corresponding to the current block when it is determined based on the size information that both the width and the height of the current block satisfy the target dimension constraint condition.

The target dimension constraint condition is that the width is greater than or equal to a target value, and the height is greater than or equal to the target value. The target value may be 32.

In practice, the decoding device may determine whether the current block satisfies the target dimension constraint condition; and determine DCT2 as the horizontal transform kernel and the vertical transform kernel in the transform pair corresponding to the current block when the current block satisfies the target dimension constraint condition (i.e., both the height and the width satisfy the target dimension constraint condition).

When the current block fails to satisfy the target dimension constraint condition (i.e., none of the height and the width satisfies the target dimension constraint condition), the transform pair corresponding to the intra prediction mode information may be determined, from the corresponding relationships between the intra prediction mode information and the transform pairs, as the transform pair corresponding to the current block.

When it is determined, based on the size information that the height of the current block satisfies the target dimension constraint condition and that the width of the current block fails to satisfy the target dimension constraint condition, DCT2 may be determined as the vertical transform kernel in the transform pair corresponding to the current block, and the horizontal transform kernel in the transform pair corresponding to the intra prediction mode information may be determined, from the corresponding relationships between the intra prediction mode information and the transform pairs, as the horizontal transform kernel in the transform pair corresponding to the current block.

When it is determined, based on the size information, that the width of the current block satisfies the target dimension constraint condition and the height of the current block fails to satisfy the target dimension constraint condition, DCT2 may be determined as the horizontal transform kernel in the transform pair corresponding to the current block, and the vertical transform kernel in the transform pair corresponding to the intra prediction mode information may be determined, from the corresponding relationships between the intra prediction mode information and the transform pairs, as the vertical transform kernel in the transform pair corresponding to the current block.

In some possible embodiments of the present disclosure, when a target identifier exists in the coded data of the current block, it may be determined that a transform mode of the current block is an implicit multi-kernel transform mode, and the transform pair corresponding to the current block may be determined jointly based on the size information and the intra prediction mode information of the current block.

In some possible embodiments of the present disclosure, determining the transform pair corresponding to the intra prediction mode information as the transform pair corresponding to the current block may be performed in the following fashions. Several feasible implementation fashions are given as below.

In a first fashion, as listed in Table 12 which describes the corresponding relationships between the intra prediction mode information and the transform pairs, when the mode numbers of the intra prediction mode information of the current block are 1, 33, and 35, the transform pair corresponding to the current block is determined as a first transform pair; when the mode numbers of the intra prediction mode information of the current block are 0, 31, 32, 34, 36, 37, the transform pair corresponding to the current block is determined as a second transform pair; when the mode numbers of the intra prediction mode information of the current block are 2, 30, 39, 65, even numbers between 2 and 30, and odd numbers between 39 and 65, the transform pair corresponding to the current block is determined as a third transform pair; and when the mode numbers of the intra prediction mode information of the current block are 3, 29, 38, 66, odd numbers between 3 and 29, and even numbers between 38 and 66, the transform pair corresponding to the current block is determined as a fourth transform pair.

TABLE 12

| Intra prediction mode information (mode number) | Transform pair |
| --- | --- |
| 1, 33, 35 | First transform pair |
| 0, 31, 32, 34, 36, 37 | Second transform pair |
| 2, 4, 6, ..., 28, 30, 39, 41, 43, ..., 63, 65 | Third transform pair |
| 3, 5, 7, ..., 27, 29, 38, 40, 42, ..., 64, 66 | Fourth transform pair |

In the first fashion, the transform pair corresponding to the current block may be acquired by the above Table 12.

In a second fashion, as listed in Table 13, when the mode number of the intra prediction mode information of the current block is 1, the transform pair corresponding to the current block is determined as a first transform pair; when the mode numbers of the intra prediction mode information of the current block are 0, 31, 32, 33, 34, 35, 36, 37, the transform pair corresponding to the current block is determined as a second transform pair; when the mode numbers of the intra prediction mode information of the current block are 2, 30, 39, 65, even numbers between 2 and 30, and odd numbers between 39 and 65, the transform pair corresponding to the current block is determined as a third transform pair; and when the mode numbers of the intra prediction mode information of the current block are 3, 29, 38, 66, odd numbers between 3 and 29, and even numbers between 38 and 66, the transform pair corresponding to the current block is determined as a fourth transform pair.

TABLE 13

| Intra prediction mode information (mode number) | Transform pair |
| --- | --- |
| 1 | First transform pair |
| 0, 31, 32, 33, 34, 35, 36, 37 | Second transform pair |
| 2, 4, 6, ..., 28, 30, 39, 41, 43, ..., 63, 65 | Third transform pair |
| 3, 5, 7, ..., 27, 29, 38, 40, 42, ..., 64, 66 | Fourth transform pair |

In the second fashion, the transform pair corresponding to the current block may be acquired by the above Table 13.

In a third fashion, as listed in Table 14, when the mode number of the intra prediction mode information of the current block is 1, the transform pair corresponding to the current block is determined as a first transform pair; when the mode number of the intra prediction mode information of the current block is 0, the transform pair corresponding to the current block is determined as a second transform pair;

when the mode numbers of the intra prediction mode information of the current block are 2, 34, 35, 65, even numbers between 2 and 34, and odd numbers between 35 and 65, the transform pair corresponding to the current block is determined as a third transform pair; and when the mode numbers of the intra prediction mode information of the current block are 3, 33, 36, 66, odd numbers between 3 and 33, and even numbers between 36 and 66, the transform pair corresponding to the current block is determined as a fourth transform pair.

TABLE 14

| Intra prediction mode information (mode number) | Transform pair |
| --- | --- |
| 1 | First transform pair |
| 0 | Second transform pair |
| 2, 4, 6, ..., 28, 30, 32, 34, 35, 37, 39, 41, 43, ..., 63, 65 | Third transform pair |
| 3, 5, 7, ..., 27, 29, 31, 33, 36, 38, 40, 42, ..., 64, 66 | Fourth transform pair |

In a fourth fashion, as listed in Table 15, when the mode number of the intra prediction mode information of the current block is 1, the transform pair corresponding to the current block is determined as a first transform pair; when the mode numbers of the intra prediction mode information of the current block are 0, 3, 65, and odd numbers between 3 and 65, the transform pair corresponding to the current block is determined as a second transform pair; when the mode numbers of the intra prediction mode information of the current block are 2, 34, and even numbers between 2 and 34, the transform pair corresponding to the current block is determined as a third transform pair; and when the mode numbers of the intra prediction mode information of the current block are 36, 66, and even numbers between 36 and 66, the transform pair corresponding to the current block is determined as a fourth transform pair.

TABLE 15

| Intra prediction mode information (mode number) | Transform pair |
| --- | --- |
| 1 | First transform pair |
| 0, 3, 5, 7, ..., 63, 65 | Second transform pair |
| 2, 4, 6, ..., 28, 30, 32, 34 | Third transform pair |
| 36, 38, 40, 42, ..., 64, 66 | Fourth transform pair |

In some possible embodiments of the present disclosure, there are two combinations of the first transform pair to the fourth transform pair. The corresponding description may be as follows.

The first transform pair is (DCT2, DCT2), the second transform pair is (DST7, DST7), the third transform pair is (DST7, DCT2), and the fourth transform pair is (DCT2, DST7); or the first transform pair is (DCT2, DCT2), the second transform pair is (DST7, DST7), the third transform pair is (DST7, DCT8), and the fourth transform pair is (DCT8, DST7).

In some possible embodiments of the present disclosure, when the transform pair is determined based on the intra prediction mode information, the intra prediction mode range is further considered. The corresponding process may include: determining the transform pair corresponding to the intra prediction mode information as the transform pair corresponding to the current block when it is determined, based on the size information, that the current block fails to satisfy the target dimension constraint condition and that the intra prediction mode information satisfies the intra prediction mode range.

The intra prediction mode range may be preset, and stored in the decoding device. The intra prediction mode range includes intra prediction modes with mode numbers of 0, 1, and 31 to 37; or the intra prediction mode range includes intra prediction modes with mode numbers of 0 and 1; or the intra prediction mode range includes intra prediction modes with mode numbers of 0, 1, 3, 65, and odd numbers between 3 and 65.

In practice, in response to acquiring the mode number of the intra prediction mode information from the coded data, the decoding device may determine whether the mode number is within the intra prediction mode range; and a transform pair corresponding to the intra prediction mode information as the transform pair corresponding to the current block may be directly determined from corresponding relationships between the intra prediction mode information and the transform pairs when the mode number is within the intra prediction mode range.

In some possible embodiments of the present disclosure, when a mode number of the intra prediction mode information of the current block is not within the intra prediction mode range, the following processing fashions may be employed.

In a first fashion, as listed in Table 16, the intra prediction mode range includes intra prediction mode information with mode numbers of 0, 1, and 31 to 37. The width of the current block is represented by W, and the height of the current block is represented by H.

When the ratio of the width to the height of the current block is 1 (i.e., W=H), the transform pair corresponding to the intra prediction mode information with mode numbers of 2, 4, 6, . . . , 30, 39, 41, 43, . . . , 65 is (DST7, DCT2) (the first ellipsis represents even numbers between 6 and 30, and the second ellipsis represents odd numbers between 43 and 65).

When the ratio of the width to the height of the current block is 1 (i.e., W=H), the transform pair corresponding to the intra prediction mode information with mode numbers of 3, 5, 7, . . . , 29, 38, 40, 42, . . . , 66 is (DCT2, DST7) (the first ellipsis represents odd numbers between 7 and 29, and the second ellipsis represents even numbers between 42 and 66).

When the ratio of the width to the height of the current block is greater than 1 (i.e., W>H), the transform pair corresponding to the intra prediction mode information with mode numbers of B+1, B+3, . . . , 30, 3, 5, B, 39, 41, 43, . . . , 65 is (DST7, DCT2) (the first ellipsis represents even numbers between B+3 and 30, the second ellipsis represents odd numbers between 5 and B, and the third ellipsis represents odd numbers between 43 and 65).

When the ratio of the width to the height of the current block is greater than 1 (i.e., W>H), the transform pair corresponding to the intra prediction mode information with mode numbers of B+2, B+4, . . . , 29, 38, 40, . . . , 66, 2, 4, . . . , (B−1) is (DCT2, DST7) (the first ellipsis represents odd numbers between B+4 and 29, the second ellipsis represents even numbers between 40 and 66, and the third ellipsis represents even numbers between 4 and (B−1)).

When the ratio of the width to the height of the current block is less than 1 (i.e., W<H), the transform pair corresponding to the intra prediction mode information with mode numbers of 2, 4, 6, . . . , 30, (B+1), (B+3), . . . , 66, 39, 41, . . . , (B−2) is (DST7, DCT2) (the first ellipsis represents even numbers between 6 and 30, the second ellipsis represents even numbers between (B+3) and 66, and the third ellipsis represents odd numbers between 41 and B−2).

When the ratio of the width to the height of the current block is less than 1 (i.e., W<H), the transform pair corresponding to the intra prediction mode information with mode numbers of 3, 5, . . . , 29, B, B+2, 65, 38, 40, . . . , (B−1) is (DCT2, DST7) (the first ellipsis represents odd numbers between 5 and 29, the second ellipsis represents odd numbers between (B+2) and 65, and the third ellipsis represents even numbers between 40 and (B−1)).

TABLE 16

|  | Intra prediction mode information (mode number) | Transform pair | |
|---|---|---|---|
|  |  | Horizontal transform kernel | Vertical transform kernel |
|  | 1, 33, 35 | DCT2 | DCT2 |
|  | 0, 31, 32, 34, 36, 37 | DST7 | DST7 |
| W = H | 2, 4, 6, ..., 30 | DST7 | DCT2 |
|  | 39, 41, 43, ..., 65 |  |  |
| W > H | B + 1, B + 3, ..., 30 |  |  |
|  | 3, 5, ..., B |  |  |
|  | 39, 41, 43, ..., 65 |  |  |
| W < H | 2, 4, 6, ..., 30 |  |  |
|  | B + 1, B + 3, ..., 66 |  |  |
|  | 39, 41, ..., B − 2 |  |  |
| W = H | 3, 5, 7, ..., 29 | DCT2 | DST7 |
|  | 38, 40, 42, ..., 66 |  |  |
| W > H | B + 2, B + 4, ..., 29 |  |  |
|  | 38, 40, ..., 66 |  |  |
|  | 2, 4, ..., (B − 1) |  |  |
| W < H | 3, 5, ..., 29 |  |  |
|  | B, B + 2, ..., 65 |  |  |
|  | 38, 40, ..., (B − 1) |  |  |

In a second fashion, as listed in Table 17, the intra prediction mode range includes intra prediction mode information with mode numbers of 0, 1, and 31 to 37. The width of the current block is represented by W, and the height of the current block is represented by H.

When the ratio of the width to the height of the current block is 1 (i.e., W=H), the transform pair corresponding to the intra prediction mode information with mode numbers of 2, 4, 6, . . . , 30, 39, 41, 43, . . . , 65 is (DST7, DCT2) (the first ellipsis represents even numbers between 6 and 30, and the second ellipsis represents odd numbers between 43 and 65).

When the ratio of the width to the height of the current block is 1 (i.e., W=H), the transform pair corresponding to the intra prediction mode information with mode numbers of 3, 5, 7, . . . , 29, 38, 40, 42, . . . , 66 is (DCT2, DST7) (the first ellipsis represents odd numbers between 7 and 29, and the second ellipsis represents even numbers between 42 and 66).

When the ratio of the width to the height of the current block is greater than 1 (i.e., W>H), the transform pair corresponding to the intra prediction mode information with mode numbers of B+1, B+3, . . . , 30, 3, 5, B, 39, 41, 43, . . . , 65 is (DST7, DCT2) (the first ellipsis represents even numbers between B+3 and 30, the second ellipsis represents odd numbers between 5 and B, and the third ellipsis represents odd numbers between 43 and 65).

When the ratio of the width to the height of the current block is greater than 1 (i.e., W>H), the transform pair corresponding to the intra prediction mode information with mode numbers of B+2, B+4, . . . , 29, 38, 40, . . . , 66, 2, 4, . . . , (B−1) is (DCT2, DST7) (the first ellipsis represents odd numbers between B+4 and 29, the second ellipsis represents even numbers between 40 and 66, and the third ellipsis represents even numbers between 4 and (B−1)).

When the ratio of the width to the height of the current block is less than 1 (i.e., W<H), the transform pair corresponding to the intra prediction mode information with mode numbers of 2, 4, 6, . . . , 30, B+1, B+3, . . . , 66, 39, 41, . . . , (B−2) is (DST7, DCT2) (the first ellipsis represents even numbers between 6 and 30, the second ellipsis represents even numbers between (B+3) and 66, and the third ellipsis represents odd numbers between 41 and (B−2)).

When the ratio of the width to the height of the current block is less than 1 (i.e., W<H), the transform pair corresponding to the intra prediction mode information with mode numbers of 3, 5, . . . , 29, B, (B+2), 65, 38, 40, . . . , (B−1) is (DCT2, DST7) (the first ellipsis represents odd numbers between 5 and 29, the second ellipsis represents odd numbers between (B+2) and 65, and the third ellipsis represents even numbers between 40 and (B−1)).

TABLE 17

|  | Intra prediction mode information (mode number) | Transform pair | |
|---|---|---|---|
|  |  | Horizontal transform kernel | Vertical transform kernel |
|  | 1 | DCT2 | DCT2 |
|  | 0, 31, 32, 33, 34, 35, 36, 37 | DST7 | DST7 |
| W = H | 2, 4, 6, ..., 30 | DST7 | DCT2 |
|  | 39, 41, 43, ..., 65 |  |  |
| W > H | B + 1, B + 3, ..., 30 |  |  |
|  | 3, 5, ..., B |  |  |
|  | 39, 41, 43, ..., 65 |  |  |
| W < H | 2, 4, 6, ..., 30 |  |  |
|  | B + 1, B + 3, ..., 66 |  |  |
|  | 39, 41, ..., B − 2 |  |  |
| W = H | 3, 5, 7, ..., 29 | DCT2 | DST7 |
|  | 38, 40, 42, ..., 66 |  |  |
| W > H | B + 2, B + 4, ..., 29 |  |  |
|  | 38, 40, ..., 66 |  |  |
|  | 2, 4, ..., (B − 1) |  |  |
| W < H | 3, 5, ..., 29 |  |  |
|  | B, B + 2, ..., 65 |  |  |
|  | 38, 40, ..., (B − 1) |  |  |

In a third fashion, the intra prediction mode range includes intra prediction mode information with mode numbers of 0 and 1. As listed in Table 18, the width of the current block is represented by W, and the height of the current block is represented by H.

When the ratio of the width to the height of the current block is 1 (i.e., W=H), the transform pair corresponding to the intra prediction mode information with mode numbers of 2, 4, 6, . . . , 34, 35, 37, 39, 41, 43, . . . , 65 is (DST7, DCT2) (the first ellipsis represents even numbers between 6 and 34, and the second ellipsis represents odd numbers between 43 and 65).

When the ratio of the width to the height of the current block is 1 (i.e., W=H), the transform pair corresponding to the intra prediction mode information with mode numbers of 3, 5, 7, . . . , 33, 36, 38, 40, . . . , 66 is (DCT2, DST7) (the first ellipsis represents odd numbers between 7 and 33, and the second ellipsis represents even numbers between 40 and 66).

When the ratio of the width to the height of the current block is greater than 1 (i.e., W>H), the transform pair corresponding to the intra prediction mode information with mode numbers of (B+1), (B+3), . . . , 34, 3, 5, B, 35, 37, 39, ..., 65 is (DST7, DCT2) (the first ellipsis represents even numbers between (B+3) and 34, the second ellipsis represents odd numbers between 5 and B, and the third ellipsis represents odd numbers between 39 and 65).

When the ratio of the width to the height of the current block is greater than 1 (i.e., W>H), the transform pair corresponding to the intra prediction mode information with mode numbers of B+2, B+4, ..., 33, 2, 4, ..., (B−1), 36, 38, ..., 66 is (DCT2, DST7) (the first ellipsis represents odd numbers between (B+4) and 33, the second ellipsis represents even numbers between 4 and (B−1), and the third ellipsis represents odd numbers between 38 and 66).

When the ratio of the width to the height of the current block is less than 1 (i.e., W<H), the transform pair corresponding to the intra prediction mode information with mode numbers of 2, 4, 6, ..., 34, (B+1), (B+3), ..., 66, 35, 37, 39, ..., (B−2) is (DST7, DCT2) (the first ellipsis represents even numbers between 6 and 34, the second ellipsis represents even numbers between (B+3) and 66, and the third ellipsis represents odd numbers between 39 and (B−2)).

When the ratio of the width to the height of the current block is less than 1 (i.e., W<H), the transform pair corresponding to the intra prediction mode information with mode numbers of 3, 5, ..., 33, B, (B+2), 65, 36, 38, ..., (B−1) is (DCT2, DST7) (the first ellipsis represents odd numbers between 5 and 33, the second ellipsis represents odd numbers between (B+2) and 65, and the third ellipsis represents even numbers between 38 and (B−1)).

36, 38, 40, ..., 66 is (DCT2, DST7) (the ellipsis represents even numbers between 40 and 66).

When the ratio of the width to the height of the current block is greater than 1 (i.e., W>H), the transform pair corresponding to the intra prediction mode information with mode numbers of B+1, B+3, ..., 34 is (DST7, DCT2) (the ellipsis represents even numbers between (B+3) and 34).

When the ratio of the width to the height of the current block is greater than 1 (i.e., W>H), the transform pair corresponding to the intra prediction mode information with mode numbers of 36, 38, ..., 66, 2, 4 ..., (B−1) is (DCT2, DST7) (the first ellipsis represents even numbers between 38 and 66, and the second ellipsis represents even numbers between 4 and (B−1).

When the ratio of the width to the height of the current block is less than 1 (i.e., W<H), the transform pair corresponding to the intra prediction mode information with mode numbers of 2, 4, 6, ..., 34, B+1, B+3, ..., 66 is (DST7, DCT2) (the first ellipsis represents even numbers between 6 and 34, and the second ellipsis represents even numbers between (B+3) and 66).

When the ratio of the width to the height of the current block is less than 1 (i.e., W<H), the transform pair corresponding to the intra prediction mode information with mode numbers of 36, 38, ..., (B−1) is (DCT2, DST7) (the ellipsis represents even numbers between 38 and (B−1)).

TABLE 18

| | Intra prediction mode information (mode number) | Transform pair Horizontal transform kernel | Vertical transform kernel |
|---|---|---|---|
| | 1 | DCT2 | DCT2 |
| | 0 | DST7 | DST7 |
| W = H | 2, 4, 6, ..., 34 | DST7 | DCT2 |
| | 35, 37, 39, ..., 65 | | |
| W > H | B + 1, B + 3, ..., 34 | | |
| | 3, 5, ..., B | | |
| | 35, 37, 39, ..., 65 | | |
| W < H | 2, 4, 6, ..., 34 | | |
| | B + 1, B + 3, ..., 66 | | |
| | 35, 37, 39, ..., B − 2 | | |
| W = H | 3, 5, 7, ..., 33 | DCT2 | DST7 |
| | 36, 38, 40, 42, ..., 66 | | |
| W > H | B + 2, B + 4, ..., 33 | | |
| | 36, 38, ..., 66 | | |
| | 2, 4, ..., (B − 1) | | |
| W < H | 3, 5, ..., 33 | | |
| | B, B + 2, ..., 65 | | |
| | 36, 38, ..., (B − 1) | | |

In a fourth fashion, the intra prediction mode range includes intra prediction mode information with mode numbers of 0, 1, 3, 65, and odd numbers between 3 and 65. As listed in Table 19, the width of the current block is represented by W, and the height of the current block is represented by H.

When the ratio of the width to the height of the current block is 1 (i.e., W=H), the transform pair corresponding to the intra prediction mode information with mode numbers of 2, 4, 6, ..., 34 is (DST7, DCT2) (the ellipsis represents even numbers between 6 and 34).

When the ratio of the width to the height of the current block is 1 (i.e., W=H), the transform pair corresponding to the intra prediction mode information with mode numbers of

TABLE 19

| | Intra prediction mode information (mode number) | Transform pair Horizontal transform kernel | Vertical transform kernel |
|---|---|---|---|
| | 1 | DCT2 | DCT2 |
| | 0, 3, 5, 7, ..., 63, 65 | DST7 | DST7 |
| W = H | 2, 4, 6, ..., 34 | DST7 | DCT2 |
| W > H | B + 1, B + 3, ..., 34 | | |
| W < H | 2, 4, 6, ..., 34 | | |
| | B + 1, B + 3, ..., 66 | | |
| W = H | 36, 38, 40, 42, ..., 66 | DCT2 | DST7 |
| W > H | 36, 38, ..., 66 | | |
| | 2, 4, ..., (B − 1) | | |
| W < H | 36, 38, ..., (B − 1) | | |

It should be noted that Table 16 to Table 19 take the influence of the intra prediction mode being a wide angle mode into consideration, wherein B in the wide angle mode is determined by the ratio of the width to height of the current block. In Table 7 to Table 10, when W/H=2, 4, 6, and 8, the corresponding B is 7, 11, 13, and 15; and when W/H=1/2, 1/4, 1/6, 1/8, the corresponding B is 61, 57, 55, 53.

It should also be noted that, in Table 7 to Table 10, the intra prediction modes with adjacent mode numbers generally correspond to different transform pairs.

Figure 12:
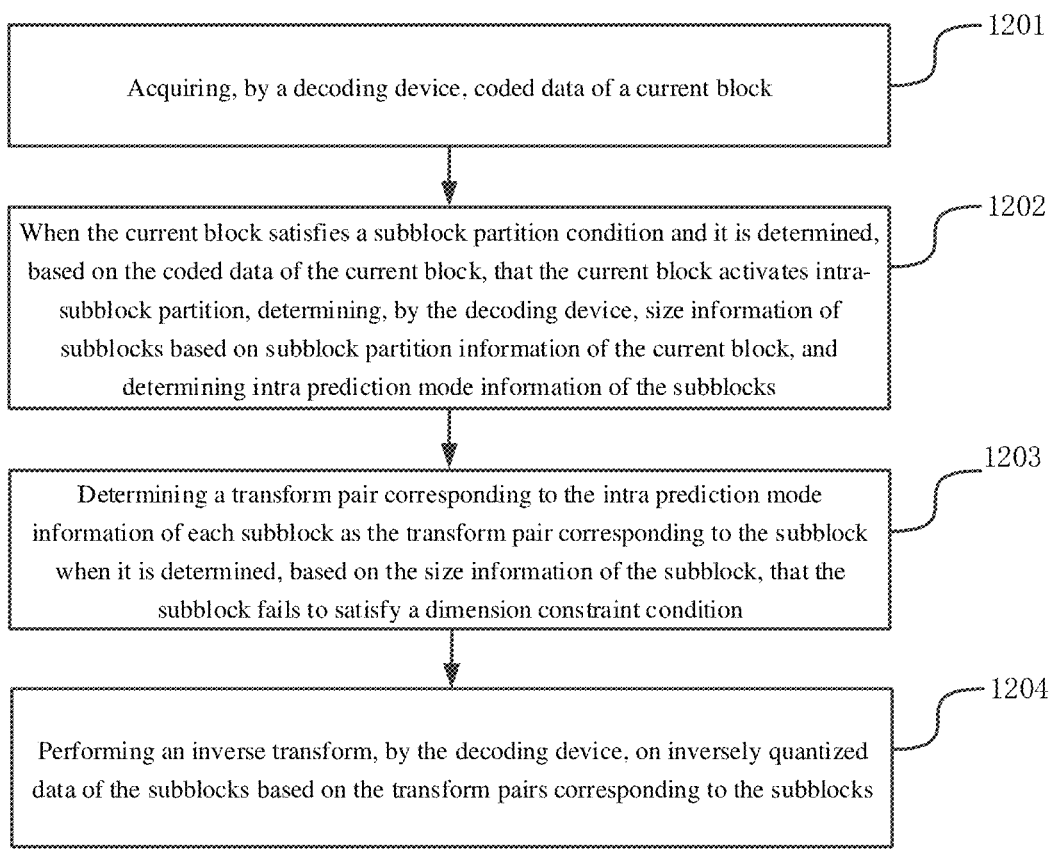
FIG. 12 is a flowchart of another decoding method according to an embodiment of the present disclosure.
Figure 13:
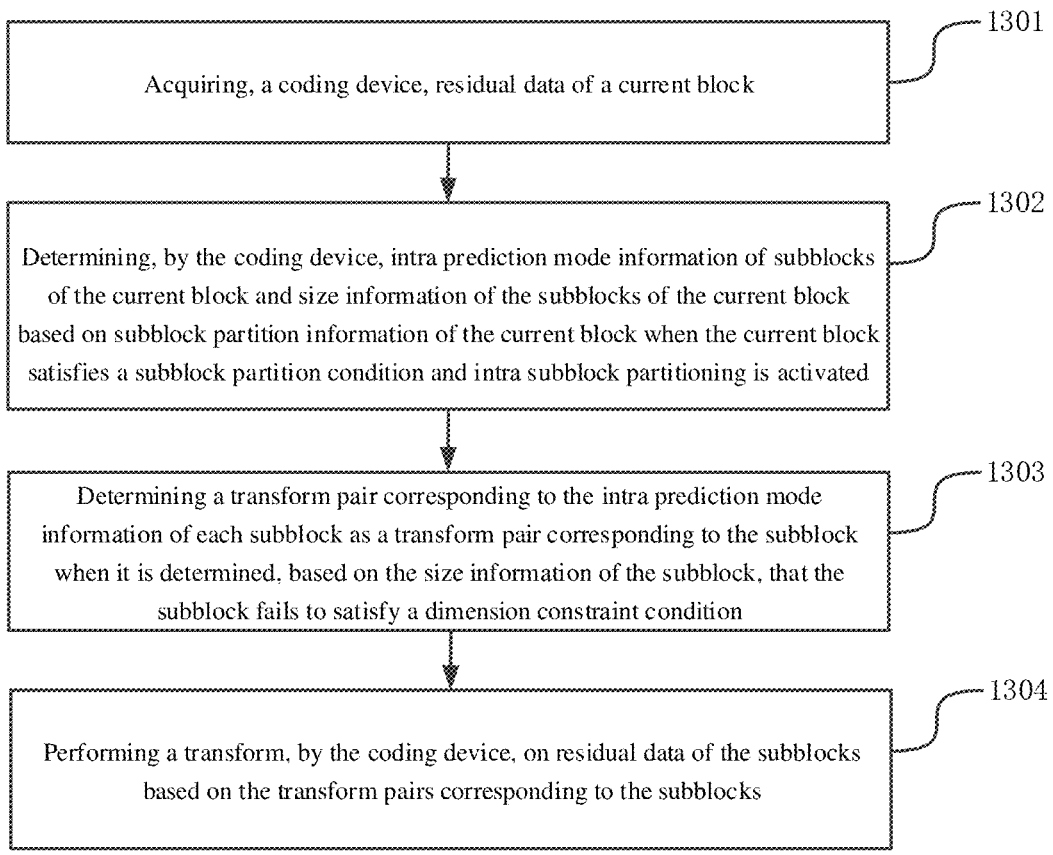
FIG. 13 is a flowchart of another coding method according to an embodiment of the present disclosure.

Corresponding to the decoding shown in FIG. 12, as shown in FIG. 13, a coding process may include the following steps.

In step 1301, a coding device acquires residual data of a current block.

In practice, the coding device performs intra prediction first when coding video data, to acquire residual data (the method for acquiring the residual data is consistent with the existing video coding standards, which is not repeated). The residual data is taken as the residual data of the current block to be processed.

In step 1302, the coding device determines intra prediction mode information of subblocks of the current block and size information of the subblocks of the current block based on subblock partition information of the current block when the current block satisfies a subblock partition condition and intra subblock partitioning is activated.

The subblock partition information indicates how to partition the current block. For example, for an 8*4 current block, it may be horizontally partitioned into two 8*2 subblocks.

In practice, in response to acquiring the residual data of the current block, the coding device may determine whether the current block satisfies the subblock partition condition; and determine whether the intra subblock partitioning is activated when the subblock partition condition is satisfied. When a switch for intra subblock partitioning is powered on, it is indicated that the intra subblock partitioning may be activated and the current block can be partitioned. The heights and widths of the subblocks acquired by partitioning the current block are then determined. The width of the current block is the number of pixels contained in the current block in its width direction, the height of the current block is the number of pixels contained in the current block in its height direction, the width of each subblock is the number of pixels contained in the subblock in its width direction, and the height of each subblock is the number of pixels contained in the subblock in its height direction. In this way, the size information of each subblock can be acquired. For a current block of M×N, M represents the width of the current block, and N represents the height of the current block.

In addition, the content of a flag bit configured to indicate the intra prediction mode information may be acquired from the coded data of the current block, that is, the intra prediction mode information of the current block may be acquired.

In some possible embodiments of the present disclosure, the subblock partition condition is that the current block is a luma block and the height and the width of the current block are both less than or equal to a first preset value, and the current block is a single-line reference when being subjected to intra prediction, and the number of pixels included in the current block is greater than a second preset value.

The first preset value may be preset and stored in the coding device (the same as the third value as mentioned above). The first preset value may be 64. The current block being the single-line reference during the intra prediction means that only one line is referenced during the intra prediction of the current block. The second preset value may be preset and stored in the coding device. The second preset value may be 16 (the same as the fourth value as mentioned above).

In step 1303, the coding device determines, based on the size information of the subblock and the intra prediction mode information of the subblock, a transform pair corresponding to each subblock. Determining, based on the size information of the subblock and the intra prediction mode information of the subblock, the transform pair of each subblock includes: determining a transform pair corresponding to the intra prediction mode information of each subblock as a transform pair corresponding to the subblock when it is determined, based on the size information of the subblock, that the subblock fails to satisfy a dimension constraint condition, wherein the dimension constraint condition is that the width is not within a first preset range, and the height is not within a second preset range.

In practice, step 1303 is completely the same as step 1203, which is not repeated here.

It should be noted that determining the transform pair corresponding to the subblock based on the size information of the subblock and the intra prediction mode information of the subblock by the coding device is completely the same as determining the transform pair corresponding to the subblock based on the size information of the subblock and the intra prediction mode information of the subblock the decoding device in the embodiment shown in FIG. 12. For details, reference is made to the process in FIG. 12, which is not repeated here.

In step 1304, the coding device performs a transform on residual data of the subblocks based on the transform pairs corresponding to the subblocks.

In practice, after the coding device determines the transform pairs corresponding to the subblocks, a transform coefficient corresponding to the subblock is acquired by transforming each subblock based on the transform pair corresponding to the subblock; then a quantization coefficient is acquired by quantizing the transform coefficient; and coded data corresponding to the subblock is acquired by entropy coding the quantization coefficient.

In this way, the coded data corresponding to the current block can be acquired based on the above processing for each subblock, such that the coding of the current block is completed. Each current block is processed in accordance with the process shown in FIG. 13, so as to code a whole segment of video data.

In some possible embodiments of the present disclosure, in order to quickly perform subblock partitioning on the current block by the decoding device, the following process may be performed: acquiring the subblock partition information of the current block when the current block satisfies the subblock partition condition; and adding the subblock partition information to coded data of the current block.

In practice, the coding device may acquire the subblock partition information of the current block when the current block satisfies the subblock partition condition; and add the subblock partition information to the coded data of the current block. In this way, the decoding device may subsequently acquire, from the coded data of the current block, the subblock partition information of the current block for decoding.

In response to acquiring the current block, the coding device may determine the intra prediction mode information of the current block based on the RDO criterion. The process may be as follows.

Generally speaking, there are two major indicators for evaluating the coding efficiency: code rate and peak signal to noise ratio (PSNR). Generally, the smaller a bit stream is, the greater a compression rate is; the greater the PSNR is, the better the quality of a reconstructed image is. In the case of making mode selection, a discriminant formula is essentially a comprehensive evaluation of the two indicators.

The rate-distortion cost corresponding to a mode is $J(mode) = D + \lambda * R$. D represents Distortion, which is generally measured by a squares error (SSE) indicator; SSE refers to a sum of squares error between a reconstructed block and a source image; $\lambda$ is a Lagrange multiplier; and R is an actual number of bits required for image block coding in this mode, including the sum of bits required for coding mode information, motion information, residuals, etc.

The coding device may perform intra prediction by each intra prediction mode information to acquire different residuals (which may be considered as the current block); then perform a transform by a transform pair corresponding to each intra prediction mode information, followed by quantization, entropy coding and decoding; then select the intra prediction mode information with the smallest rate-distortion cost; and determine this intra prediction mode information as the intra prediction mode information corresponding to the current block. In this way, the intra prediction mode information corresponding to the current block can be determined.

In addition, after the intra prediction mode information of the current block is acquired, a mode number of the intra prediction mode information may be added to the subsequent coded data for processing the current block.

It should be noted that, in order to save the coding time, the partitioned intra subblocks share the intra prediction mode information of the current block.

In addition, in the embodiments of the present disclosure, the process for acquiring the subblock partition information by the coding device is also provided.

The coding device may partition the current block horizontally or vertically into several small subblocks. For example, for a 16*8 current block, it may be partitioned into four 16×2 subblocks horizontally or into four 4*8 subblocks vertically. However, for a 4*8 block, it may be partitioned into two 4*4 subblocks or two 2*8 subblocks. It may be noted that the number of subblocks can be only 2 (for 4*8, 8*4 subblocks). In addition, each subblock contains at least 16 pixels, such that the 4*4 block is not partitioned again, and there is no need to make corresponding grammar declarations at the coding device and the decoding device. The specific partitioning rules are shown in Table 3 shown in FIG. 9. As for whether to partition horizontally or vertically, it needs to be determined by the coding device based on a RDO criterion. In order to save the coding time, the partitioned intra subblocks share an intra prediction mode of the current block (that is, the subblocks obtained by partitioning the current block have the same intra prediction mode as the current block).

The current block may be partitioned horizontally and vertically according to Table 3. For example, as shown in FIG. 11, for an 8*4 current block, it may be horizontally partitioned into two 8*2 subblocks, or be vertically partitioned into two 4*4 subblocks.

Determining the subblock partition information based on the RDO criterion may include: determining a plurality of split types of the current block first according to Table 3; then performing coding according to each split type; and then performing decoding to determine the split type with the least rate-distortion cost as the final split type of the current block. In this way, the subblock partition information of the current block is acquired. The subblock partition information of the current block is subsequently added to the coded data of the current block.

It should be noted that, in the aforementioned embodiment, after the current block is partitioned, the subblocks have the same width and the same height, as well as the same intra prediction mode information, and thus the determined transform pairs are also the same.

In the embodiments of the present disclosure, at the coding device, the transform pairs corresponding to the subblocks are determined directly based on the intra prediction mode of the current block and the size information of the subblocks; and the determined transform pairs are coded. Similarly, at the decoding device, the transform pairs corresponding to the subblocks are determined directly based on the intra prediction mode of the current block and the size information of the subblocks; and the determined transform pairs are decoded. In this way, since the transform pairs are determined based on the intra prediction mode of the current block and the size information of the subblocks, instead of using the same transform pair for all subblocks, the coding and decoding performance can be improved. Moreover, the selection of the transform pairs based on the intra prediction mode can save the selection time of the transform pairs and further improve the coding and decoding performance.

It should be noted that, for the aforementioned two embodiments for decoding, when the current block is partitioned horizontally, the subblocks of the current block are uniformly subjected to entropy decoding in sequence from top to bottom to acquire quantization coefficients of the subblocks. Then, the subblocks of the current block are subjected to inverse quantization and inverse transform in sequence from top to bottom to acquire residual data of the subblocks. Finally, pixel values of pixels in a reconstructed area around the current block are used to construct, based on an intra prediction mode used during coding, prediction signals of the subblocks in sequence from top to bottom. Reconstruction information of each subblock is acquired by adding up the residual data of the subblock and the corresponding prediction signal. In this way, reconstruction information corresponding to the current block can be acquired by merging the reconstruction information of the subblocks.

When the current block is partitioned vertically, subblocks of the current block are uniformly subjected to entropy decoding in sequence from left to right to acquire quantization coefficients of the subblocks. Then, the subblocks of the current block are subjected to inverse quantization and inverse transform in sequence from left to right to acquire residual data of the subblocks. Finally, pixel values of pixels in a reconstructed area around the current block are used to construct, based on an intra prediction mode used during coding, prediction signals of the subblocks in sequence from left to right. Reconstruction information of each subblock is acquired by adding up the residual data of the subblock and the corresponding prediction signal. In this way, reconstruction information corresponding to the current block can be acquired by merging the reconstruction information of the subblocks.

It should also be noted that, for the aforementioned two embodiments for coding, when the current block is partitioned horizontally, the subblocks in the first line of the current block are respectively predicted, transformed, quantized, and entropy-coded first in the sequence of lines; and the subblocks in the second line are respectively predicted, transformed, quantized, and entropy-coded in the sequence of lines, and the third subblock, the fourth subblock, etc. are processed sequentially from top to bottom. The reason for coding in this way is that reference pixels for intra prediction of the next subblock depend on the reconstruction information of the previous subblock. Therefore, when the next subblock is predicted, the previous subblock has completed the prediction, transform, quantization, and entropy coding, and the reconstruction information has been acquired.

When the current block is partitioned vertically, the first subblock on the leftmost side of the current block is predicted, transformed, quantized, and entropy-coded first in the sequence of columns; and the subblocks in the second column from the left side are respectively predicted, transformed, quantized, and entropy-coded in the sequence of columns, and the third subblock, the fourth subblock, and the like are processed sequentially from left to right. The reason for coding in this way is that reference pixels for the intra prediction of the subblock on the right side depend on the reconstruction information of the previous subblock. Therefore, when one subblock on the right side is predicted, the left subblock has completed the prediction, transform, quantization, and entropy coding, and the reconstruction information has been acquired.

It should also be noted that the embodiments of the coding device shown in FIG. 10 and FIG. 13 are all improvements to the transform process. During the intra prediction, the entire current block is used to perform intra prediction. After the residual data is acquired, the current block is partitioned into subblocks, and the residual data of the subblocks are subjected to transform. During the intra prediction, it is also available to directly partition the current block into subblocks for intra prediction, so as to acquire residual data of the subblocks, and the residual data of the subblocks are subjected to transform. The coding device of the aforementioned embodiments of the present disclosure is applicable to the above two fashions. Similarly, the inverse transform of the decoding device is also applicable to the two fashions.

It should also be noted that in the aforementioned several embodiments, the activation of intra subblock partitioning refers to activation of an intra subblock split type. The subblock partition information may be a subblock split type, that is, a subblock split type determined in the candidate subblock split types supported by the current block. The above-mentioned subblock partition information may not be added to the coded data, that is, a flag bit is not occupied. For example, when only horizontal partitioning is activated, the decoding device performs horizontal partitioning while performing subblock partitioning. Similarly, when only vertical partitioning is activated, the decoding device performs vertical partitioning while performing subblock partitioning. Only when both horizontal partitioning and vertical partitioning are activated, an additional indication is added to the coded data, such that network resources can be saved.

Figure 14:
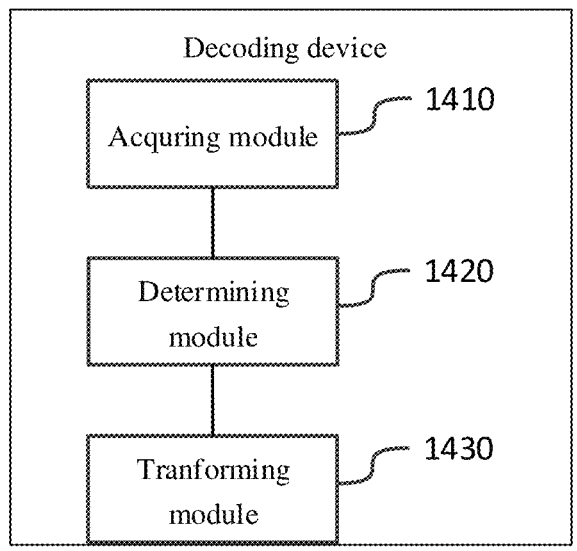
FIG. 14 is a schematic structural diagram of a decoding device according to an embodiment of the present disclosure.

Based on the same technical concept, an embodiment of the present disclosure further provides a decoding device. As shown in FIG. 14, the decoding device includes:

an acquiring module 1410, configured to acquire coded data of a current block;

a determining module 1420, configured to: determine size information and shape information of subblocks based on subblock partition information of the current block when the current block satisfies a subblock partition condition and it is determined, based on the coded data of the current block, that the current block activates intra subblock partition; and determine, based on the size information and the shape information of each subblock, a transform pair corresponding to the subblock; and a transforming module 1430, configured to perform an inverse transform on inversely quantized data of the subblocks based on the transform pairs corresponding to the subblocks;

wherein the determining module 1420 is configured to: determine DST7 as a horizontal transform kernel in the transform pair corresponding to the subblock when a width of the subblock satisfies a first dimension constraint condition and a shape of the subblock satisfies a first condition; and determine DST7 as a vertical transform kernel in the transform pair corresponding to the subblock when a height of the subblock satisfies a second dimension constraint condition and the shape of the subblock satisfies a second condition.

In some possible embodiments of the present disclosure, the determining module 1420 is further configured to: determine DCT2 as a horizontal transform kernel in the transform pair corresponding to the subblock when the width of the subblock fails to satisfy the first dimension constraint condition and/or the shape of the subblock fails to satisfy the first condition; and determine DCT2 as a vertical transform kernel in the transform pair corresponding to the subblock when the height of the subblock fails to satisfy the second dimension constraint condition and/or the shape of the subblock fails to satisfy the second condition.

In some possible embodiments of the present disclosure, the first dimension constraint condition and the second dimension constraint condition are greater than or equal to a first value, and less than or equal to a second value; the first condition is that the width is less than or equal to the height, and the second condition is that the width is greater than or equal to the height; or the first dimension constraint condition and the second dimension constraint condition are greater than or equal to a first value, and less than or equal to a second value; the first condition is that the width is less than the height, and the second condition is that the width is greater than the height.

In some possible embodiments of the present disclosure, the subblock partition condition is that the current block is a luma block, the height and the width of the current block are both less than or equal to a third value, the current block is a single-line reference during performing intra prediction, and a number of pixels included in the current block is greater than a fourth value.

Figure 15:
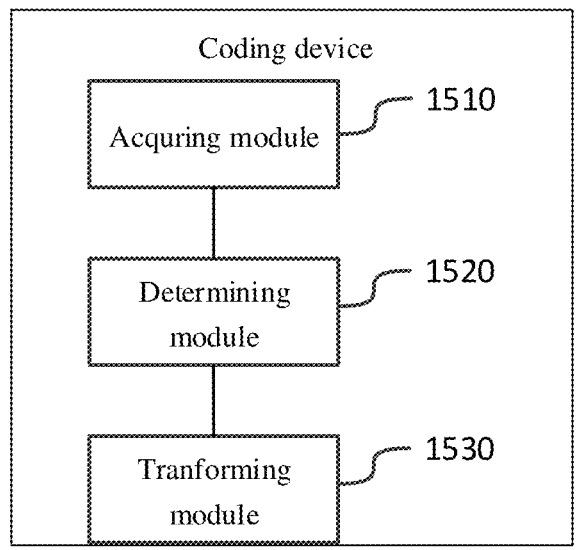
FIG. 15 is a schematic structural diagram of a coding device according to an embodiment of the present disclosure.

Based on the same technical concept, an embodiment of the present disclosure further provides a coding device. As shown in FIG. 15, the coding device includes:

an acquiring module 1510, configured to acquire residual data of a current block;

a determining module 1520, configured to: determine size information and shape information of subblocks of the current block based on subblock partition information of the current block when the current block satisfies a subblock partition condition and subblock partition is activated; and determine a transform pair corresponding to each subblock based on the size information and shape information of the subblock; and a transforming module 1530, configured to perform a transform on residual data of the subblocks based on the transform pairs corresponding to the subblocks;

wherein the determining module 1520 is configured to: determine DST7 as a horizontal transform kernel in the transform pair corresponding to the subblock when a width of the subblock satisfies a first dimension constraint condition and a shape of the subblock satisfies a first condition; and determine DST7 as a vertical transform kernel in the transform pair of the subblock when a height of the subblock satisfies a second dimension constraint condition and the shape of the subblock satisfies a second condition.

In some possible embodiments of the present disclosure, the acquiring module 1510 is further configured to: acquire the subblock partition information of the current block when the current block satisfies the subblock partition condition; and add the subblock partition information to coded data of the current block.

In the embodiments of the present disclosure, at the coding device, the transform pairs corresponding to the subblocks are determined directly based on the size information and shape information of the subblocks of the current block; and the determined transform pairs are coded. Similarly, at the decoding device, the transform pairs corresponding to the subblocks are determined directly based on the size information and shape information of the subblocks of the current block; and the determined transform pairs are decoded. In this way, since the transform pairs are determined based on the size information and shape information, instead of using the same transform pair for all subblocks, the coding and decoding performance can be improved.

Moreover, when the transform pairs are derived, only the heights and widths are used, such that the derivation is simpler, and the coding and decoding performance can be further improved.

Figure 16:
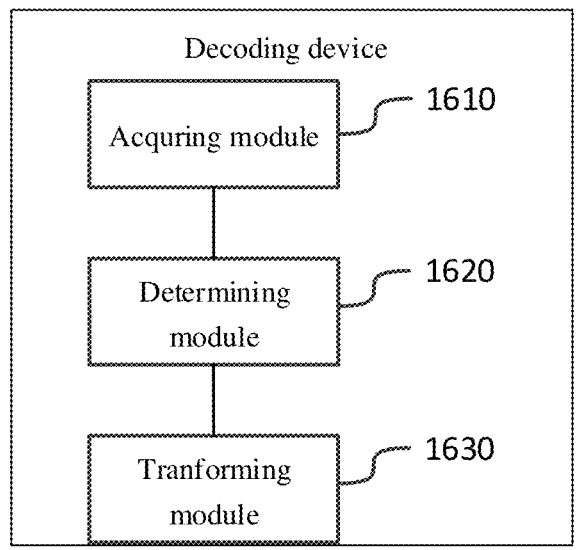
FIG. 16 is a schematic structural diagram of another decoding device according to an embodiment of the present disclosure.

Based on the same technical concept, an embodiment of the present disclosure further provides a decoding device. As shown in FIG. 16, the decoding device includes:

an acquiring module 1610, configured to acquire coded data of a current block;

a determining module 1620, configured to: when the current block satisfies a subblock partition condition and it is determined, based on the coded data of the current block, that the current block activates intra-subblock partition, determine size information of subblocks based on subblock partition information of the current block, and determining intra prediction mode information of the subblocks; and determine, based on the size information and the intra prediction mode information of each subblock, a transform pair corresponding to the subblock; and a transforming module 1630, configured to perform an inverse transform on inversely quantized data of the subblocks based on the transform pairs corresponding to the subblocks;

wherein the determining module 1620 is configured to: determine a transform pair corresponding to the intra prediction mode information of each subblock as the transform pair corresponding to the subblock when it is determined, based on the size information of the subblock, that the subblock fails to satisfy a dimension constraint condition, wherein the dimension constraint condition is that a width is not within a preset value range, and a height is not within the preset value range.

In some possible embodiments of the present disclosure, the determining module 1620 is further configured to:

when it is determined, based on the size information of the subblock, that the height of the subblock satisfies the dimension constraint condition and the width of the subblock fails to satisfy the dimension constraint condition, determine DCT2 as a vertical transform kernel in the transform pair corresponding to the subblock, and determine a horizontal transform kernel in the transform pair corresponding to the intra prediction mode information of the subblock as a horizontal transform kernel in the transform pair corresponding to the subblock;

when it is determined, based on the size information of the subblock, that the width of the subblock satisfies the dimension constraint condition and the height of the subblock fails to satisfy the dimension constraint condition, determine DCT2 as a horizontal transform kernel in the transform pair corresponding to the subblock, and determine a vertical transform kernel in the transform pair corresponding to the intra prediction mode information of the subblock as a vertical transform kernel in the transform pair of the subblock; and determine DCT2 as a vertical transform kernel and a vertical transform kernel in the transform pair corresponding to the subblock when it is determined, based on the size information of the subblock, that both the height and the width of the subblock satisfy the dimension constraint condition.

In some possible embodiments of the present disclosure, the determining module 1620 is configured to: determine the transform pair corresponding to the subblock as (DCT2, DCT2) when mode numbers of the intra prediction mode information of the subblock are 1, 33, 35; determine the transform pair corresponding to the subblock as (DST7, DST7) when the mode numbers of the intra prediction mode information of the subblock are 0, 31, 32, 34, 36, 37; determine the transform pair corresponding to the subblock as (DST7, DCT8) when the mode numbers of the intra prediction mode information of the subblock are 2, 30, even numbers between 2 and 30, 39, 65, and odd numbers between 39 and 65; and determine the transform pair corresponding to the subblock as (DCT8, DST7) when the mode numbers of the intra prediction mode information of the subblock are 3, 29, odd numbers between 3 and 29, 38, 66, and even numbers between 38 and 66.

In some possible embodiments of the present disclosure, the determining module 1620 is configured to: determine the transform pair corresponding to the subblock as a first transform pair when a mode number of the intra prediction mode information of the subblock is 1; determine the transform pair corresponding to the subblock as a second transform pair when the mode numbers of the intra prediction mode information of the subblock are 0, 31, 32, 33, 34, 35, 36, 37; determine the transform pair corresponding to the subblock as a third transform pair when the mode numbers of the intra prediction mode information of the subblock are 2, 30, even numbers between 2 and 30, 39, 65, and odd numbers between 39 and 65; and determine the transform pair corresponding to the subblock as a fourth transform pair when the mode numbers of the intra prediction mode information of the subblock are 3, 29, odd numbers between 3 and 29, 38, 66, and even numbers between 38 and 66.

In some possible embodiments of the present disclosure, the determining module 1620 is configured to: determine the transform pair corresponding to the subblock as a first transform pair when a mode number of the intra prediction mode information of the subblock is 1; determine the transform pair corresponding to the subblock as a second transform pair when the mode number of the intra prediction mode information of the subblock is 0; determine the transform pair corresponding to the subblock as a third transform pair when the mode numbers of the intra prediction mode information of the subblock are 2, 34, even numbers between 2 and 34, 35, 65, and odd numbers between 35 and 65; and determine the transform pair corresponding to the subblock as a fourth transform pair when the mode numbers of the intra prediction mode information of the subblock are 3, 33, odd numbers between 3 and 33, 36, 66, and even numbers between 36 and 66.

In some possible embodiments of the present disclosure, the determining module 1620 is configured to: determine the transform pair corresponding to the subblock as a first transform pair when the mode number of the intra prediction mode information of the subblock is 1; determine the transform pair corresponding to the subblock as a second transform pair when the mode numbers of the intra prediction mode information of the subblock are to 0, 3, 65, and odd numbers between 3 and 65; determine the transform pair corresponding to the subblock as a third transform pair when the mode numbers of the intra prediction mode information of the subblock are 2, 34, and even numbers between 2 and 34; and determine the transform pair corresponding to the subblock as a fourth transform pair when the mode numbers of the intra prediction mode information of the subblock are 36, 66, and even numbers between 36 and 66.

In some possible embodiments of the present disclosure, the first transform pair is (DCT2, DCT2), the second transform pair is (DST7, DST7), the third transform pair is (DST7, DCT2), and the fourth transform pair is (DCT2, DST7); or the first transform pair is (DCT2, DCT2), the second transform pair is (DST7, DST7), the third transform pair is (DST7, DCT8), and the fourth transform pair is (DCT8, DST7).

In some possible embodiments of the present disclosure, the determining module 1620 is configured to: determine the transform pair corresponding to the intra prediction mode information as the transform pair corresponding to each subblock when it is determined, based on the size information of the subblock, that the subblock fails to satisfy the dimension constraint condition and that the intra prediction mode information of the subblock satisfies an intra prediction mode range.

In some possible embodiments of the present disclosure, the determining module 1620 is further configured to: determine a ratio of a width to a height of each subblock based on the size information of the subblock when it is determined, based on the size information of the subblock, that the subblock fails to satisfy the dimension constraint condition and that the intra prediction mode information of the subblock fails to satisfy the intra prediction mode range; and determine, based on the ratio of the width to the height of the subblock and the intra prediction*mode information of the subblock, the transform pair corresponding to the subblock.

In some possible embodiments of the present disclosure, the intra prediction mode range includes intra prediction mode information with mode numbers of 0, 1, and 31 to 37; or the intra prediction mode range includes intra prediction mode information with mode numbers of 0 and 1; or the intra prediction mode range includes intra prediction mode information with mode numbers of 0, 1, 3, 65, and odd numbers between 3 and 65.

In some possible embodiments of the present disclosure, the intra prediction mode range includes intra prediction mode information with mode numbers of 0, 1, and 31 to 37; and the determining module 1620 is further configured to:

determine the transform pair corresponding to the current block as (DST7, DCT2) when the ratio of the width to the height of the current block is equal to 1 and the mode numbers of the intra prediction mode information are 2, 4, 6, 30, 39, 41, 43, 65, even numbers between 6 and 30, and odd numbers between 43 and 65; and determine the transform pair corresponding to the current block as (DCT2, DST7) when the ratio of the width to the height of the current block is equal to 1 and the mode numbers of the intra prediction mode information are 3, 5, 7, 29, and odd numbers between 7 and 29;

determine the transform pair corresponding to the current block as (DST7, DCT2) when the ratio of the width to the height of the current block is greater than 1 and the mode numbers of the intra prediction mode information are (B+1), (B+3), 30, 3, 5, B, 39, 41, 43, 65, even numbers between (B+3) and 30, odd numbers between 5 and B, and odd numbers between 43 and 65; and determine the transform pair corresponding to the current block as (DCT2, DST7) when the ratio of the width to the height of the current block is greater than 1 and the mode numbers of the intra prediction mode information are B+2, B+4, 29, 38, 40, 66, 2, 4, (B−1), odd numbers between B+4 and 29, even numbers between 40 and 66, and even numbers between 4 and (B−1); and determine the transform pair corresponding to the current block as (DST7, DCT2) when the ratio of the width to the height of the current block is less than 1 and the mode numbers of the intra prediction mode information are 2, 4, 6, 30, (B+1), (B+3), 66, 39, 41, (B−2), even numbers between 6 and 30, even numbers between (B+3) and 66, and odd numbers between 41 and (B−2); and determine the transform pair corresponding to the current block as (DCT2, DST7) when the ratio of the width to the height of the current block is less than 1 and the mode numbers of the intra prediction mode information are 3, 5, 29, B, (B+2), 65, 38, 40, (B−1), odd numbers between 5 and 29, odd numbers between (B+2) and 65, and even numbers between 40 and (B−1);

wherein when the ratios of the width to the height of the current block are 2, 4, 8, and 16, B is 7, 11, 13, and 15; and when the ratios of the width to the height of the current block are 1/2, 1/4, 1/8, and 1/16, B is 61, 57, 55, 53.

In some possible embodiments of the present disclosure, the intra prediction mode range includes intra prediction mode information with mode numbers of 0 and 1; and the determining module 1620 is further configured to:

determine the transform pair corresponding to the current block as (DST7, DCT2) when the ratio of the width to the height of the current block is equal to 1 and the mode numbers of the intra prediction mode information are 2, 4, 6, 34, 35, 37, 39, 41, 43, 65, even numbers between 6 and 34, and odd numbers between 43 and 65; and determine the transform pair corresponding to the current block as (DCT2, DST7) when the ratio of the width to the height of the current block is equal to 1 and the mode numbers of the intra prediction mode information are 3, 5, 7, 33, 36, 38, 40, 66, odd numbers between 7 and 33, and odd numbers between 40 and 66;

determine the transform pair corresponding to the current block as (DST7, DCT2) when the ratio of the width to the height of the current block is greater than 1 and the mode numbers of the intra prediction mode information are (B+1), (B+3), 34, 3, 5, B, 35, 37, 39, 65, even numbers between (B+3) and 34, odd numbers between 5 and B, and odd numbers between 39 and 65; and determine the transform pair corresponding to the current block as (DCT2, DST7) when the ratio of the width to the height of the current block is greater than 1 and the mode numbers of the intra prediction mode information are (B+2), (B+4), 33, 2, 4, (B−1), 36, 38, 66, odd numbers between (B+4) and 33, even numbers between 4 and (B−1), and even numbers between 38 and 66; and determine the transform pair corresponding to the current block as (DST7, DCT2) when the ratio of the width to the height of the current block is less than 1 and the mode numbers of the intra prediction mode information are 2, 4, 6, 34, (B+1), (B+3), 66, 35, 37, 39, (B−2), even numbers between 6 and 34, odd numbers between (B+3) and 66, and odd numbers between 39 and (B−2); and determine the transform pair corresponding to the current block as (DCT2, DST7) when the ratio of the width to the height of the current block is less than 1 and the mode numbers of the intra prediction mode information are 3, 5, 33, B, (B+2), 65, 36, 38, (B−1), odd numbers between 5 and 33, odd numbers between (B+2) and 65, and even numbers between 38 and (B−1); and wherein when the ratios of the width to the height of the current block are 2, 4, 8, and 16, B is 7, 11, 13, and 15; and when the ratios of the width to the height of the current block are 1/2, 1/4, 1/8, and 1/16, B is 61, 57, 55, 53.

In some possible embodiments of the present disclosure, the intra prediction mode range includes intra prediction mode information with mode numbers of 0, 1, 3, 65, and odd numbers between 3 and 65; and the determining module 1620 is further configured to:

determine the transform pair corresponding to the current block as (DST7, DCT2) when the ratio of the width to the height of the current block is equal to 1 and the mode numbers of the intra prediction mode information are 2, 4, 6, 34, and even numbers between 6 and 34; and determine the transform pair corresponding to the current block as (DCT2, DST7) when the ratio of the width to the height of the current block is equal to 1 and the mode numbers of the intra prediction mode information are 36, 38, 40, 66, and even numbers between 40 and 66;

determine the transform pair corresponding to the current block as (DST7, DCT2) when the ratio of the width to the height of the current block is greater than 1 and the mode numbers of the intra prediction mode information are (B+1), (B+3), 34, and even numbers between (B+3) and 34; and determine the transform pair corresponding to the current block as (DCT2, DST7) when the ratio of the width to the height of the current block is greater than 1 and the mode numbers of the intra prediction mode information are 36, 38, 66, 2, 4, (B−1), even numbers between 38 and 66, and even numbers between 4 and (B−1); and determine the transform pair corresponding to the current block as (DST7, DCT2) when the ratio of the width to the height of the current block is less than 1 and the mode numbers of the intra prediction mode information are 2, 4, 6, 34, (B+1), (B+3), 66, even numbers between 6 and 34, and even numbers between (B+3) and 66; and determine the transform pair corresponding to the current block as (DCT2, DST7) when the ratio of the width to the height of the current block is less than 1 and the mode numbers of the intra prediction mode information are 36, 38, (B−1), and even numbers between 38 and (B−1); and wherein when the ratios of the width to the height of the current block are 2, 4, 8, and 16, B is 7, 11, 13, and 15; and when the ratios of the width to the height of the current block are 1/2, 1/4, 1/8, and 1/16, B is 61, 57, 55, 53.

In some possible embodiments of the present disclosure, the determining module 1620 is further configured to: determine, based on the size information and the intra prediction mode information of the current block, the transform pair corresponding to the current block when the current block does not activate the intra subblock partitioning.

In some possible embodiments of the present disclosure, the determining module 1620 is further configured to:

determine the transform pair corresponding to the intra prediction mode information as the transform pair corresponding to the current block when it is determined, based on the size information, that the current block fails to satisfy a target dimension constraint condition, wherein the target dimension constraint condition is that the width is greater than or equal to a target value, and the height is greater than or equal to the target value;

when it is determined, based on the size information, that the height of the current block satisfies the target dimension constraint condition and the width of the current block fails to satisfy the target dimension constraint condition, determine DCT2 as a vertical transform kernel in the transform pair corresponding to the current block, and determine a horizontal transform kernel in the transform pair corresponding to the intra prediction mode information as a horizontal transform kernel in the transform pair corresponding to the current block;

when it is determined, based on the size information, that the width of the current block satisfies the target dimension constraint condition and the height of the current block fails to satisfy the target dimension constraint condition, determine DCT2 as a horizontal transform kernel in the transform pair corresponding to the current block, and determine a vertical transform kernel in the transform pair corresponding to the intra prediction mode information as a vertical transform kernel in the transform pair corresponding to the current block; and determine DCT2 as a horizontal transform kernel and a vertical transform kernel in the transform pair corresponding to the current block when it is determined based on the size information, that both the width and the height of the current block satisfy the target dimension constraint condition.

In some possible embodiments of the present disclosure, the subblock partition condition is that the current block is a luma block, the height and the width of the current block are both less than or equal to a first preset value, the current block is a single-line reference during performing intra prediction, and a number of pixels included in the current block is greater than a second preset value.

Figure 17:
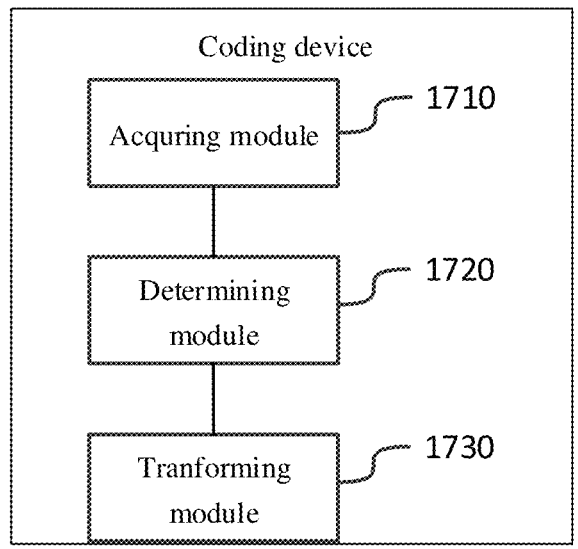
FIG. 17 is a schematic structural diagram of another coding device according to an embodiment of the present disclosure.

Based on the same technical concept, an embodiment of the present disclosure further provides a coding device. As shown in FIG. 17, the coding device includes:

an acquiring module 1710, configured to acquire residual data of a current block;

a determining module 1720, configured to: determine intra prediction mode information of subblocks of the current block and size information of the subblocks of the current block based on subblock partition information of the current block when the current block satisfies a subblock partition condition and intra subblock partitioning is activated; and determine, based on the size information of the subblock and the intra prediction mode information of the subblock, a transform pair corresponding to each subblock; and a transforming module 1730, configured to perform a transform on residual data of the subblocks based on the transform pairs corresponding to the subblocks;

wherein the determining module 1720 is configured to: determine a transform pair corresponding to the intra prediction mode information of each subblock as a transform pair corresponding to the subblock when it is determined, based on the size information of the subblock, that the subblock fails to satisfy a dimension constraint condition, wherein the dimension constraint condition is that a width is not within a first preset value range, and a height is not within a second preset value range.

In some possible embodiments of the present disclosure, the acquiring module 1710 is further configured to: acquire subblock partition information of the current block when the current block satisfies the subblock partition condition; and add the subblock partition information to coded data of the current block.

In the embodiments of the present disclosure, at the coding device, the transform pairs corresponding to the subblocks are determined directly based on the intra prediction mode of the current block and the size information of the subblocks; and the determined transform pairs are coded. Similarly, at the decoding device, the transform pairs corresponding to the subblocks are determined directly based on the intra prediction mode of the current block and the size information of the subblocks; and the determined transform pairs are decoded. In this way, since the transform pairs are determined based on the intra prediction mode of the current block and the size information of the subblocks, instead of using the same transform pair for all subblocks, the coding and decoding performance can be improved. Moreover, the selection of the transform pairs based on the intra prediction mode can save the selection time of the transform pairs and further improve the coding and decoding performance.

It should be noted: the decoding device according to the above embodiment performs decoding, only the partitioning of the above functional modules is exemplified. In actual applications, the above functions can be allocated to be completed by different functional modules as required. That is, the internal structure of the decoding device is partitioned into different functional modules to complete all or part of the functions described above. In addition, the decoding device according to the above embodiment and the decoding method embodiment belong to the same concept, and the specific implementation is detailed in the method embodiments, which is not repeated herein.

It should be noted: when the coding device according to the above embodiment performs coding, only the partitioning of the above functional modules is exemplified. In actual applications, the above functions can be allocated to be completed by different functional modules as required. That is, the internal structure of the coding device is partitioned into different functional modules to complete all or part of the functions described above. In addition, the coding device according to the above embodiment and the coding method embodiment belong to the same concept, and the specific implementation is detailed in the method embodiments, which is not repeated herein.

Figure 18:
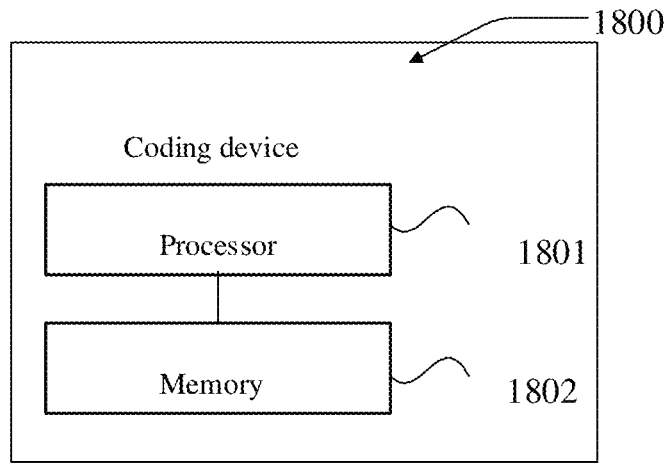
FIG. 18 is a schematic structural diagram of still another coding device according to an embodiment of the present disclosure.

FIG. 18 is a schematic structural diagram of a coding device according to an embodiment of the present disclosure. The coding device 1800 can vary greatly depending on different configurations or performance, and may include at least one central processing unit (CPU) 1801 and at least one memory 1802. The memory 1802 is configured to store at least one instruction therein. The at least one instruction, when loaded and run by the processor 1801, causes the processor 1801 to perform the steps of the coding method.

Figure 19:
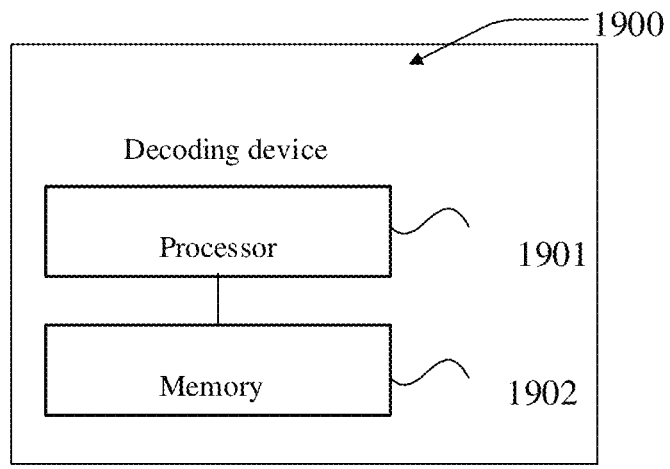
FIG. 19 is a schematic structural diagram of still another decoding device according to an embodiment of the present disclosure.

FIG. 19 is a schematic structural diagram of a decoding device according to an embodiment of the present disclosure. The decoding device 1900 can vary greatly depending on different configurations or performance, and may include at least one processor 1901 and at least one memory 1902. The memory 1902 is configured to store at least one instruction therein. The at least one instruction, when loaded and run by the processor 1901, causes the processor 1901 to perform the steps of the decoding method.

An embodiment of the present disclosure further provides a computer-readable storage medium. The computer-readable storage medium is configured to store a computer program therein. The computer program, when run by a processor, causes the processor to perform the steps of the coding and decoding methods.

An embodiment of the present disclosure further provides a coding device. The coding device includes a processor and a memory storing a computer program therein. The computer program, when run by the processor, causes the processor to perform the steps of the coding method.

An embodiment of the present disclosure further provides a decoding device. The decoding device includes a processor and a memory storing a computer program therein. The computer program, when run by the processor, causes the processor to perform the steps of the decoding method.

An embodiment of the present disclosure further provides a system for coding and decoding. The system includes a coding device and a decoding device; wherein the coding device is the coding device that performs coding as described above; and the decoding device is the decoding device that performs decoding as described above.

It may be understood by a person of ordinary skill in the art that all or part of steps in the above embodiments may be completed by hardware, or a program instructing relevant hardware. The program may be stored in a computer-readable storage medium which includes a read-only memory, a magnetic disk, an optical disc or the like.

Described above are merely exemplary embodiments of the present disclosure, and are not intended to limit the present disclosure. Within the spirit and principles of the present disclosure, any modifications, equivalent substitutions, improvements, and the like should be within the protection scope of the present disclosure.

What is claimed is:

1. A decoding method, comprising:
acquiring coded data of a current block;
determining size information of subblocks based on subblock partition information of the current block in response to the current block satisfying a subblock partition condition and determining, based on the coded data of the current block, that the current block activates intra subblock partition;
determining, based on the size information of each subblock, a transform pair corresponding to the subblock; and
performing an inverse transform on inversely quantized data of the subblocks based on the transform pairs corresponding to the subblocks; wherein determining, based on the size information of the each subblock, the transform pair corresponding to the subblock comprises:
determining Discrete Sine Transform-7 (DST7) as a horizontal transform kernel in the transform pair corresponding to the subblock in response to a width of the subblock satisfying a first dimension constraint condition;
determining Discrete Cosine Transform-2 (DCT2) as the horizontal transform kernel in the transform pair corresponding to the subblock in response to the width of the subblock failing to satisfy the first dimension constraint condition;
determining DST7 as a vertical transform kernel in the transform pair corresponding to the subblock in response to a height of the subblock satisfying a second dimension constraint condition; and
determining DCT2 as the vertical transform kernel in the transform pair corresponding to the subblock in response to the height of the subblock failing to satisfy the second dimension constraint condition;
wherein the first dimension constraint condition is that the width of the subblock is greater than or equal to 4 and less than or equal to 16; and the second dimension constraint condition is that the height of the subblock is greater than or equal to 4 and less than or equal to 16.

2. The decoding method according to claim 1, wherein the subblock partition condition comprises at least: the current block is a luma block, and the height and the width of the current block are both less than or equal to a first preset value.

3. The decoding method according to claim 1, wherein determining, based on the size information of the each subblock, the transform pair corresponding to the subblock comprises:
determining DST7 as the horizontal transform kernel in the transform pair corresponding to the subblock and determining DST7 as the vertical transform kernel in the transform pair corresponding to the subblock in response to the width of the subblock being equal to the height of the subblock, the width of the subblock satisfying the first dimension constraint condition and the height of the subblock satisfying the second dimension constraint condition.

4. The decoding method according to claim 3, wherein both the width and height of the subblock are equal to 4, or 8, or 16.

5. The decoding method according to claim 1, wherein the width of the subblock satisfies the first dimension constraint condition and the height of the subblock fails to satisfy the second dimension constraint condition in response to the width of the subblock being greater than or equal to 4 and less than or equal to 16 and the height of the subblock being equal to 32 or 64.

6. The decoding method according to claim 1, wherein the width of the subblock fails to satisfy the first dimension constraint condition and the height of the subblock satisfies the second dimension constraint condition in response to the height of the subblock being greater than or equal to 4 and less than or equal to 16 and the width of the subblock being equal to 32 or 64.

7. The decoding method according to claim 1, wherein the width of the subblock fails to satisfy the first dimension constraint condition and the height of the subblock fails to satisfy the second dimension constraint condition in response to the width of the subblock being greater than 1 and less than 4 and the height of the subblock being greater than 16; or
 the width of the subblock fails to satisfy the first dimension constraint condition and the height of the subblock fails to satisfy the second dimension constraint condition in response to the height of the subblock being greater than 1 and less than 4 and the width of the subblock being greater than 16; or
 the width of the subblock fails to satisfy the first dimension constraint condition and the height of the subblock fails to satisfy the second dimension constraint condition in response to the height of the subblock being greater than 16 and the width of the subblock being greater than 16.

8. A coding method, comprising:
 acquiring residual data of a current block; determining size information of subblocks of the current block based on subblock partition information of the current block in response to the current block satisfying a subblock partition condition and subblock partition being activated;
 determining a transform pair corresponding to each subblock based on the size information of the subblock; and performing a transform on residual data of the subblocks based on the transform pairs corresponding to the subblocks:
 wherein determining the transform pair corresponding to each subblock based on the size information of the subblock comprises:
 determining Discrete Sine Transform-7 (DST7) as a horizontal transform kernel in the transform pair corresponding to the subblock in response to a width of the subblock satisfying a first dimension constraint condition;
 determining Discrete Cosine Transform-2 (DCT2) as the horizontal transform kernel in the transform pair corresponding to the subblock in response to the width of the subblock failing to satisfy the first dimension constraint condition;
 determining DST7 as a vertical transform kernel in the transform pair corresponding to the subblock in response to a height of the subblock satisfying a second dimension constraint condition; and
 determining DCT2 as the vertical transform kernel in the transform pair corresponding to the subblock in response to the height of the subblock failing to satisfy the second dimension constraint condition;
 wherein the first dimension constraint condition is that the width of the subblock is greater than or equal to 4 and less than or equal to 16; and the second dimension constraint condition is that the height of the subblock is greater than or equal to 4 and less than or equal to 16.

9. The coding method according to claim 8, the subblock partition condition comprises at least: the current block is a luma block, and the height and the width of the current block are both less than or equal to a first preset value.

10. A decoder, comprising a processor and a memory storing at least one instruction executable by the processor; wherein the processor, when loading and executing the at least one instruction, is caused to perform a method comprising: acquiring coded data of a current block; determining size information of subblocks based on subblock partition information of the current block in response to the current block satisfying a subblock partition condition and determining, based on the coded data of the current block, that the current block activates intra subblock partition; determining, based on the size information of each subblock, a transform pair corresponding to the subblock; and performing an inverse transform on inversely quantized data of the subblocks based on the transform pairs corresponding to the subblocks; wherein determining, based on the size information of the each subblock, the transform pair corresponding to the subblock comprises:
 determining Discrete Sine Transform-7 (DST7) as a horizontal transform kernel in the transform pair corresponding to the subblock in response to a width of the subblock satisfying a first dimension constraint condition;
 determining Discrete Cosine Transform-2 (DCT2) as the horizontal transform kernel in the transform pair corresponding to the subblock in response to the width of the subblock failing to satisfy the first dimension constraint condition;
 determining DST7 as a vertical transform kernel in the transform pair corresponding to the subblock in response to a height of the subblock satisfying a second dimension constraint condition; and
 determining DCT2 as the vertical transform kernel in the transform pair corresponding to the subblock in response to the height of the subblock failing to satisfy the second dimension constraint condition;
 wherein the first dimension constraint condition is that the width of the subblock is greater than or equal to 4 and less than or equal to 16; and the second dimension constraint condition is that the height of the subblock is greater than or equal to 4 and less than or equal to 16.

11. A coder, comprising
 a processor and a memory storing at least one instruction executable by the processor; wherein the processor, when loading and executing the at least one instruction, is caused to perform a method comprising:
 acquiring residual data of a current block;
 determining size information of subblocks of the current block based on subblock partition information of the current block in response to the current block satisfying a subblock partition condition and subblock partition being activated;
 determining a transform pair corresponding to each subblock based on the size information of the subblock; and performing a transform on residual data of the subblocks based on the transform pairs corresponding to the subblocks;

wherein determining the transform pair corresponding to each subblock based on the size information of the subblock comprises:
determining Discrete Sine Transform-7 (DST7) as a horizontal transform kernel in the transform pair corresponding to the subblock in response to a width of the subblock satisfying a first dimension constraint condition;
determining Discrete Cosine Transform-2 (DCT2) as the horizontal transform kernel in the transform pair corresponding to the subblock in response to the width of the subblock failing to satisfy the first dimension constraint condition;
determining DST7 as a vertical transform kernel in the transform pair corresponding to the subblock in response to a height of the subblock satisfying a second dimension constraint condition; and
determining DCT2 as the vertical transform kernel in the transform pair corresponding to the subblock in response to the height of the subblock failing to satisfy the second dimension constraint condition;
wherein the first dimension constraint condition is that the width of the subblock is greater than or equal to 4 and less than or equal to 16; and the second dimension constraint condition is that the height of the subblock is greater than or equal to 4 and less than or equal to 16.

12. A non-transitory computer-readable storage medium, storing at least one instruction executable by a processor; wherein the at least one instruction, when loaded and executed by the processor, causes the processor to perform:
acquiring coded data of a current block;
determining size information of subblocks based on subblock partition information of the current block in response to the current block satisfying a subblock partition condition and determining, based on the coded data of the current block, that the current block activates intra subblock partition;
determining, based on the size information of each subblock, a transform pair corresponding to the subblock; and
performing an inverse transform on inversely quantized data of the subblocks based on the transform pairs corresponding to the subblocks; wherein determining, based on the size information of the each subblock, the transform pair corresponding to the subblock comprises:
determining Discrete Sine Transform-7 (DST7) as a horizontal transform kernel in the transform pair corresponding to the subblock in response to a width of the subblock satisfying a first dimension constraint condition;
determining Discrete Cosine Transform-2 (DCT2) as the horizontal transform kernel in the transform pair corresponding to the subblock in response to the width of the subblock failing to satisfy the first dimension constraint condition;
determining DST7 as a vertical transform kernel in the transform pair corresponding to the subblock in response to a height of the subblock satisfying a second dimension constraint condition; and
determining DCT2 as the vertical transform kernel in the transform pair corresponding to the subblock in response to the height of the subblock failing to satisfy the second dimension constraint condition; wherein the first dimension constraint condition is that the width of the subblock is greater than or equal to 4 and less than or equal to 16; and the second dimension constraint condition is that the height of the subblock is greater than or equal to 4 and less than or equal to 16.

13. The storage medium according to claim 12, wherein the subblock partition condition comprises at least: the current block is a luma block, and the height and the width of the current block are both less than or equal to a first preset value.

14. The storage medium according to claim 12, wherein determining, based on the size information of the each subblock, the transform pair corresponding to the subblock comprises:
determining DST7 as the horizontal transform kernel in the transform pair corresponding to the subblock and determining DST7 as the vertical transform kernel in the transform pair corresponding to the subblock in response to the width of the subblock being equal to the height of the subblock, the width of the subblock satisfying the first dimension constraint condition and the height of the subblock satisfying the second dimension constraint condition.

15. The storage medium according to claim 12, wherein both the width and height of the subblock are equal to 4, or 8, or 16.

16. The storage medium according to claim 12, wherein the width of the subblock satisfies the first dimension constraint condition and the height of the subblock fails to satisfy the second dimension constraint condition in response to the width of the subblock being greater than or equal to 4 and less than or equal to 16 and the height of the subblock being equal to 32 or 64.

17. The storage medium according to claim 12, wherein the width of the subblock fails to satisfy the first dimension constraint condition and the height of the subblock satisfies the second dimension constraint condition in response to the height of the subblock being greater than or equal to 4 and less than or equal to 16 and the width of the subblock being equal to 32 or 64.

18. The storage medium according to claim 12, wherein the width of the subblock fails to satisfy the first dimension constraint condition and the height of the subblock fails to satisfy the second dimension constraint condition in response to the width of the subblock being greater than 1 and less than 4 and the height of the subblock being greater than 16; or
the width of the subblock fails to satisfy the first dimension constraint condition and the height of the subblock fails to satisfy the second dimension constraint condition in response to the height of the subblock being greater than 1 and less than 4 and the width of the subblock being greater than 16; or
the width of the subblock fails to satisfy the first dimension constraint condition and the height of the subblock fails to satisfy the second dimension constraint condition in response to the height of the subblock being greater than 16 and the width of the subblock being greater than 16.

19. A non-transitory computer-readable storage medium, storing at least one instruction executable by a processor; wherein the at least one instruction, when loaded and executed by the processor, causes the processor to perform:
acquiring residual data of a current block;
determining size information of subblocks of the current block based on subblock partition information of the current block in response to the current block satisfying a subblock partition condition and subblock partition being activated; determining a transform pair corresponding to each subblock based on the size information of the subblock; and performing a transform on residual data of the subblocks based on the transform pairs corresponding to the subblocks; wherein determining the transform pair corresponding to each subblock based on the size information of the subblock comprises:

determining Discrete Sine Transform-7 (DST7) as a horizontal transform kernel in the transform pair corresponding to the subblock in response to a width of the subblock satisfying a first dimension constraint condition;

determining Discrete Cosine Transform-2 (DCT2) as the horizontal transform kernel in the transform pair corresponding to the subblock in response to the width of the subblock failing to satisfy the first dimension constraint condition;

determining DST7 as a vertical transform kernel in the transform pair corresponding to the subblock in response to a height of the subblock satisfying a second dimension constraint condition; and determining DCT2 as the vertical transform kernel in the transform pair corresponding to the subblock in response to the height of the subblock failing to satisfy the second dimension constraint condition;

wherein the first dimension constraint condition is that the width of the subblock is greater than or equal to 4 and less than or equal to 16; and the second dimension constraint condition is that the height of the subblock is greater than or equal to 4 and less than or equal to 16.

20. The storage medium according to claim 19, wherein the subblock partition condition comprises at least: the current block is a luma block, and the height and the width of the current block are both less than or equal to a first preset value.

\* \* \* \* \*